(12) United States Patent
Ichieda

(10) Patent No.: US 8,416,249 B2
(45) Date of Patent: Apr. 9, 2013

(54) IMAGE TRANSFER USING DRAWING COMMAND HOOKING

(75) Inventor: Hiroyuki Ichieda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 59 days.

(21) Appl. No.: 12/923,251

(22) Filed: Sep. 10, 2010

(65) Prior Publication Data

US 2011/0043531 A1    Feb. 24, 2011

Related U.S. Application Data

(63) Continuation of application No. 11/136,528, filed on May 25, 2005, now Pat. No. 7,817,156.

(30) Foreign Application Priority Data

| Jun. 11, 2004 | (JP) | 2004-173284 |
| Jun. 11, 2004 | (JP) | 2004-173288 |
| Aug. 20, 2004 | (JP) | 2004-241214 |
| Aug. 20, 2004 | (JP) | 2004-241224 |
| Aug. 20, 2004 | (JP) | 2004-241239 |

(51) Int. Cl.
*G06T 1/00* (2006.01)

(52) U.S. Cl.
USPC .......................................... 345/522; 345/545

(58) Field of Classification Search .................. 345/522, 345/545
See application file for complete search history.

(56) References Cited

U.S. PATENT DOCUMENTS

5,491,780 A    2/1996  Fyles et al.

FOREIGN PATENT DOCUMENTS

| EP | 878759 A1 * | 11/1998 |
| GB | 2 270 581 A | 3/1994 |
| JP | 06161957 A * | 6/1994 |
| JP | A-06-161957 | 6/1994 |
| JP | A-07-049834 | 2/1995 |
| JP | A-10-074173 | 3/1998 |
| JP | 2001092756 A * | 4/2001 |
| JP | A-2001-092756 | 4/2001 |
| JP | A-2002-366341 | 12/2002 |
| JP | A-2003-015858 | 1/2003 |
| JP | A-2005-249841 | 9/2005 |
| WO | WO 01/93583 A1 | 12/2001 |

OTHER PUBLICATIONS

Feb. 3, 2010 European Search Report issued in Application No. 05012331.4.

* cited by examiner

*Primary Examiner* — Maurice L McDowell, Jr.
(74) *Attorney, Agent, or Firm* — Oliff & Berridge, PLC

(57) ABSTRACT

A hook processing module hooks and preempts to a specific drawing command issued by an application program, and draws an image in an image data storage area within the RAM according to the acquired drawing command. VNC server acquires the image from the image data storage area, and transfers the acquired image to a projector via a network.

18 Claims, 52 Drawing Sheets

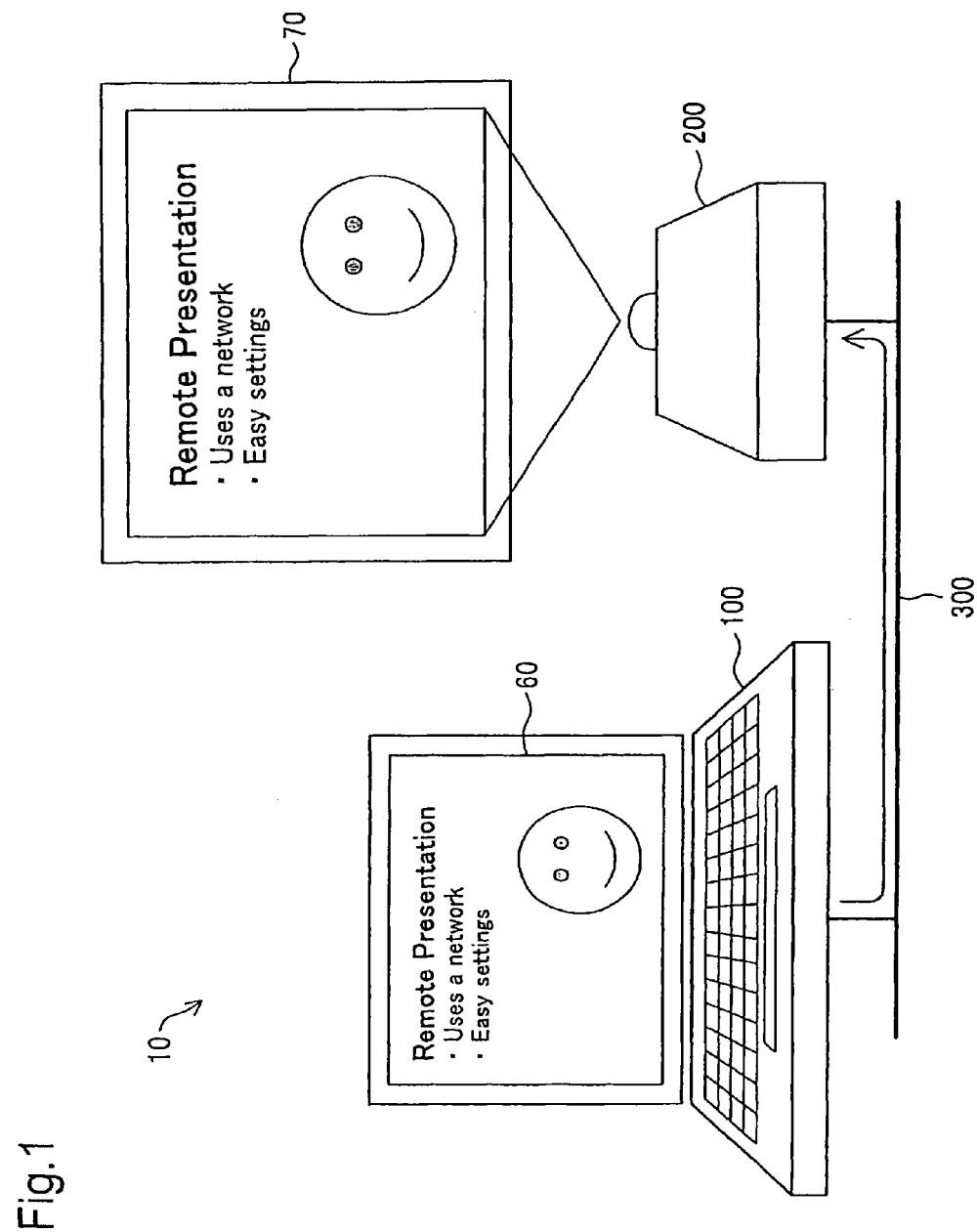

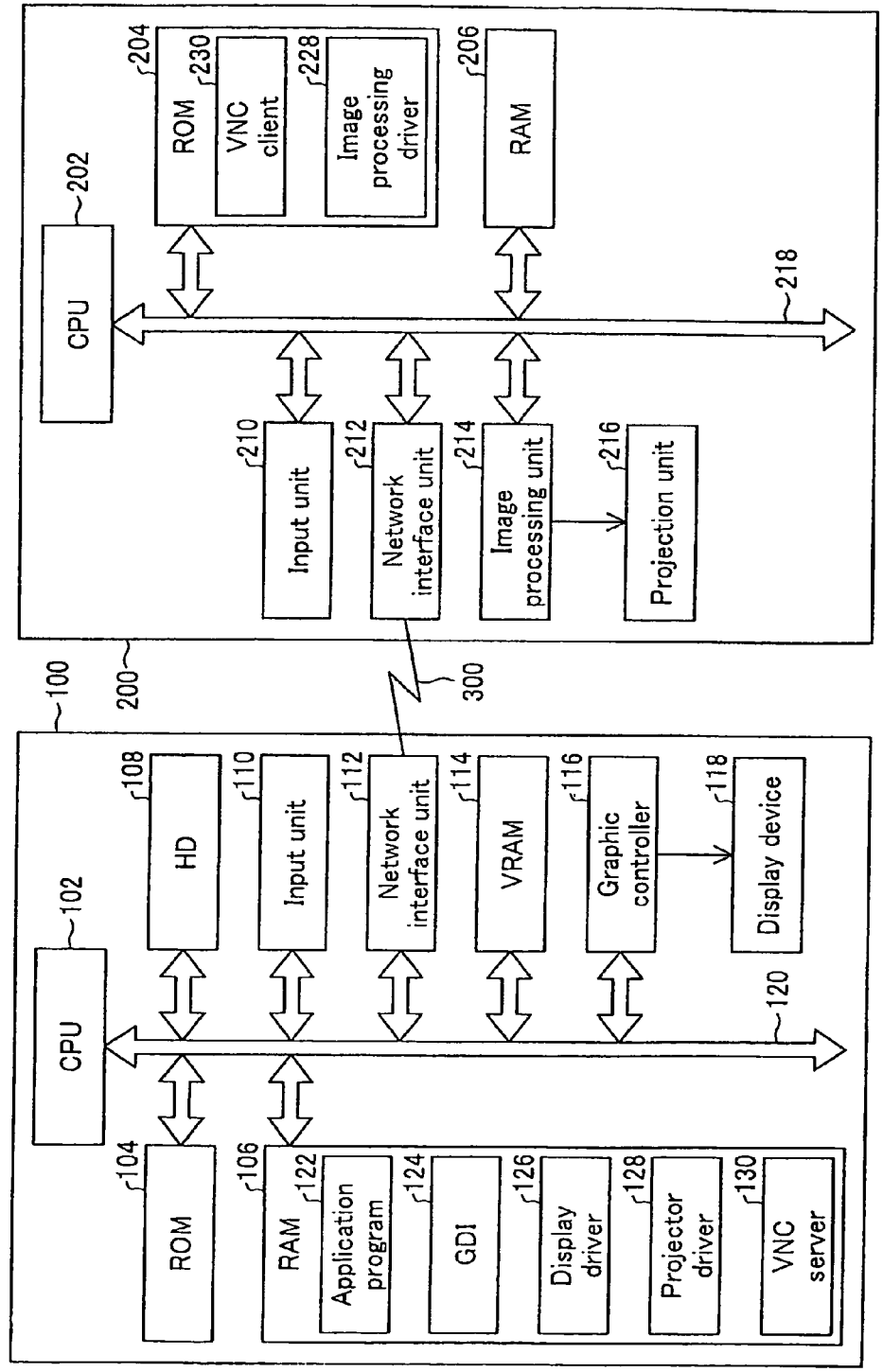

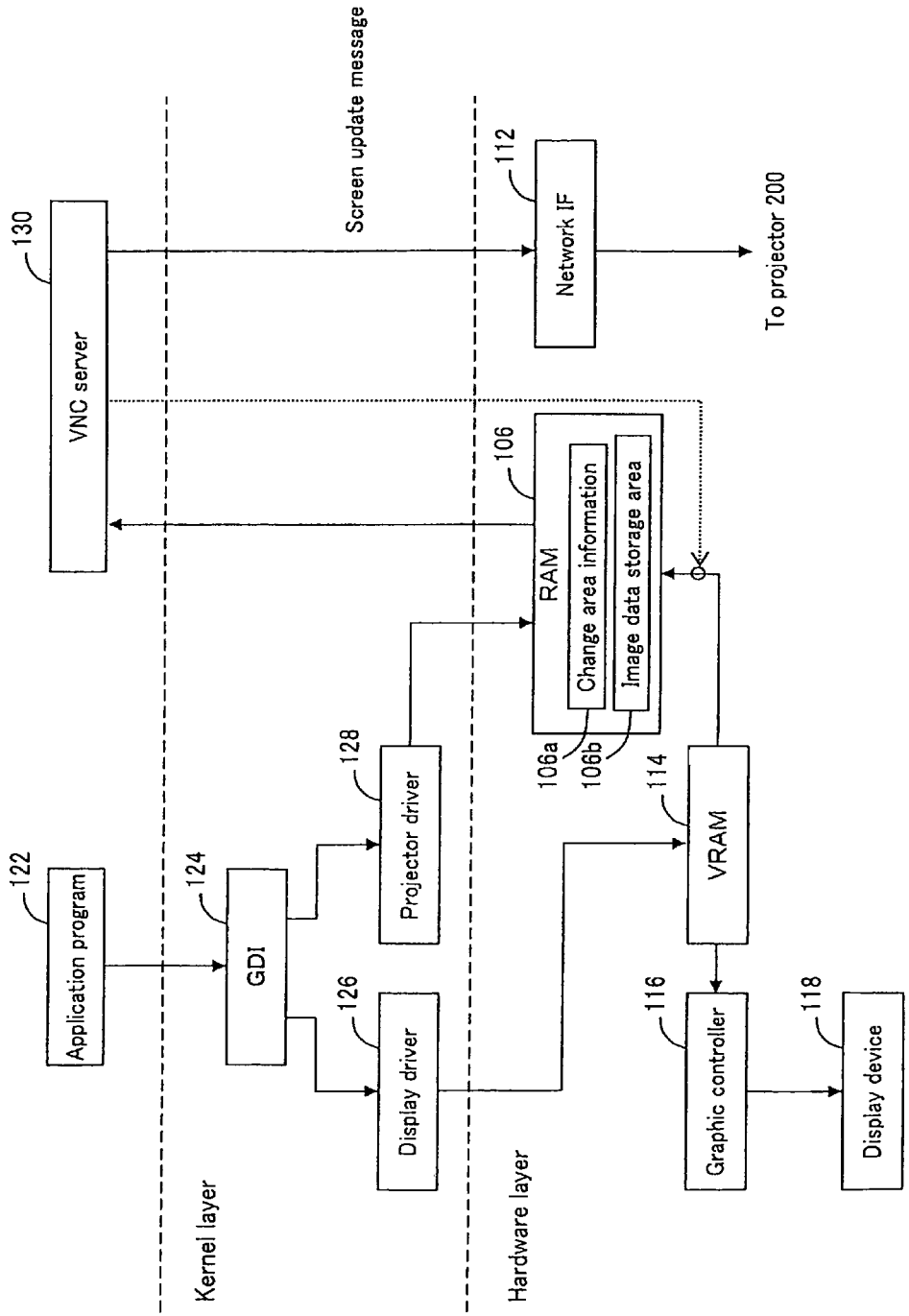

Change area information 106a:
- Change area x coordinate: Xa
- Change area y coordinate: Ya
- Change area width: Wa
- Change area height: Ha

Fig.5

Screen Update Message Structure

| | Data Size | Data Value | Data Description |
|---|---|---|---|
| Message header part | 1 | 0 | Message type: Screen update |
| | 1 | | Padding |
| | 2 | 1 | Change area count |
| Parameter part | 2 | | Change area x coordinate |
| | 2 | | Change area y coordinate |
| | 2 | | Change area width |
| | 2 | | Change area height |
| | 4 | | Encoding format |
| | n | | Change area image data |

Change areas R1 to R2

Screen update areas R11 to R13

Change area information 106a:
- Change area x coordinate: Xa
- Change area y coordinate: Ya
- Change area width: Wa
- Change area height: Ha
- Image type
  (0: Equal magnification, 1: Expanded/Contracted)
- Width after expansion/contraction
- Height after expansion/contraction

Fig.11

Screen Update Message Constitution (Second Embodiment)

| | Data Size | Data Value | Data Description |
|---|---|---|---|
| Message header part | 1 | 0 | Message type: Screen update |
| | 1 | | Padding |
| | 2 | 1 | Change area count |
| Parameter part | 2 | | Change area x coordinate |
| | 2 | | Change area y coordinate |
| | 2 | | Change area width (original image width) |
| | 2 | | Change area height (original image height) |
| | 4 | | Encoding format |
| | 1 | | Image type (0: Equal magnification, 1: Expanded/Contracted) |
| | 2 | | Width after expansion/contraction |
| | 2 | | Height after expansion/contraction |
| | n | | Change area image data (original image data) |

Expanded display

Time t1

Time t2

Change area information 106a:
- Change area x coordinate: Xa
- Change area y coordinate: Ya
- Change area width: Wa
- Change area height: Ha Time t3

Change area information 106a:
- Change area x coordinate: Xb
- Change area y coordinate: Yb
- Change area width: Wb
- Change area height: Hb

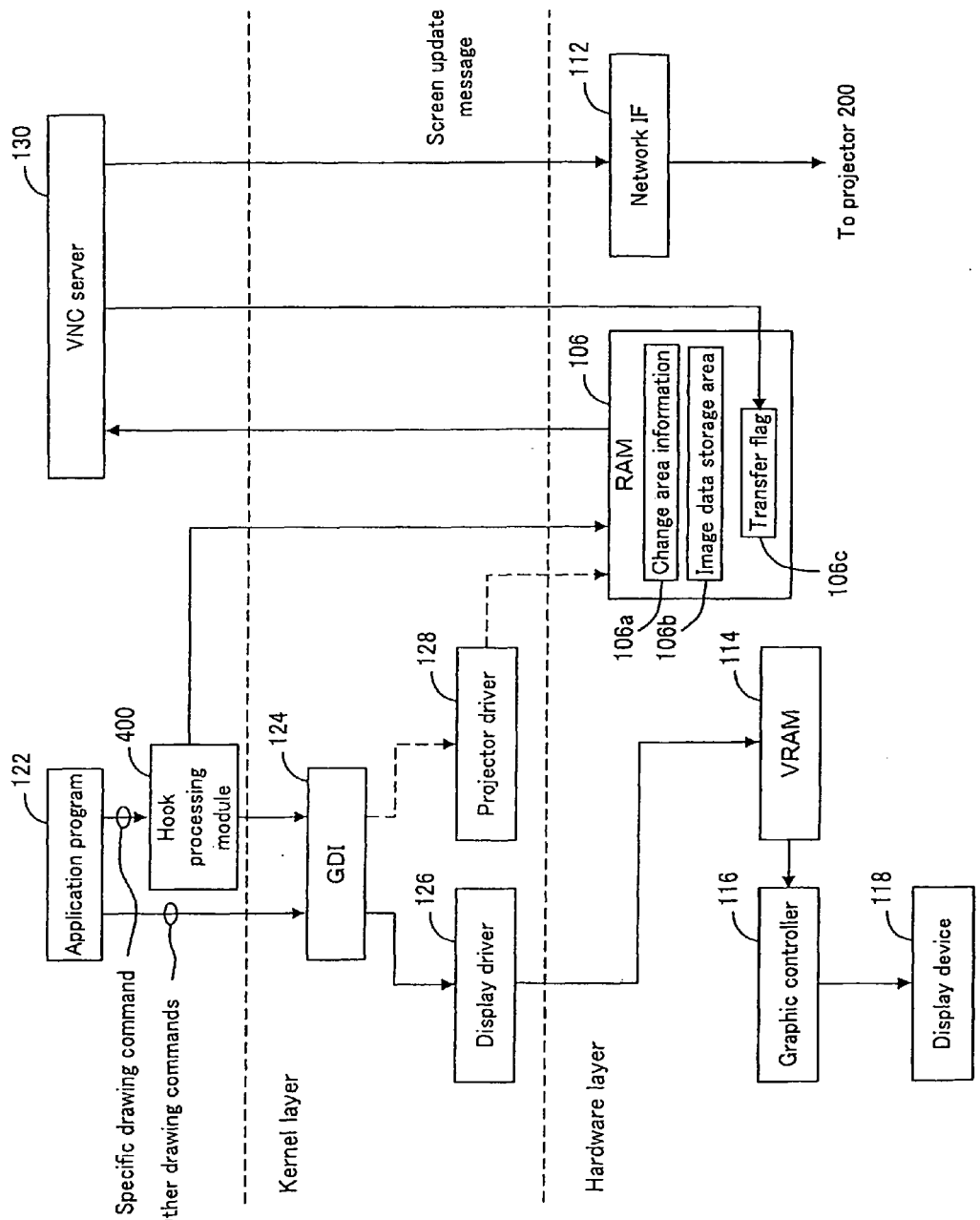

Change areas R1 to R2

Screen update areas R11 to R13

Example of a problem when not using a transfer flag (When image data is acquired and transferred at time t3
with the change area information at time t2)

Change areas A1 and A2

Transfer area TG1 for which image is acquired from the RAM 106

Transfer area TG2 for which image is acquired from the VRAM 114

Screen update area TTG

Screen update area TTG

Screen update areas R11 to R13 after division

Change areas RA1 and RA2

Transfer area TG1 for which image is acquired from the RAM 106

Transfer area TG2 for which image is acquired from the VRAM 114

Screen update area TTG

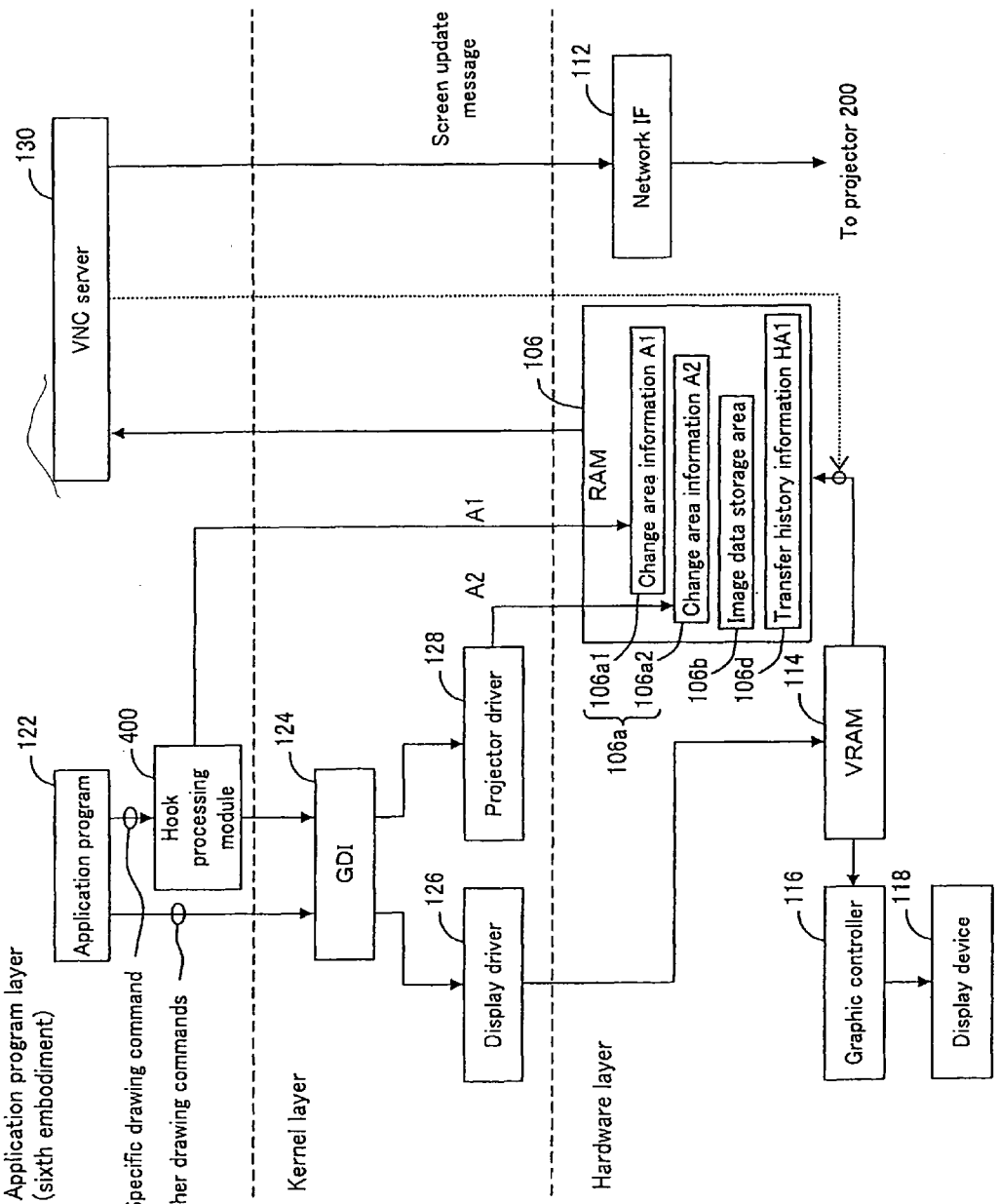
Fig.25 Application program layer (sixth embodiment)

Fig.26(A-1)
Change area information A1 (time t0)

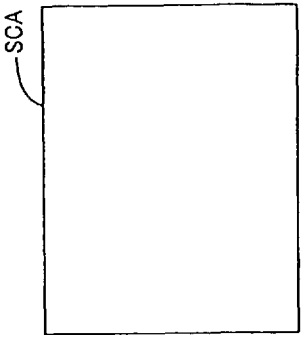

· Change area information A1:
  Change area RA1 = G1

Fig.26(A-2)
Change area information A2 (time t0)

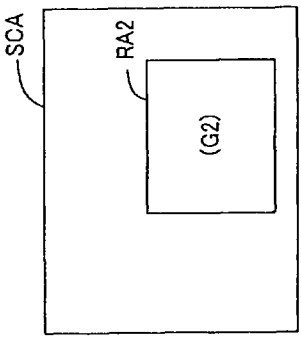

· Change area information A2:
  Change area RA2 = G2

Fig.26(A-3)
Transfer history information HA1 (time t0)

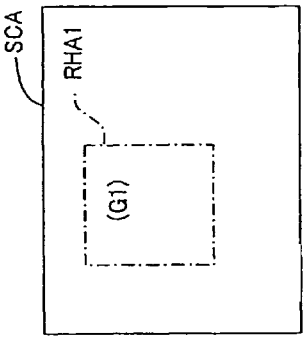

· Transfer history information HA1: None

Fig.26(B-1)
Change area information A1 (time t1)

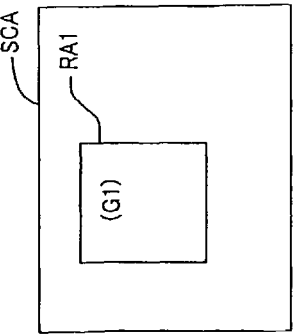

· Change area information A1: None

Fig.26(B-2)
Change area information A2 (time t1)

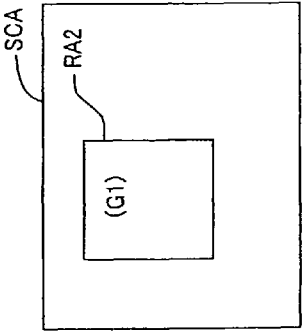

· Change area information A2:
  Change area RA2 = G1

Fig.26(B-3)
Transfer history information HA1 (time t1)

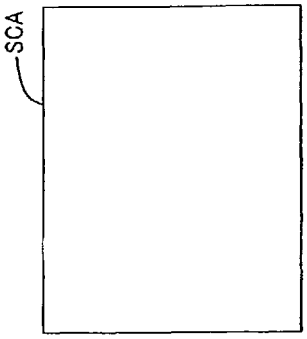

· Transfer history information HA1:
  History area RHA1

Change areas RA1 and RA2 and history area RHA1 (time t0)

Change area information A1

Change area information A2

No RHA1

Transfer area TG1 for which image is acquired from the RAM 106

Transfer area TG2 for which image is acquired from the VRAM 114

Screen update area TTG

Screen update area TTG

Screen update areas R11 to R13 after division

Fig.32(A) Change areas RA1 and RA2 and history area RHA1 (time t1)

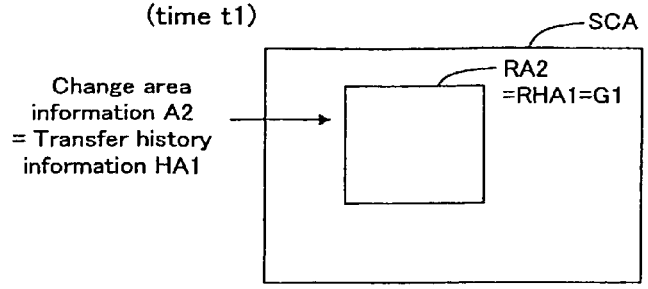

Change area information A2 = Transfer history information HA1

Fig.32(B) Transfer area TG2 obtained by (RA2 − RA1)

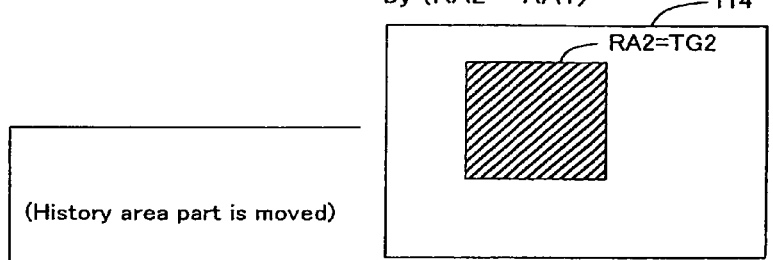

(History area part is moved)

(History area part deleted)

Fig.32(C) Transfer area TG1 for which image is acquired from the RAM 106

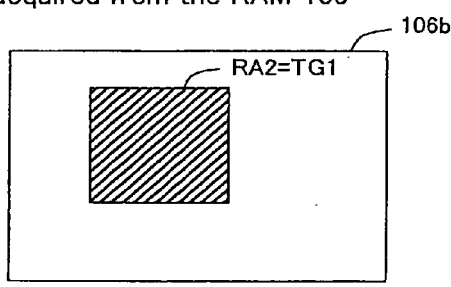

Fig.32(D) Transfer area TG2' for which image is acquired from the VRAM 114 (empty)

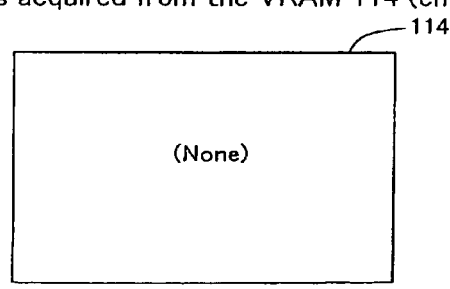

Fig.32(E) Screen update area TTG

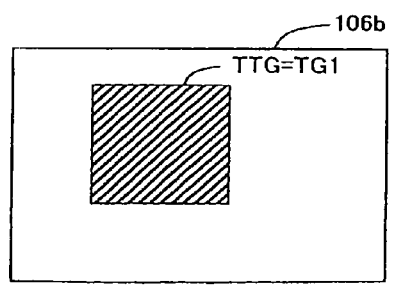

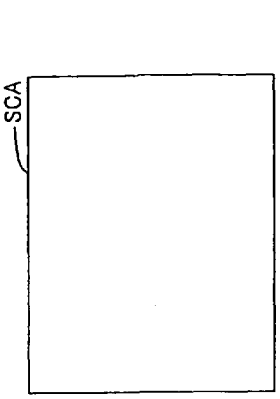
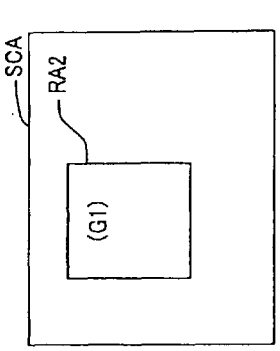
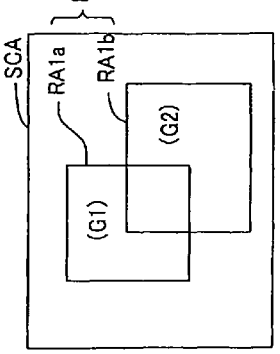
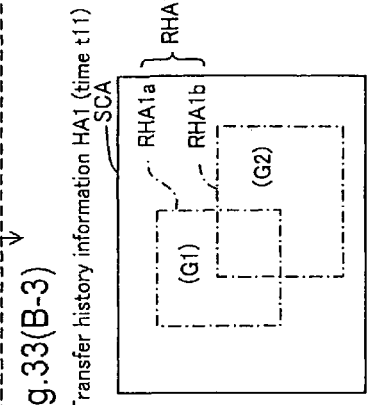
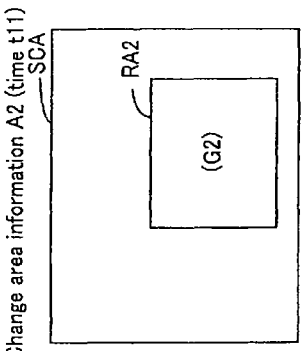
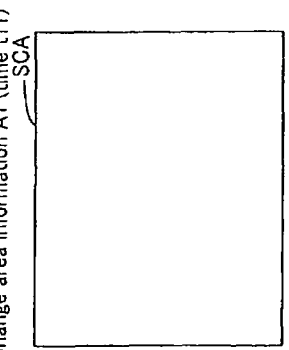

Screen update area TTG (time t10)

Screen update area TTG (time t11)

Change areas RA1 and RA2 and history area RHA1 (time t0)

No RHA1

Transfer area TG1 for which image is acquired from the RAM 106

Transfer area TG2 for which image is acquired from the VRAM 114

Screen update area TTG

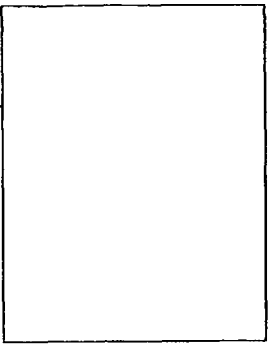

Fig.36(A-1)
Change area information A1 (time t20)
RA1a (full screen)
SCA
RA1b
(G10) (G11)
(slide to the right)

Change area information A1a:
Change area RA1a
Change area information A1b:
Change area RA1b

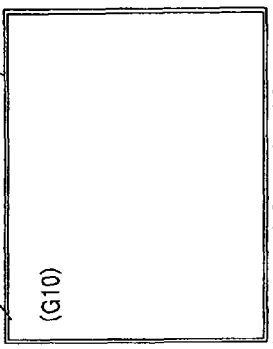

Fig.36(A-2)
Change area information A2 (time t20)
RA2 (full screen)
SCA
(G10) (G11)

· Change area information A2:
Change area RA2 (= RA1a)

=

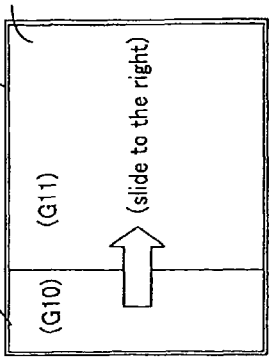

Fig.36(A-3)
Transfer history information HA1 (time t20)
SCA

· Transfer history information HA1:
None

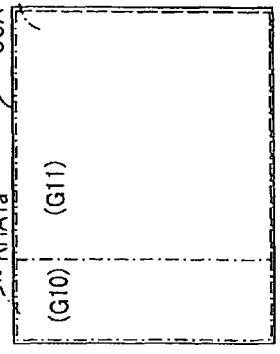

Fig.36(B-1)
Change area information A1 (time t21)
SCA

· Change area information A1: None

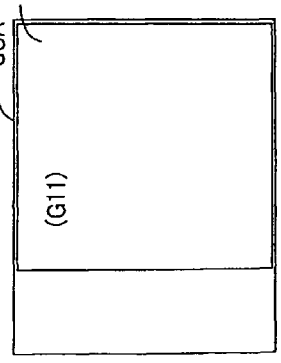

Fig.36(B-2)
Change area information A2 (time t21)
RA2
SCA
(G11)

· Change area information A2:
Change area RA2 (= RA1b)

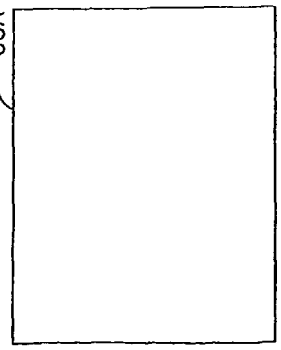

Fig.36(B-3)
Transfer history information HA1 (time t21)
RHA1b
SCA
RHA1a
(G10) (G11)

· Transfer history information HA1a:
History area RHA1a
· Transfer history information HA1b:
History area RHA1b Screen update area TTG (time t20)

Screen update area TTG (time t21)

Change areas RA1 and RA2 and resend area RRS (time t100)

Transfer area TG1 for which image is acquired from the RAM 106

Transfer area TG2 for which image is acquired from the VRAM 114

Screen update area TTG

Screen update area TTG

Screen update areas R11 to R13 after division

Fig.47(A) Change areas RA1 and RA2 and resend area RRS (time t101)
Resend area information RS →
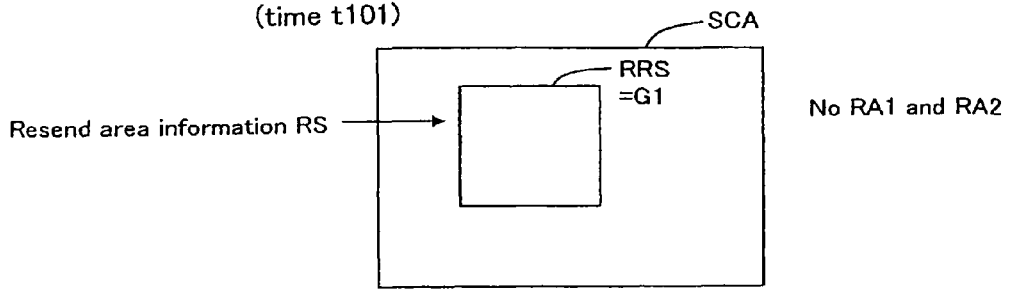
No RA1 and RA2
Fig.47(B) Resend area separated
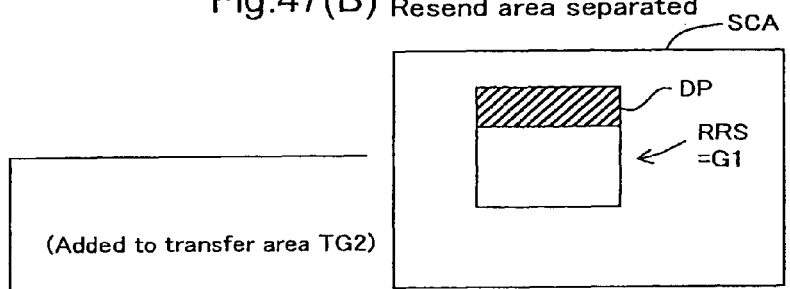
(Added to transfer area TG2)
Fig.47(C) Transfer area TG2 for which images are acquired from the VRAM 114
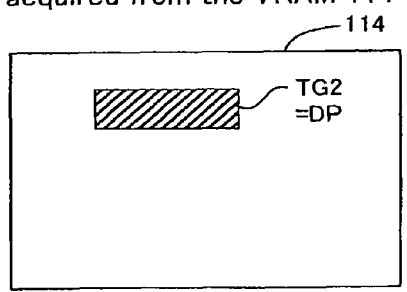
Fig.47(D) (Separated area DP deleted) Resend area RRS'
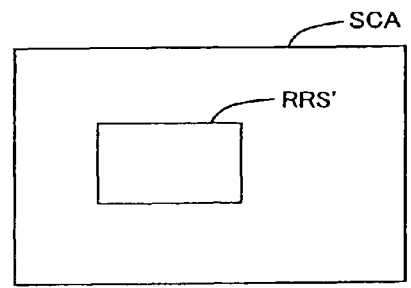
Fig.47(E) Screen update area TTG
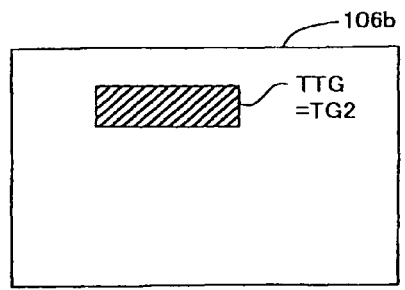

Full screen resend (time t200)

Full screen resend (time t201)

Change areas RA1 and RA2

Screen update areas R11 to R13

Resend area RRS

IMAGE TRANSFER USING DRAWING COMMAND HOOKING

This is a Continuation of application Ser. No. 11/136,528 filed May 25, 2005. The disclosure of the prior application is hereby incorporated by reference herein in its entirety.

BACKGROUND OF THE INVENTION

1. Field of the Invention

The present invention relates to an image display system comprising an image supply device and an image display device connected via a network.

2. Description of the Related Art

A network projector is proposed as one type of projector for the purpose of projection display of images supplied from a personal computer via a network (e.g. in WO 01/093583). Also, a technology called VNC (Virtual Network Computing) is used to supply images from a personal computer via a network to the network projector.

In the image transfer using VNC, images are first transferred from the VRAM (frame memory) to the RAM (system memory), after which, the images are acquired from the RAM and are transferred to the projector via the network. A significant amount of time is taken to transfer image data from the VRAM to the RAM, so there were cases when it was not possible to obtain sufficient overall transfer speed. This kind of problem is not limited to network projector systems, and generally is a problem common to systems that supply and display images via a network from an image supply device to an image display device.

SUMMARY OF THE INVENTION

An object of the present invention is to provide technology for improving the transfer speed when transferring images to an image display device via a network.

An image supply device according to one aspect of the present invention comprises an application program capable of issuing image drawing commands; a drawing module configured to process drawing commands issued by the application program; a hook processing module configured to hook and preempt a specific drawing command issued by the application program and to draw an image in a transfer image storage area within a general purpose memory according to the acquired drawing command; and an image transfer processing module configured to acquire an image from the transfer image storage area and to transfer the acquired image to the image display device via the network.

With this image supply device, when a specific drawing command is issued, instead of the drawing module, the hook processing module hooks and acquires that drawing command, and draws the image within the general purpose memory, so compared to the prior art where all images are transferred from the VRAM to the RAM (general purpose memory), it is possible to increase the overall transfer processing speed.

An image supply method according to another aspect of the present invention comprises: (a) drawing an image to a transfer image storage area within a general purpose memory according to a specific drawing command issued by an application program, and (b) acquiring the image from the transfer image storage area, and transferring the acquired image to the image display device via the network.

According to this method, when a specific drawing command is issued, the image is drawn within the general purpose memory, so compared to the past art where all images are transferred from the VRAM to the RAM (general purpose memory), it is possible to increase the overall transfer processing speed.

Other Aspects of the Invention

The hook processing module may write, into the general purpose memory, change area information indicating a change area that is an area within the transfer image storage area in which an image is drawn according to the drawing command. The image transfer processing module may reference the change area information stored within the general purpose memory and acquire the image within the image change area that is stored in the transfer image storage area, and transfer to the image display device via the network the acquired image together with the change area information.

According to this constitution, the change area information is also written to the general purpose memory by the hook processing module, so compared to the case where the change area information is written by the drawing module, it is possible to accelerate the write processing of the change area information. Also, the image transfer processing module transfers the image portion of the change area and the change area information, so compared to the case where the image data of the overall screen is transferred, it is possible to reduce the transferred data volume and to increase the transfer speed.

The image transfer processing module may transfer a first image stored in the transfer image storage area via the network to the image display device to make the image display device display a second image that is expanded from the first image on the screen of the image display device. The hook processing module may write, into the general purpose memory, transfer area information containing change area information and size information. The change area information indicates a change area that is an area within the transfer image storage area for which the first image is drawn according to the drawing command, and the size information indicates size of the second image on the screen of the image display device. The image transfer processing module may acquire the transfer area information stored within the general purpose memory, and transfer the transfer area information together with the first image acquired from the transfer image storage area to the image display device via the network.

According to this constitution, the first image before expansion and the transfer area information (change area information and size information) are transferred, so compared to the case where the second image after expansion is transferred, it is possible to reduce the transferred data volume and to increase the transfer speed.

The image transfer processing module may be constituted such that the hook processing module is loaded into the application program responsive to activation of the image transfer processing module, and the hook processing module is unloaded from the application program responsive to deactivation of the image transfer processing module.

According to this constitution, the hook processing module works only when image transfer processing is performed, so it is possible to prevent undesired execution of hook processing.

According to another aspect of the present invention, when the image transfer processing module is executing a specified image transfer process including at least a process of acquiring an image from the transfer image storage area, the hook processing module may wait in standby without starting processing according to the drawing command until the image transfer process is completed.

According to this constitution, when image transfer processing is being executed by the image transfer processing module, until that process is completed, the hook processing module is in standby without starting processing according to the drawing command, so it is possible to prevent the problem of the image within the transfer image storage area changing by redrawing by the hook processing module before transfer.

The image transfer processing module may set a transfer flag within the general purpose memory to an on state while the image transfer process is being executed, and sets the transfer flag to an off state after the image transfer process is completed. When the transfer flag is in the on state, the hook processing module may wait in standby without starting processing according to the drawing command until the transfer flag is turned off.

According to this constitution, it is possible to easily adjust the timing of the processing between the image transfer processing module and the hook processing module.

The hook processing module may write, into the general purpose memory, change area information for indicating a change area that is an area within the transfer image storage area for which an image is drawn according to the drawing command. The image transfer processing module may execute: (i) in the image transfer process, referencing the change area information stored within the general purpose memory, and acquiring the image within the image change area stored in the transfer image storage area, and (ii) transferring the acquired image together with the change area information to the image display device via the network.

According to this constitution, the change area information is written into the general purpose area by the hook processing module, so compared to the case where the change area information is written by the drawing module, it is possible to accelerate the writing processing of the change area information. Also, the image transfer processing module transfers the image of the change area and the change area information, so compared to the case where the image data of the overall screen is transferred, it is possible to reduce the transferred data volume, and to increase the transfer speed.

According to still another aspect of the present invention, the hook processing module may write, into the general purpose memory, first change area information for indicating a first change area that is an area within the transfer image storage area for which the image is drawn according to the specific drawing command, and supply to the drawing module the specific drawing command after processing the specific drawing command. The drawing module may draw an image into the frame memory according to a drawing command received from the application program or the hook processing module, and write, into the general purpose memory, second change area information for indicating a second change area that is an area within the frame memory for which the image is drawn according to the drawing command. The image transfer processing module may execute: (i) referencing the first and second change area information stored within the general purpose memory, and acquiring an image within an area of the second change area which is not contained in the first change area from the frame memory, (ii) acquiring an image within the first change area from the transfer image storage area without accessing the frame memory, and (iii) transferring the acquired images together with screen update area information to the image display device via the network, the screen update area information indicating a screen update area that is the total of the first and second change areas.

The area within the second change area that is not included in the first change area is not drawn by the hook processing module, but the image of this area is acquired from the frame memory, so it is possible to transfer the image without omissions.

According to another aspect of the present invention, the hook processing module may write, into the general purpose memory, first change area information for indicating a first change area that is an area within the transfer image storage area for which an image is drawn according to the specific drawing command, and supply to the drawing module the specific drawing command after processing the specific drawing command. The drawing module may draw an image into the frame memory according to a drawing command received from the application program or the hook processing module, and to write, into the general purpose memory, second change area information for indicating a second change area that is an area within the frame memory for which an image is drawn according to the drawing command. The image transfer processing module may execute: (i) referencing the first and second change area information stored within the general purpose memory, and acquiring from the frame memory an image within an area of the second change area which is not contained in the first change area, (ii) acquiring an image within an area of the second change area that is also contained in the first change area from the transfer image storage area without accessing the frame memory, and (iii) transferring the acquired images together with screen update area information to the image display device via the network, the screen update area information indicating a screen update area that is equivalent to the second change area.

With this constitution, the area within the second change area that is not included in the first change area is not drawn by the hook processing module, but the image of this area is acquired from the frame memory, so it is possible to transfer the image without omission.

The image transfer processing module may acquire the image within the area of the second change area that is not contained in the first change area from the frame memory to write the image into the transfer image storage area, and after the writing of the image, acquire the image within the screen update area from the transfer image storage area.

According to this constitution, when finally transferring the image via the network, it is possible to acquire the image from one transfer image storage area, so processing is simple.

According to another aspect of the present invention, the hook processing module may write, into the general purpose memory, first change area information for indicating a first change area that is an area within the transfer image storage area for which the image is drawn according to the specific drawing command, and supply to the drawing module the specific drawing command after processing the specific drawing command. The drawing module may draw an image into the frame memory according to a drawing command received from the application program or the hook processing module, and write, into the general purpose memory, second change area information for indicating a second change area that is an area within the frame memory for which the image is drawn according to the drawing command. The image transfer processing module may execute: (i) setting as a history area the first change area that exists in the transfer process during a specified preceding time period, and writing into the general purpose memory transfer history information for representing the history area, (ii) referencing the first and second change area information and the transfer history information stored in the general purpose memory, and acquiring from the frame memory an image within an area of the second change area that is not included in either the first change area or the history area, (iii) acquiring from the transfer image storage area an image within the first change area and an image within an area of the second change area that is not contained in the first change area and that is contained in the history area, without accessing the frame memory, and (iv) transferring the acquired images together with screen update area information to the image display area via the network, the screen update area information indicating a screen update area that is the total of the first and second change areas.

According to this constitution, the area within the second change area that is not included in either of the first change area or the history area is not drawn by the hook processing module, but this image is acquired from the frame memory, so it is possible to transfer the image without omission. Furthermore, the image part correlating to the first change area, and the image part correlating to the area within the second change area that is not included in the first change area and that is included in the history area are acquired from the transfer image storage area without accessing the frame memory, so it is possible to shorten the time required for acquiring these image parts.

According to still another aspect of the present invention, the hook processing module may write, into the general purpose memory, first change area information for indicating a first change area that is an area within the transfer image storage area for which the image is drawn according to the specific drawing command, and supply to the drawing module the specific drawing command after processing the specific drawing command. The drawing module may draw an image into the frame memory according to a drawing command received from the application program or the hook processing module, and write, into the general purpose memory, second change area information for indicating a second change area that is an area within the frame memory for which the image is drawn according to the drawing command. The image transfer processing module may execute: (i) setting as a history area the first change area that exists for the transfer process during a specified preceding time period, and writing into the general purpose memory transfer history information for representing the history area, (ii) referencing the first and second change area information and the transfer history information stored in the general purpose memory, and acquiring from the frame memory an image within an area of the second change area that is not included in either the first change area or the history area, (iii) acquiring from the transfer image storage area an image within an area of the second change area that is contained in at least one of the first change area and the history area without accessing the frame memory, and (iv) transferring the acquired images together with screen update area information to the image display area via the network, the screen update area information indicating a screen update area that is equivalent to the second change area.

With this constitution, the area within the second change area that is not included in either the first change area or the history area is not drawn by the hook processing module, but this image is acquired from the frame memory, so it is possible to transfer the image without omission. Furthermore, the image part correlating to the area within the second change area which is included in at least one of the first change area and the history area is acquired from the transfer image storage area without accessing the frame memory, so it is possible to shorten the time required for acquiring these image parts.

The image transfer processing module may acquire from the frame memory the image within the area of the second change area that is not contained in either the first change area or the history area to write the image into the transfer image storage area, and after the writing of the image, acquire the image within the screen update area from the transfer image storage area.

According to this constitution, when finally transferring the image via the network, it is possible to acquire the image from one transfer image storage area, so the processing is simple.

According to another aspect of the present invention, the drawing module may draw an image into the frame memory according to a drawing command received from the application program or the hook processing module, and the image transfer processing module has: a normal transfer mode for acquiring and transferring the image drawn in the transfer image storage area by the hook processing module when image drawing operation is performed, and a resend mode for acquiring and transferring the image drawn in the frame memory by the drawing module after the image drawing operation stops.

According to this constitution, after the image drawing operation has stopped, there is a resend mode for acquiring and transferring the image drawn in the frame memory by the drawing module, so even in a case when an image for which the image quality has slightly degraded is transferred in the normal transfer mode, it is possible to transfer a high image quality image after drawing operation has stopped.

The hook processing module may write, into the general purpose memory, first change area information for indicating a first change area that is an area within the transfer image storage area for which the image is drawn according to the specific drawing command, and the image transfer processing module may execute: in the normal transfer mode, setting the first change area as a resend area for which transfer is completed, and writing into the general purpose memory resend area information for representing the resend area, and in the resend mode, acquiring and transferring from the frame memory an image within at least part of the resend area.

According to this constitution, even when there is a difference between the image drawn within the transfer image storage area by the hook processing module according to the specific drawing command and the image drawn within the frame memory by the drawing module according to the same drawing command, it is possible to correctly transfer the image within the frame memory after drawing has stopped.

The image within at least part of the resend area may be an image part correlating to a specified size area within the resend area. The image transfer processing module may transfer the image part correlating to the specified size area within the resend area in the resend mode, and delete the specified size area from the resend area.

According to this constitution, the image for each area of a specified size is resent, so it is possible to shorten the time required for one time resend processing. Also, when drawing starts midway in the transfer processing of the resend mode over several times, it is possible to return to the normal transfer mode quickly, so there is no excessive delay of processing by the normal transfer mode.

The drawing module may write, into the general purpose memory, second change area information for indicating a second change area which is an area within the frame memory for which an image is drawn. The image transfer processing module may, in the normal transfer mode, (i) referencing the first and second change area information stored within the general purpose memory, and acquiring an image of an area within the second change area that is not included in the first change area from the frame memory; (ii) acquiring the image within the first change area from the transfer image storage area without accessing the frame memory, and (iii) transferring the acquired images together with screen update area information indicating a screen image area that is a sum of the first and second change areas to the image display device via the network.

Of the second change area, the area not included in the first change area is not drawn by the hook processing module, but the image of this area is acquired from the frame memory, so it is possible to transfer the image without omission.

The resend mode may include a full screen resend mode for transferring an entire image of a full screen area within the frame memory after a specified time has elapsed from when the image drawing operation stopped.

According to this constitution, after the image drawing operation has stopped, it is possible to reliably transfer the image of the full screen area within the frame memory.

The image transfer processing module may, in the full screen resend mode, divide the full screen area into a plurality of division areas of a specified size, and execute transfer of the entire image of the full screen area by transferring an image of one division area selected in sequence from among the plurality of division areas for each one time transfer process.

According to this constitution, the image for each division area of a specified size is resent, so it is possible to shorten the time required for one transfer process. Also, when drawing starts midway in the transfer process that is being performed across several times in the full screen resend mode, it is possible to return to the normal transfer mode quickly, so there is no excessive delay in processing due to the normal transfer mode.

The image transfer processing module may execute: compressing an image to be transferred in the normal transfer mode using a compression method selected from among a plurality of compression methods including a first compression method with relatively high image degradation and a second compression method with relatively low image degradation; registering as a resend area an area of the image that is compressed by the first compression method and transferred in the normal transfer mode, the resend area being an area of an image to be transferred in the resend mode; and compressing the image within the resend area using the second compression method and transferring the compressed image in the resend mode.

According to this constitution, the image compressed and transferred by a compression method for which the image degradation is large in the normal transfer mode is compressed and transferred by another compression method for which the image degradation is small in the resend mode, so it is possible to transfer high image quality images after drawing has stopped.

It is possible to realize various aspects of the present invention, such as an image display system, an image supply device and an image display device that constitute the image display system, the hook processing module and the image transfer processing module used for the image supply device, the image supply method, computer programs for realizing these methods or devices, and recording media on which these computer programs are recorded.

The aforementioned as well as other purposes, features, formats, and advantages of the present invention will be clear from the drawings and from the descriptions of preferred embodiments shown hereafter.

BRIEF DESCRIPTION OF THE DRAWINGS

FIG. 1 is an explanatory drawing showing the constitution of an image display system as an embodiment of the present invention.

FIG. 2 is a block diagram showing the internal constitution of a computer and a projector.

FIG. 3 is an explanatory drawing showing the hierarchical structure of the software and the hardware of a computer in a comparative example.

FIG. 5 is an explanatory drawing showing the structure of the screen update message.

FIG. 11 is an explanatory drawing showing the structure of the screen update message of the second embodiment.

FIG. 14 is an explanatory drawing showing the hierarchical structure of the software and the hardware of the computer for the third embodiment.

FIG. 25 is an explanatory drawing showing the hierarchical structure of the software and the hardware of the computer for the sixth embodiment.

FIGS. 26(A-1) through 26(A-3) and 26(B-1) through 26(B-3) illustrate an example of the two change area information A1 and A2 and the transfer history information HA1 for the sixth embodiment.

FIGS. 32(A) through 32(E) illustrate the relationship between the change areas and the history area and the screen update area at the time t1 for the sixth embodiment.

FIGS. 33(A-1) through 33(A-3) and 33(B-1) through 33(B-3) illustrate another example of the two change area information A1 and A2 and the transfer history information HA1 for the sixth embodiment.

FIGS. 36(A-1) through 36(A-3) and 36(B-1) through 36(B-3) illustrate another example of the two change area information A1 and A2 and the transfer history information HA1 for the seventh embodiment.

FIGS. 47(A) through 47(E) illustrate the contents of the resending process.

PREFERRED EMBODIMENTS OF THE INVENTION

Figure 4A:
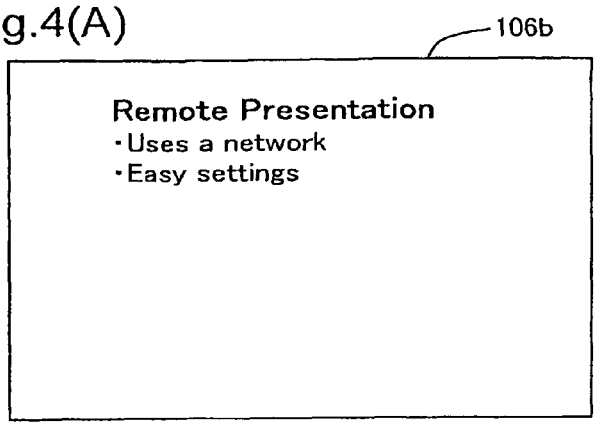
FIGS. 4(A) and 4(B) illustrate an example of the change area information and the image data storage area for the first embodiment.

Preferred embodiments of the present invention are described in the following order.
A. First Embodiment
B. Second Embodiment
C. Third Embodiment
D. Fourth Embodiment
E. Fifth Embodiment
F. Sixth Embodiment
G. Seventh Embodiment
H. Eighth Embodiment
I. Ninth Embodiment
J. Tenth Embodiment
K. Variation Examples A. First Embodiment FIG. 1 is an explanatory drawing showing the constitution of the image display system as an embodiment of the present invention. The image display system 10 comprises a personal computer 100 as the image supply device, a projector 200 as the image display device, and a network 300 for connecting the computer 100 and the projector 200. The computer 100 supplies images to the projector 200 via the network 300, and has functions for causing the projector 200 to project and display images on the projection display screen 70.

FIG. 2 is a block diagram showing the internal constitution of the computer 100 and the projector 200. The computer 100 comprises a CPU 102, a ROM 104, a RAM 106 as the general purpose memory (also called "system memory"), a hard disk drive 108, an input unit 110 including a keyboard and pointing device, a network interface unit 112, a VRAM 114 as the frame memory, a graphic controller 116, a display device 118 such as a liquid crystal display, and a bus 120 for connecting these elements.

Stored in the RAM 106 are various types of computer programs including an application program 122, a graphics device interface (GDI) 124, a display driver 126, a projector driver 128, and a VNC server 130 as the image transfer processing module. Note that the GDI 124, the display driver 126, and the projector driver 128 function as part of the operating system. In this embodiment, the operating system is assumed to be Windows (registered trademark) offered by Microsoft Corp. These various types of computer programs are provided in a format recorded on a computer readable recording medium such as a flexible disk, and CD-ROM.

The projector 200 comprises a CPU 202, a ROM 204, a RAM 206, an input unit 210 including various types of operating buttons, a network interface unit 212, an image processing unit 214, a projection unit 216 including a light source lamp, a liquid crystal panel, and a projection optical system, and a bus 218 for connecting these various elements. Stored in the ROM 204 are various types of computer programs including an image processing driver 228 and a VNC client 230.

Following, first, before describing the functions of the computer 100 for the first embodiment, the functions of a conventional computer using a VNC server will be described as a comparative example.

FIG. 3 is an explanatory drawing showing the hierarchical structure of the software and the hardware of the computer for a comparative example. The application program 122 and the VNC server 130 belong to the application program layer (also called the "user application program layer"). The GDI 124, the display driver 126, and the projector driver 128 belong to the kernel layer. The RAM 106 as the general purpose memory, the network interface unit 112, the VRAM 114, the graphic controller 116, and the display device 118 belong to the hardware layer.

With the comparative example and the first embodiment, described is a case using a presentation program (e.g. Microsoft's PowerPoint) as the application program 122.

The application program 122 issues various types of drawing requests to the GDI 124. The GDI 124 is a computer program for generally controlling drawing operations for display devices (the display device 118 of the computer 100 or the projector 200), printing devices (not illustrated), and the like. As is well known, the GDI 124 provides an application program interface (API) relating to drawing operations called the "GDI function" to various types of application programs. Generally, API means a collection of procedures for allowing the application programs to use the various functions of the operating system.

The application program 122 issues a request or command to draw an image of a presentation sheet included in a presentation file, for example, to the GDI 124. Normally, included in the drawing request or drawing command is information relating to the output destination for the image (specifically, information specifying to output the image to the display device or to output to the printing device).

It is also possible to use another general purpose API for drawing operations instead of the GDI 124. A "general purpose API for drawing operations" means an API which can be used in common on several application programs.

The GDI 124, the display driver 126, and the projector driver 128 overall function as a drawing module for executing drawing processing according to the drawing commands. In specific terms, the GDI 124 receives drawing requests output from the application program 122, checks the output destination for the image based on that drawing request, and if that output destination is the display device, hands over the drawing request to the display driver 126 and the projector driver 128.

The display driver 126 draws image data within the VRAM 114 according to the received drawing request. As is well known, as drawing requests, these are not limited to requests for drawing the entire screen, but also includes various requests for drawing part of the screen. When the drawing request for drawing a part of the screen is received, the display driver 126 draws only the image part of the area subject to drawing (also called the "change area") within the VRAM 114. The graphic controller 116 displays the image in the display device 118 based on the image data (specifically, bit map data) drawn within the VRAM 114. Meanwhile, the projector driver 128 writes into the RAM 106 the change area information 106a representing the position and the size of the area within the VRAM 114 according to the drawing request received from the GDI 124. The area subject to the drawing operation will be called the "change area" because the image of this area is to be changed by the drawing operation.

Figure 4B:
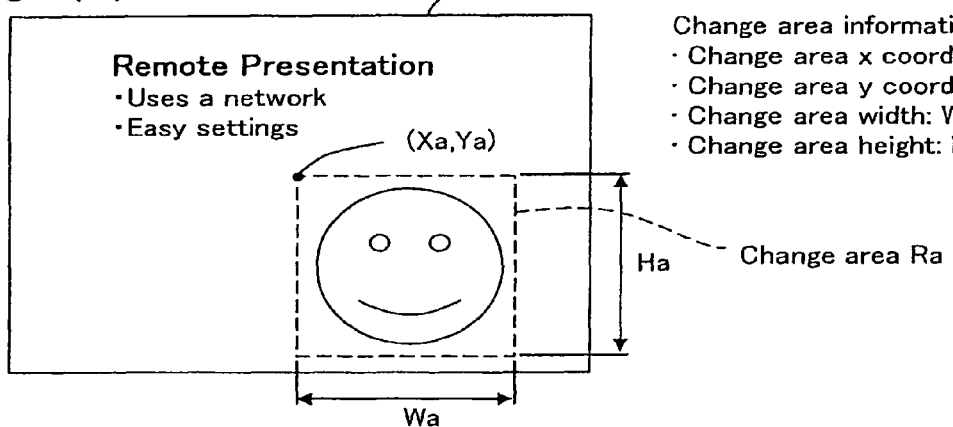

FIGS. 4(A) and 4(B) illustrate an example of the change area information 106a and the image data storage area 106b within the RAM 106. Here, assumed is an example of the image to be projected and displayed by the projector changing as shown in from FIG. 4A to FIG. 4B. As will be described later, the image data transferred from the VRAM 114 by the VNC server 130 is stored in the image data storage area 106b. The image data storage area 106b preferably has the same data capacity as the VRAM 114 (frame memory).

The change area Ra is the area of the image part drawn by the drawing command when changing the image from FIG. 4(A) to FIG. 4(B). The change area information 106a relating to this change area Ra includes the x coordinate Xa and the y coordinate Ya of the reference point (normally the upper left point) of the change area Ra, and the width Wa and the height Ha of the change area Ra. The coordinates (Xa and Ya) of the reference point are data indicating the position of the change area Ra, and the width Wa and the height Ha are data indicating the size of the change area Ra.

The VNC server 130 references the change area information 106a within the RAM 106, and transfers the image data of the change area Ra from the VRAM 114 to the image data storage area 106b within the RAM 106. This image data storage area 106b is a memory area of a size that is equal to the display resolution of the computer 100 or the projector 200, for example. The VNC server 130 further reads the image data of the change area Ra from the image data storage area 106b, and creates a screen update message including the change area information 106a of the change area Ra and its image data.

FIG. 5 is an explanatory drawing showing the constitution of the screen update message. This screen update message complies with the structure of the "Frame Buffer Update" stipulated in the VNC protocol. The screen update message comprises a message header part indicating the type of message and a parameter part indicating the message parameters.

The message header part includes a message type (1 byte) indicating the message type and a change area count (2 bytes) indicating the number of change areas. The message type data value indicating the screen update message is "0." The change area count data value is normally set to "1." However, when the change area information 106a relating to the plurality of change areas within the RAM 106 remains as unprocessed, it is also possible to form the screen update message so as to have the screen update message include information (change area information and image data) relating to these plurality of change areas. The change area information included in the screen update message is also called "screen update area information." The message type data and the change area count data are segmented via 1 byte of padding.

Included in the parameter part are the x coordinate (2 bytes) and the y coordinate (2 bytes) of the reference point of the change area, the width (2 bytes) and the height (2 bytes) of the change area, the encoding formation (4 bytes) during transfer of the change area image data, and the change area image data (n bytes). As the encoding format, predetermined formats such as the JPEG format (data value "7") and the like may be used.

The VNC server 130 transfers the screen update message created in this way via the network interface unit 112 to the projector 200.

In this way, with the comparative example shown in FIG. 3, after first transferring image data from the VRAM 114 to the RAM 106 which is the general purpose memory, the image data within the RAM 106 is transferred to the projector 200. To do this, significant time was required to transfer from the VRAM 114 to the RAM 106, and there were cases when it was not possible to obtain sufficient transfer speed.

Figure 6:
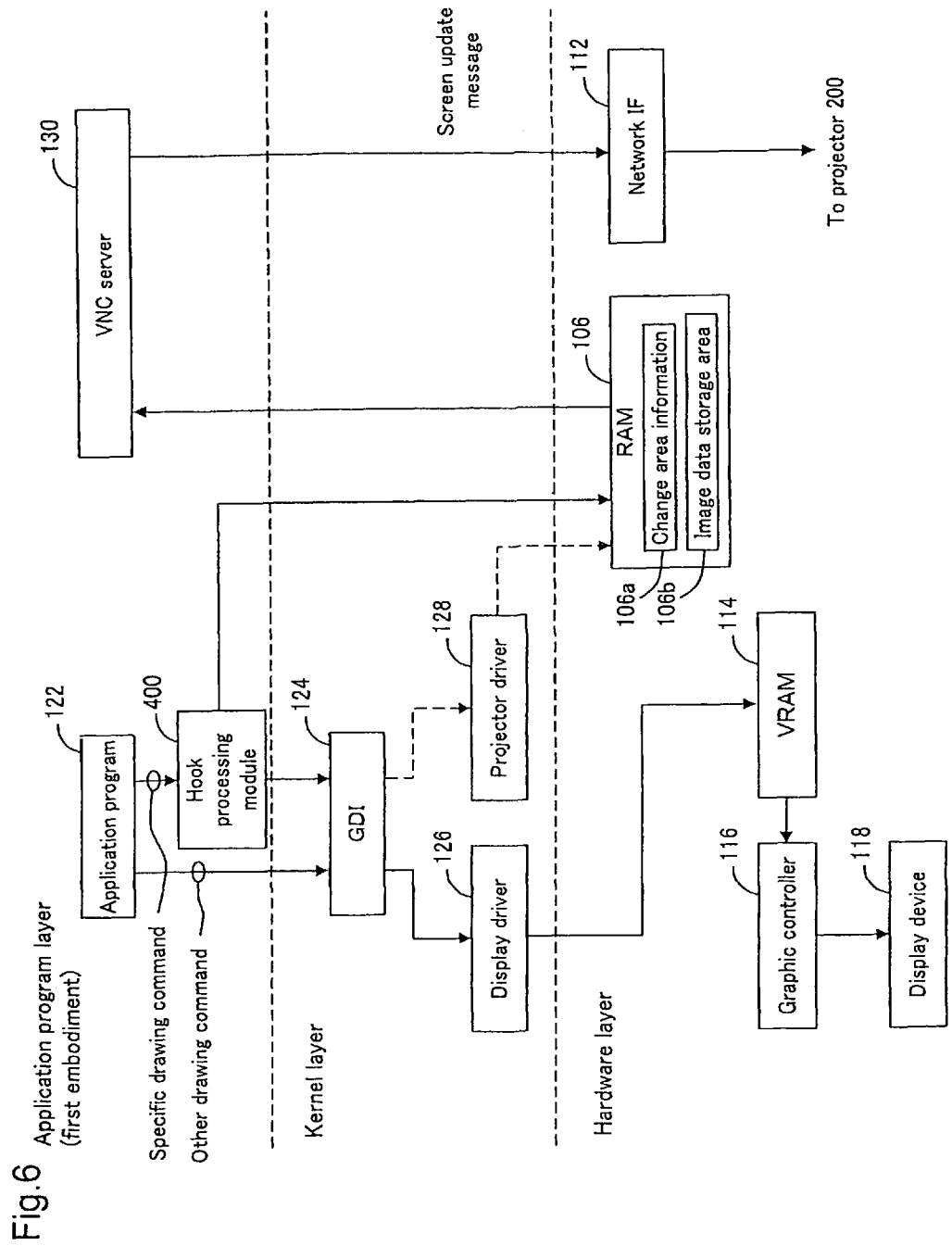
FIG. 6 is an explanatory drawing showing the hierarchical structure of the software and the hardware of the computer of the first embodiment.

FIG. 6 is an explanatory drawing showing the hierarchical structure of the software and the hardware of the computer for the first embodiment.

The difference from the comparative example shown in FIG. 3 is that the hook processing module 400 is added between the application program 122 and the GDI 124, and the rest of the constitution is the same as in FIG. 3. The hook processing module 400 hooks and preempts a specific drawing command issued by the application program 122, and executes the processing described later. The hook processing module 400 is preferably formed exclusively for each application program so as to hook only the appropriate specific drawing commands according to the application program 122.

It is also possible to consider the hook processing module 400 as one more type of drawing API, but it is differentiated from a general purpose drawing API such as the GDI 124. Specifically, the hook processing module 400 is different in that it is formed so as to process only specific drawing commands while the GDI 124 processes all the drawing commands.

The hook processing module 400 is loaded or installed into the application program 122 as a DLL (dynamic link library), for example. Generally, the application program is operated as a unit called a "process." Also, during execution of the application program, the plurality of modules (GDI32.DLL, Kernel32.DLL or the like) are loaded into that process, and the application program performs various operations by using the functions within those modules. The "loading" of the hook process module 400 means incorporating into the application program 122 the module 400 implementing the hook procedure.

When the hook processing module 400 is loaded, the function address of the specific drawing command issued from the application program is replaced by another function address for executing unique functions of the hook process module 400. According to these unique functions, the write process (described later) of the change information and the image data to the RAM is executed, after which the normal GDI function is executed. When unloading the hook processing module 400, the function address that was switched during loading was returned to the original, and the hook processing module 400 loaded within the process is unloaded.

The hook processing module 400 may be loaded and unloaded to the application program 122 at any time as necessary. However, it is preferable to constitute the VNC server 130 so that when the VNC server 130 is activated, the hook processing module 400 is loaded to a specific application program 122 during operation (with this embodiment, the presentation program), and when the VNC server 130 is ended, the hook processing module 400 is unloaded. By doing this, it is possible to operate the hook processing module 400 only during times when the VNC server 130 is executing, so it is possible to avoid the drawing command being hooked when the VNC server 130 is not executing (not activated) on the computer 100, causing an undesirable result. With this embodiment, the phrase, "the VNC server 130 is executing on the computer 100" means that the process of the VNC server 130 is activated.

Figure 7:
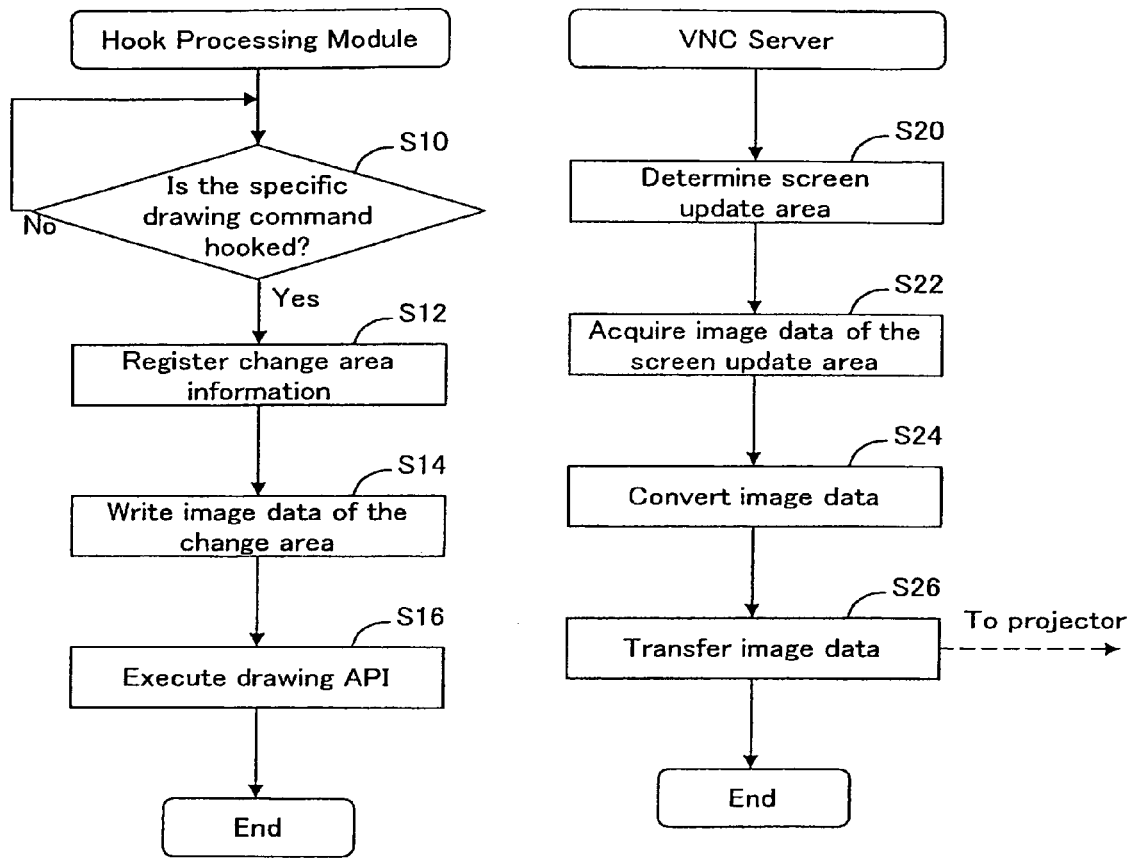
FIG. 7 is a flow chart showing the operation of the hook processing module and the VNC server for the first embodiment.

FIG. 7 is a flow chart showing the operation of the hook processing module 400 and the VNC server 130 for the first embodiment. The steps S10 to S16 are executed by the hook processing module 400, and the steps S20 to S26 are executed periodically by the VNC server 130.

When a specific drawing command is issued from the application program 122, the hook processing module 400 hooks that drawing command at step S10 and acquires that drawing command instead of the GDI 124. It is preferable that all the drawing commands are not hooked, and that only a limited number of specific drawing commands be hooked by the hook processing module 400. The reason for this is that there is a large number of drawing commands issued by the application program 122, so if all of these are hooked, the processing speed will in fact decrease, and it is possible that the desired drawing will not be able to be performed.

At step S12, processing for registering the change area information is executed according to the acquired drawing command. In specific terms, the hook processing module 400 acquires the position and the size of the area (change area Ra of FIG. 4(B)) for which drawing operation is performed according to the drawing command, and executes direct writing processing of the change area information 106a representing that change area onto the RAM 106.

At step S14, the process of writing the image data of the change area Ra is executed. In specific terms, the hook processing module 400 produces the image data within the change area Ra according to the drawing command, and directly write that image data to the image data storage area 106b within the RAM 106.

At step S16, the normal GDI function is called by the hook processing module 400 so as to execute drawing processing according to the drawing command acquired by the hook processing module 400 at step S10. The display driver 126 and the projector driver 128 (FIG. 6) each execute processing according to the drawing commands received from the GDI 124 in the same way as the comparative example shown in FIG. 3. However, with this embodiment, the VNC server 130 is formed so as not to use the change area information created by the projector driver 128. In FIG. 6, the fact that the arrows in front and back of the projector driver 128 are drawn using dotted lines has this meaning.

Meanwhile, the VNC server 130 determines the area of the image data to be transferred to the projector 200 (called the "screen update area") at step S20. In specific terms, the VNC server 130 acquires the change area information 106a within the RAM 106 (FIG. 4(B)), and sets the change area Ra as the screen update area. However, when there is unprocessed change area information 106a relating to a plurality of change areas within the RAM 106, the total area of the plurality of change area may be set as the screen update area.

Figure 8A:
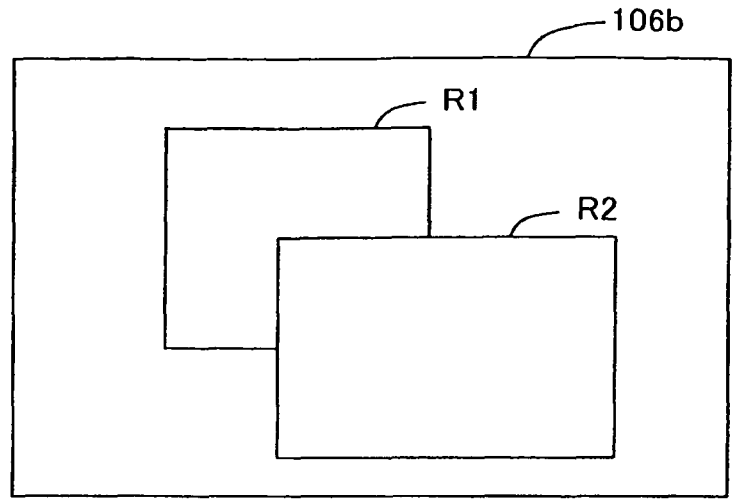
FIGS. 8(A) and 8(B) illustrate the relationship between a plurality of change areas and the screen update area.
Figure 8B:
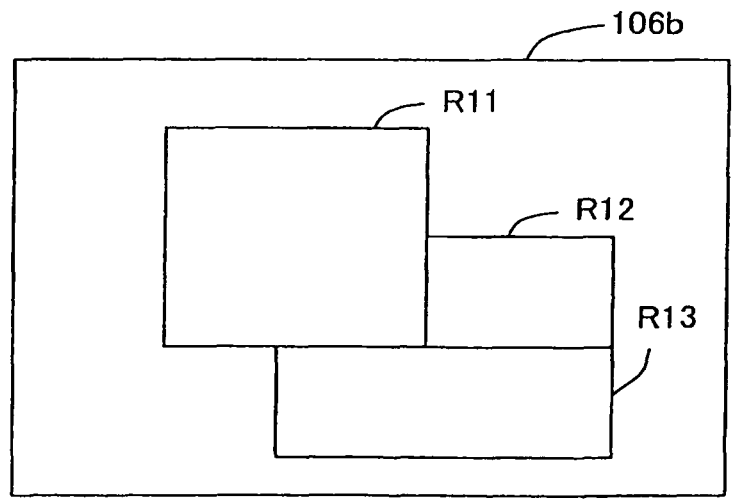

FIGS. 8(A) and 8(B) illustrate the relationship between the plurality of change areas and the screen update area. Here, as shown in FIG. 8(A), a case is considered when there are two change areas R1 and R2 that mutually overlap. At this time, first, as shown in FIG. 8(B), the total area of the change areas R1 and R2 are separated into rectangular areas R11 to R13 that are adjacent but do not overlap with each other. Then, the collection of these rectangular areas R11 to R13 is used as the screen update area. By using this kind of screen update area R11 to R13, it is possible to avoid repeated transfer of image data for the part that overlaps for the change areas R1 and R2, so it is possible to reduce the data transfer volume. When the plurality of change areas do not overlap with each other, these are used as is as the screen update areas.

At step S22, within the image data storage area 106b of the RAM 106, the image data of the image part correlating to the screen update area is acquired. Then, at step S24, that image data is converted according to a preset encoding format. At step S26, the screen update message (FIG. 5) that includes the converted image data and change area information is created, and this is transferred to the projector 200 via the network interface unit 112.

When the network interface unit 212 of the projector 200 (FIG. 2) receives the communication data supplied via the network 300, it fetches the screen update message contained in this communication data and passes it on to the VNC client 230. The VNC client 230 passes the image data contained in the screen update message to the image processing driver 228. The image processing driver 228 controls the image processing unit 214 according to this image data, and expands the image data to the display memory (not illustrated) within the image processing unit 214 by the image processing unit 214. As a result, the projector 200 is able to display the image on the projection display screen 70 as shown in FIG. 1.

In this way, with the first embodiment, the hook processing module 400 hooks and preempts a specific drawing command and is made to execute the write process of the change area image data directly to the RAM 106. As a result, it is possible to save the time required for transferring the image data from the VRAM 114 to the RAM 106 in the comparative example shown in FIG. 3. As a result of this, there is the advantage that it is possible to make the transfer speed sufficiently fast when transferring the image data to the projector 200.

With a generally used personal computer architecture, data transfer from the RAM 106 to the VRAM 114 is executed at very high speed, while data transfer from the VRAM 114 to the RAM 106 is several times slower. With the first embodiment, it is possible to reduce the low speed data transfer from the VRAM to the RAM, thereby significantly reducing the time required for transferring the image data to the projector 200.

B. Second Embodiment

Figure 9:
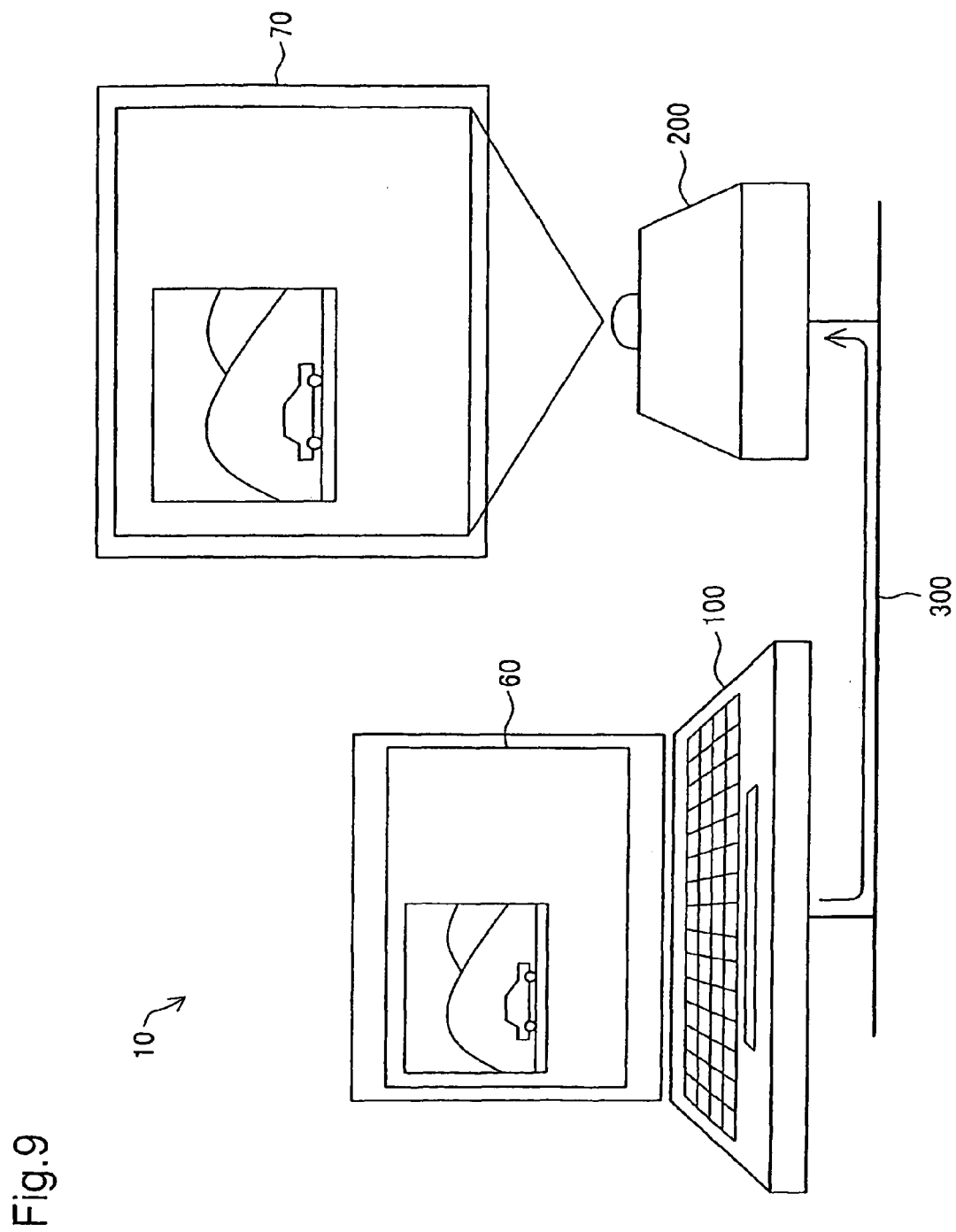
FIG. 9 is an explanatory drawing showing the constitution of the image display system as the second embodiment of the present invention.

FIG. 9 is an explanatory drawing showing the constitution of the image display system as the second embodiment of the present invention. With the second embodiment, a case of using a moving image replay program that can perform moving image replay (e.g. Microsoft's Windows Media Player) as the application program is described. One feature of the second embodiment is that it is possible to set a different size from the size of the image that is actually displayed on the projection display screen 70 from the size of the image that is transferred to the projector 200 via the network 300.

The constitution of the hardware and the software of the second embodiment is the same as the constitution of the first embodiment shown in FIG. 2 and FIG. 6. The following are the three points of difference between the second embodiment and the first embodiment.

(1) With the second embodiment, a hook processing module 400 suitable for hooking a specific drawing command of the moving image replay program is used.

(2) The change area information and the image data stored in the RAM 106 are different from those of the first embodiment.

(3) The constitution of the screen update message is different from that of the first embodiment.

Figure 10:
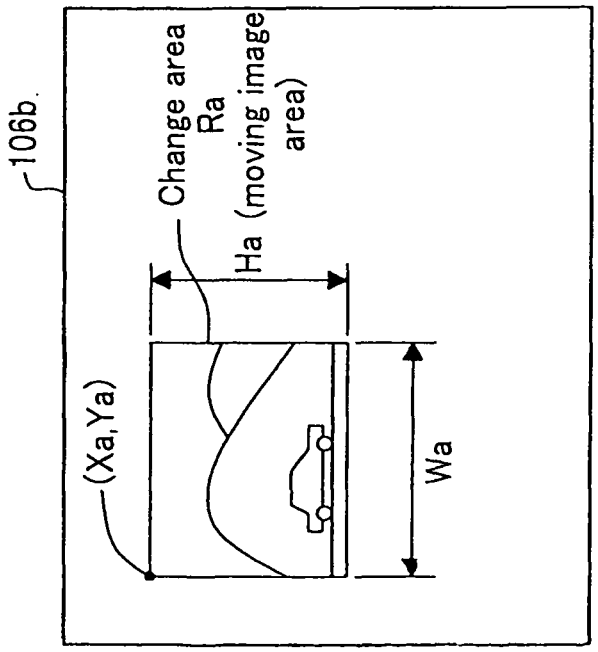
FIG. 10 is an explanatory drawing showing an example of the change area information and the image data storage area of the second embodiment.

FIG. 10 shows an example of the change area information 106a and the image data storage area 106b for the second embodiment. Here, it is assumed that a moving image is replayed within the moving image area using the moving image replay program. The hook processing module 400 draws images of the moving image area within the image data storage area 106b according to the drawing commands issued sequentially at specified time intervals from the moving image replay program.

By indicating the expansion/contraction rate of an image on the application program 122, the user is able to expand or contract the moving image and display it on the computer 100 and the projector 200. However, even when expanding or contracting a moving image, the hook processing module 400 continues the process of writing the original size image data to the image data storage area 106b within the RAM 106.

The change area information 106a for the second embodiment, in addition to the contents of the change area information of the first embodiment shown in FIG. 5, has the change area Ra (moving image area) image type and the image width and image height after expansion/contraction. Here, the "image type" is the parameter indicating whether or not the image is expanded or contracted during display. For example, on the screen of the computer 100 and the projector 200, when expanding or contracting the moving image compared to the original size (specifically, the size of the change area Ra) for display, the image type value is set to "1," and when displaying at an equal size, the image type value is set to "0." The width and height of the image after expansion/contraction indicate the size of the image when displayed expanded or contracted. For example, when expanding to two times, the width and height after expansion/contraction are each two times the change area Ra width Wa and height Ha.

The added information (image type, and image width and height after expansion/contraction) for the change area information 106a of the second embodiment is size information indicating the size of the image that is projected and displayed on the projector 200. Specifically, the change area information 106a of the second embodiment includes change area information indicating the position and the size of the change area Ra, and size information indicating the size of the image after expansion/contraction, and the information 106a indicates the position and the size of the image area transferred to the projector 200. Therefore, the change area information of the second embodiment may be called "transfer area information."

FIG. 11 is an explanatory drawing showing the structure of the screen update message transferred from the VNC server 130 to the projector 200 for the second embodiment. This screen update message has the contents of the screen update message of the first embodiment shown in FIG. 5 with the addition of the image type of the change area Ra as well as the width and height of the image after expansion/contraction.

The projector 200 receives this screen update message and displays the image at the size indicated by the width and height after expansion/contraction onto the projection display screen 70. At this time, when the image type included in the screen update message indicates an equal size image (data value "0"), the image data contained in the screen update message is stored as is in the display memory within the projector. Meanwhile, when the image type indicates an expanded/contracted image (data value "1"), the image data contained in the screen update message is expanded or contracted to be the indicated width or height and stored in the display memory. The image processing unit 214 of the projector 200 drives the projection unit 216 based on the image data (specifically, bit map data) stored in the display memory, and the image can be projected and displayed by the projection unit 216.

Figure 12A:
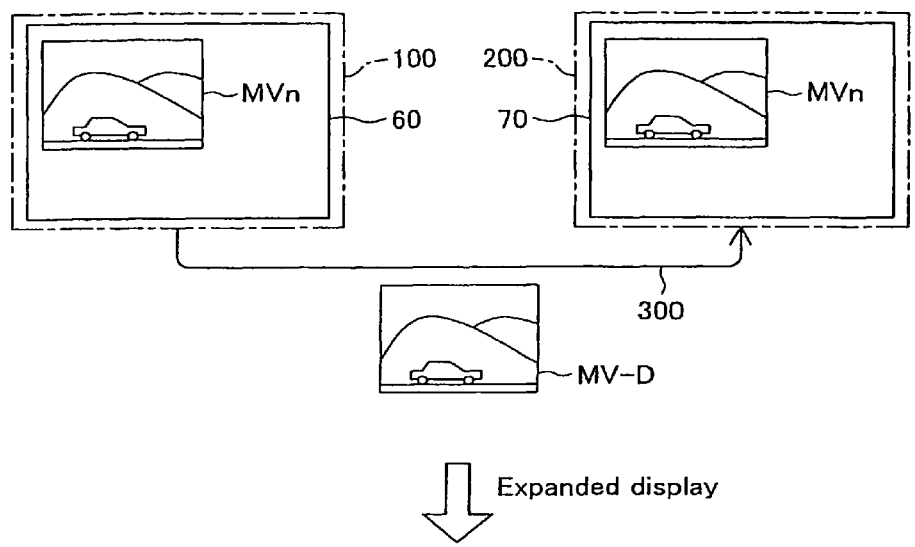
FIGS. 12(A) and 12(B) illustrate the operation of the second embodiment.
Figure 12B:
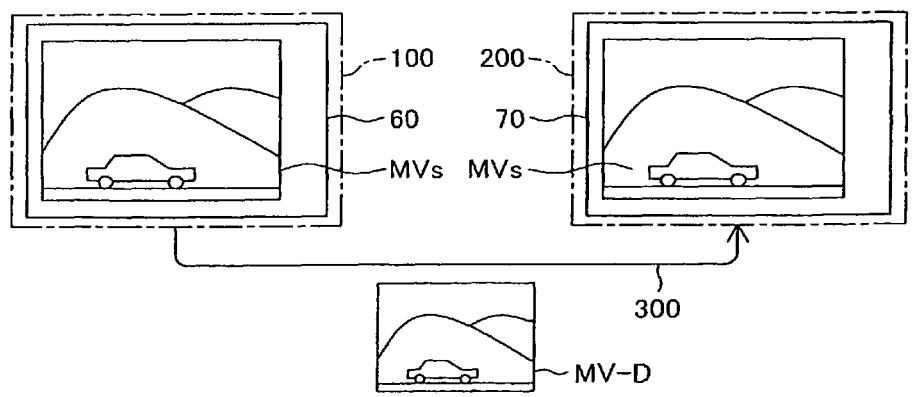

FIGS. 12(A) and 12(B) are explanatory drawings showing the operation of the image display system of the second embodiment. With the second embodiment, as shown in FIG. 12(A), when the moving image MVn is displayed on the display screen 60 of the computer 100, the image data MV-D of each frame of this moving image MVn is sent via the network 300, and this moving image MVn is displayed on the projection display screen 70 by the projector 200. Then, as shown in FIG. 12(B), when the user sets an expansion factor and the expanded moving image MVs is displayed on the display screen 60, an expanded moving image MVs is also displayed on the projection display screen 70 by the projector 200. At this time, the image data of each frame of the expanded moving image MVs sent via the network 300 from the computer 100 is not image data for which the image data MV-D of each frame is expanded, but is the original image data MV-D of each frame before expansion. As a result, the data volume actually sent via the network 300 is less than when sending image data after expansion, making it possible to suppress an increase in network traffic, and making it possible to significantly improve the response. As a result, when expanding and displaying a moving image, it is possible to prevent an excessive reduction in the number of frames of the moving image, and to display the moving image smoothly.

C. Third Embodiment

Figure 13A:
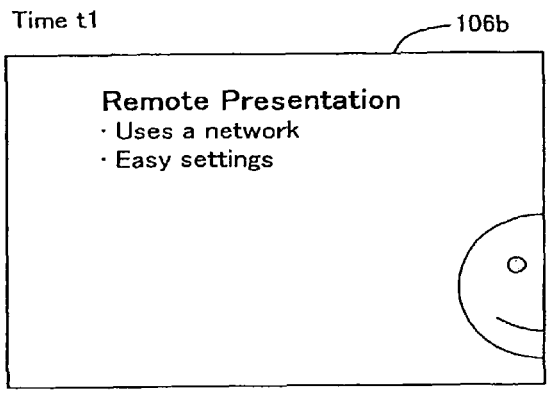
FIGS. 13(A) through 13(C) illustrate an example of the change area information and the image data storage area for the third embodiment.
Figure 13B:
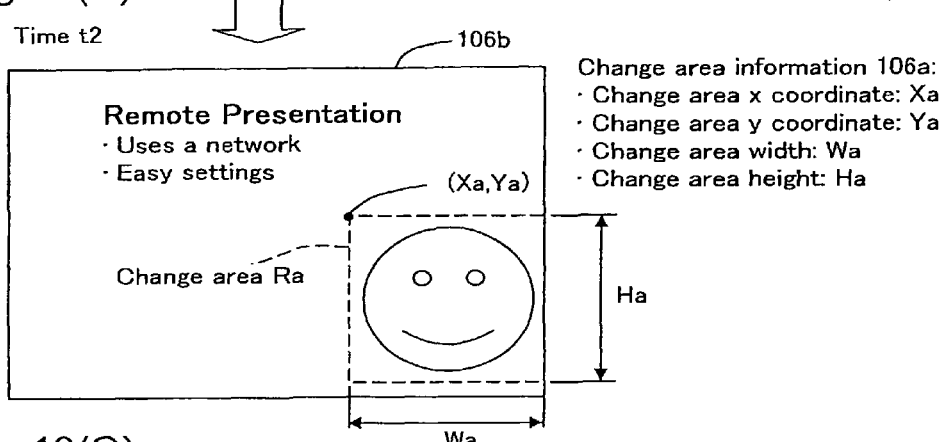
Figure 13C:
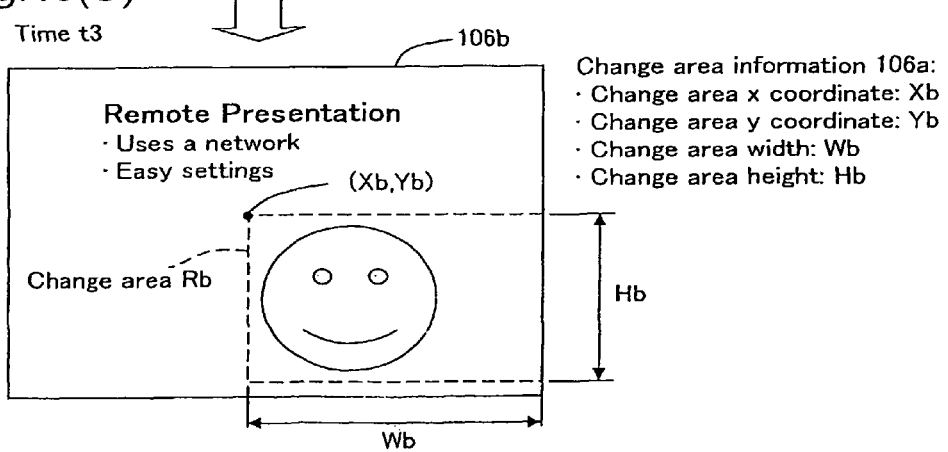

FIGS. 13(A) to 13(C) are explanatory drawings showing examples of the change area information 106*a* and the image data storage area 106*b* within the RAM 106 assumed for the third embodiment. The overall device structure is the same as that shown in FIG. 1 and FIG. 2 described for the first embodiment. Here, assumed is an example for which an image of a face moves in sequence to the left as shown in FIG. 13(A) to FIG. 13(C). This kind of image movement is realized using an animation effect prepared in advance by a presentation program, for example. With the comparative example (FIG. 3), the image data is acquired from the VRAM 114 by the VNC server 130 and stored in the image data storage area 106*b* of the RAM 106.

The change area Ra shown in FIG. 13(B) is the area of the image part drawn by the drawing command when the image is moved in the state shown from FIG. 13(A) to FIG. 13(B). The change area information 106*a* relating to this change area Ra includes the x coordinate Xa and the y coordinate Ya of the reference point (normally the upper left point) of the change area Ra as well as the width Wa and the height Ha of the change area Ra. The reference point coordinates (Xa, Ya) are data indicating the position of the change area Ra, and the width Wa and the height Ha are data indicating the size of the change area Ra.

The change area Rb shown in FIG. 13(C) is the area of the image part drawn by the drawing command when the image is moved in the state shown in FIG. 13(B) to FIG. 13(C). The change area information 106*a* of the change area Rb is also formed from the data Xb and Yb which indicate the position of the change area Rb and of the data Wb and Hb that show the size.

For example, with the state at time t2 shown in FIG. 13(B), the VNC server 130 references the change area information 106*a* within the RAM 106, and the image data of the change area Ra is transferred from the VRAM 114 to the image data storage area 106*b* within the RAM 106. This image data storage area 106*b* is a memory area of equal size to the display resolution of the computer 100 or the projector 200, for example. The VNC server 130 further reads the image data of the change area Ra from the image data storage area 106*b* and creates the screen update message containing the change area information 106*a* and the image data of the change area Ra. The same processing is executed at time t3 in FIG. 13(C) as well.

The VNC server 130 transfers the screen update message created in this way to the projector 200 via the network interface unit 112.

With the comparative example shown in FIG. 3, after the image data stored once in the VRAM 114 is transferred to the RAM 106 which is general purpose memory, the image data within the RAM 106 is transferred to the projector 200. To do this, a significant amount of time was required to transfer from the VRAM 114 to the RAM 106, and there were cases when sufficient transfer speed could not be obtained.

FIG. 14 is an explanatory drawing showing the hierarchical structure of the software and the hardware of the computer for the third embodiment.

The difference from the comparative example of FIG. 3 is that the hook processing module 400 is added between the application program 122 and the GDI 124, and that a transfer flag 106*c* is set within the RAM 106, and the rest of the constitution is the same as that in FIG. 3. The difference from the first embodiment shown in FIG. 6 is the point that the transfer flag 106*c* is added, and the rest of the constitution is the same as that of the first embodiment.

Figure 15:
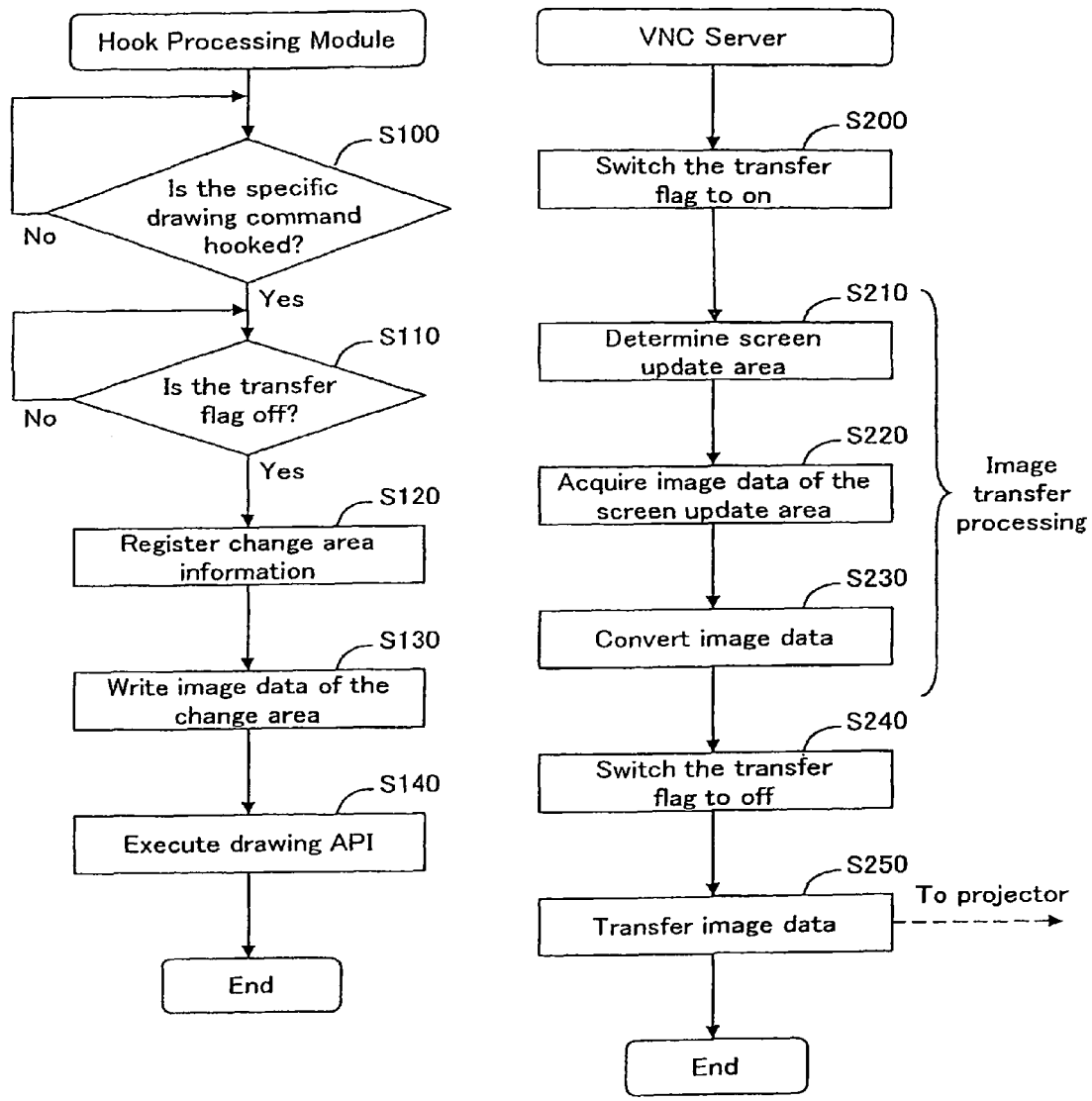
FIG. 15 is a flow chart showing the operation of the hook processing module and the VNC server for the third embodiment.

FIG. 15 is a flow chart showing the operation of the hook processing module 400 and the VNC server 130 of the third embodiment. Steps S100 to S140 are executed by the hook processing module 400, and steps S200 to S250 are executed periodically by the VNC server 130. The hook process module steps S100, S120, S130, and S140 are approximately the same processes as the steps S10, S12, S14, S16 of FIG. 7, and with FIG. 15, the step S110 is added. The VNC server steps S210, S220, S230, and S250 are approximately the same processes as the steps S20, S22, S24, S26 of FIG. 7, and with FIG. 15, the steps S200 and S240 are added.

When a specific drawing command is issued from the application program 122, the hook processing module 400 hooks that drawing command at step S100 and acquires that drawing command instead of GDI 124.

At step S110, a determination is made of whether the transfer flag 106*c* within the RAM 106 (FIG. 14) is in an off state. This transfer flag 106*c* is a flag that is set to an on state when a specified image transfer process (steps S210 to S230 described later) is being executed by the VNC server 130. When the transfer flag 106*c* is in an on state, the hook processing module 400 waits until the transfer flag 106*c* turns off. During this waiting, the hook processing module 400 confirms the transfer flag 106*c* with a pre-set time interval. When the transfer flag 106*c* is in an off state, the process moves to step S120 and processing starts.

At step S120, processing for registering the change area information is executed according to the acquired drawing command. In specific terms, the hook processing module 400 acquires the position and the size of the area at which the drawing is performed according to the drawing commands (e.g. the change area Ra of FIG. 13(B)), and the change area information 106*a* representing that change area is written directly to the RAM 106.

At step S130, write processing of the image data of the change area is executed. In specific terms, at time t2 shown in FIG. 13(B), the hook processing module 400 produces the image data within the change area Ra according to the drawing command, and that image data is written directly to the image data storage area 106*b* within the RAM 106.

At step S140, the hook processing module 400 calls the normal GDI function to execute drawing processing according to the drawing command acquired at step S100. The display driver 126 and the projector driver 128 (FIG. 14) execute each process according to the drawing command received from the GDI 124, the same way as with the comparative example shown in FIG. 3. However, with the third embodiment, the VNC server 130 is constituted so as not to use the change area information created by the projector driver 128. In FIG. 14, this is signified by the fact that the arrow mark is drawn using a dotted line before and after the projector driver 128.

Meanwhile, the VNC server 130 first switches the transfer flag 106*c* to an on state at step S200, and then starts the processes of the steps S210 to S230 described below (called "image transfer processing").

The VNC server 130 determines the area of the image data to be transferred to the projector 200 (called the "screen update area") at step S210. In specific terms, for example in the state at time t2 in FIG. 13(B), the VNC server 130 acquires the change area information 106*a* within the RAM 106 and sets the change area Ra as the screen update area. However, when there is unprocessed change area information 106*a* relating to a plurality of change areas within the RAM 106, the area correlating to the total area of the plurality of change areas is set as the screen update area.

Figure 16A:
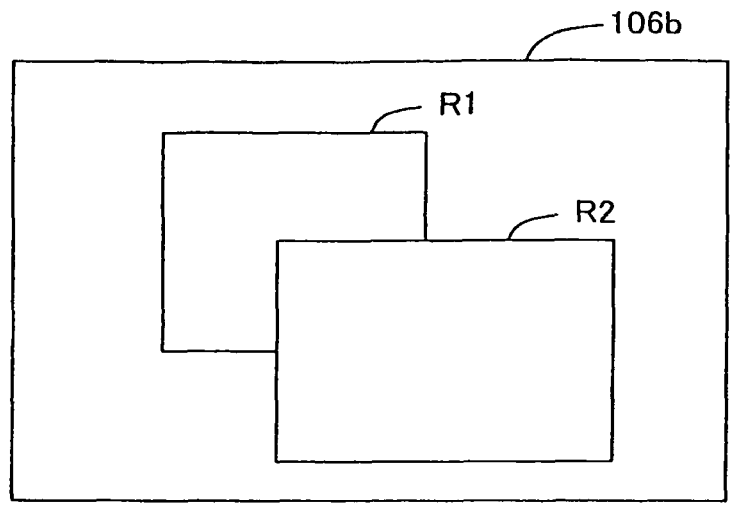
FIGS. 16(A) and 16(B) illustrate the relationship between the plurality of change areas and the screen update area for the third embodiment.
Figure 16B:
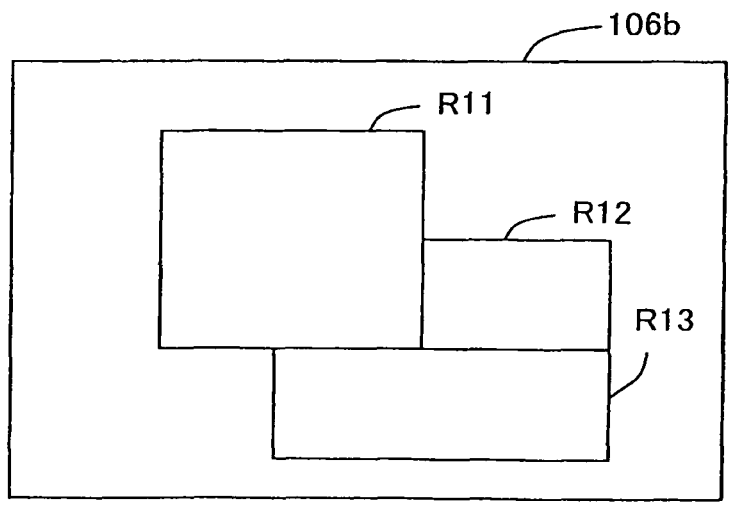

FIGS. 16(A) and 16(B) illustrate the relationship between the plurality of change areas and the screen update area. Here, as shown in FIG. 16(A), a case can be considered of two change areas R1 and R2 that are different from each other existing. At this time, first, as shown in FIG. 16(B), the total area of the change areas R1 and R2 is separated into adjacent and non-overlapping rectangular areas R11 to R13. Then, the collection of these rectangular areas R11 to R13 is used as the screen update area. By using this kind of screen update area R11 to R13, it is possible to avoid repeated transfer of the image data of the part at which the change areas R1 and R2 overlap, so it is possible to reduce the data transfer volume. When the plurality of change areas do not overlap with each other, those are used as is as the screen update areas.

At step S220, the image data of the image part that correlates to the screen update area within the image data storage area 106b of the RAM 106 is acquired. Then, at step S230, that image data is converted according to a preset encoding format.

When the image transfer processing of steps S210 to S230 ends, at step S240, the VNC server 130 switches the transfer flag 106c to an off state. At step S250, the screen update message (FIG. 5) containing the converted image data and the conversion area information is created, and this is transferred to the projector 200 via the network interface unit 112.

While the image transfer processes of steps S210 to S230 are being executed by the VNC server 130, the transfer flag 106c is maintained in an on state, so it is not possible for the hook processing module 400 to execute processes (steps S120 to S140) according to the drawing commands, and it is in a standby state. The advantage of this will be described later.

Figure 17:
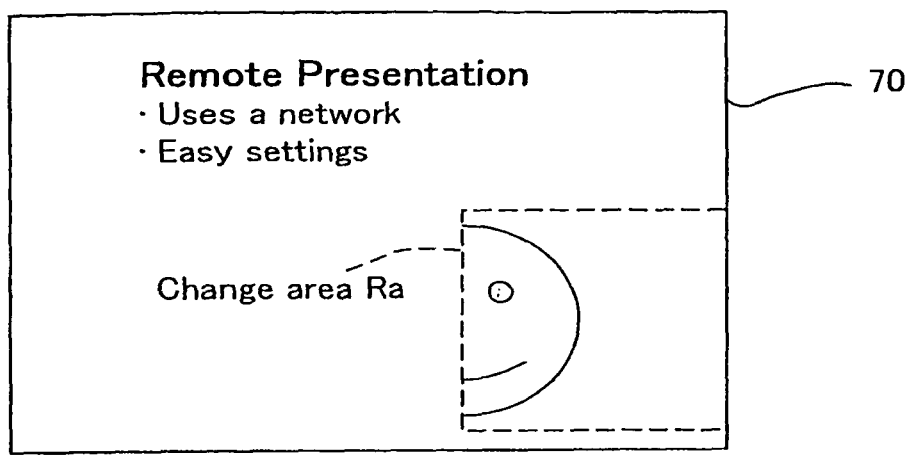
FIG. 17 is an explanatory drawing showing an example of problems when the transfer flag 106c is not used.

With the procedure in FIG. 15, the reason that the processes of the hook processing module 300 and the VNC server 130 are mediated using the transfer flag 106c is as follows. FIG. 17 shows a possible problem when not using the transfer flag 106c. Here, it is assumed that the VNC server 130 acquired the change area information 106a of the change area Ra at time t2 shown in FIG. 13(B), and then, before the VNC server 130 acquires the image data of the change area Ra from the image data storage area 106b, the image within the image data storage area 106b has been changed by the hook processing module 400 into the state shown in FIG. 13(C). When asynchronous processing of the hook processing module 300 and the VNC server 130 is executed in this way without using the transfer flag 106c, this kind of situation can occur. The VNC server 130 acquires the image data of the change area Ra from the image data storage area 106b, but at this time, the image data within the image data storage area 106b is rewritten as shown in FIG. 13(C). Therefore, the image that is acquired by the VNC server 130, transferred to the projector 200, and displayed on the projection display screen 70 is as shown in FIG. 17. The image originally to be displayed according to the change area information 106a at time t2 is that shown in FIG. 13(B), and it can be seen that the image in FIG. 17 is undesirable, compared to the correct image of FIG. 13(C).

In this way, when the transfer flag 106c is not used, the hook processing module 400 and the VNC server 30 are processed asynchronously (in other words, independently from each other), so there is the possibility that a problem may occur whereby a wrong image part is transferred. In contrast to this, with the processing procedure shown in FIG. 15, during the time that the VNC server 130 is executing image transfer processing, the transfer flag it maintained in an on state, and there is no rewriting of the image data within the image data storage area 106b by the hook processing module 400. Therefore, it is possible to prevent the occurrence of the problem described above.

In this way, with the third embodiment as well, the hook processing module 400 hooks and preempts a specific drawing command, and is made to execute the process of directly writing the image data of the change area to the RAM 106. As a result, it is possible to save the time required for transferring the image data from the VRAM 114 to the RAM 106 in the comparative example shown in FIG. 3. As a result, there is the advantage of being able to sufficiently increase the transfer speed when transferring the image data to the projector 200. Also, the processing of the hook processing module 400 and that of the VNC server 130 are synchronized using the transfer flag 106c, so it is possible to prevent transferring of the wrong image part.

D. Fourth Embodiment

Figure 18:
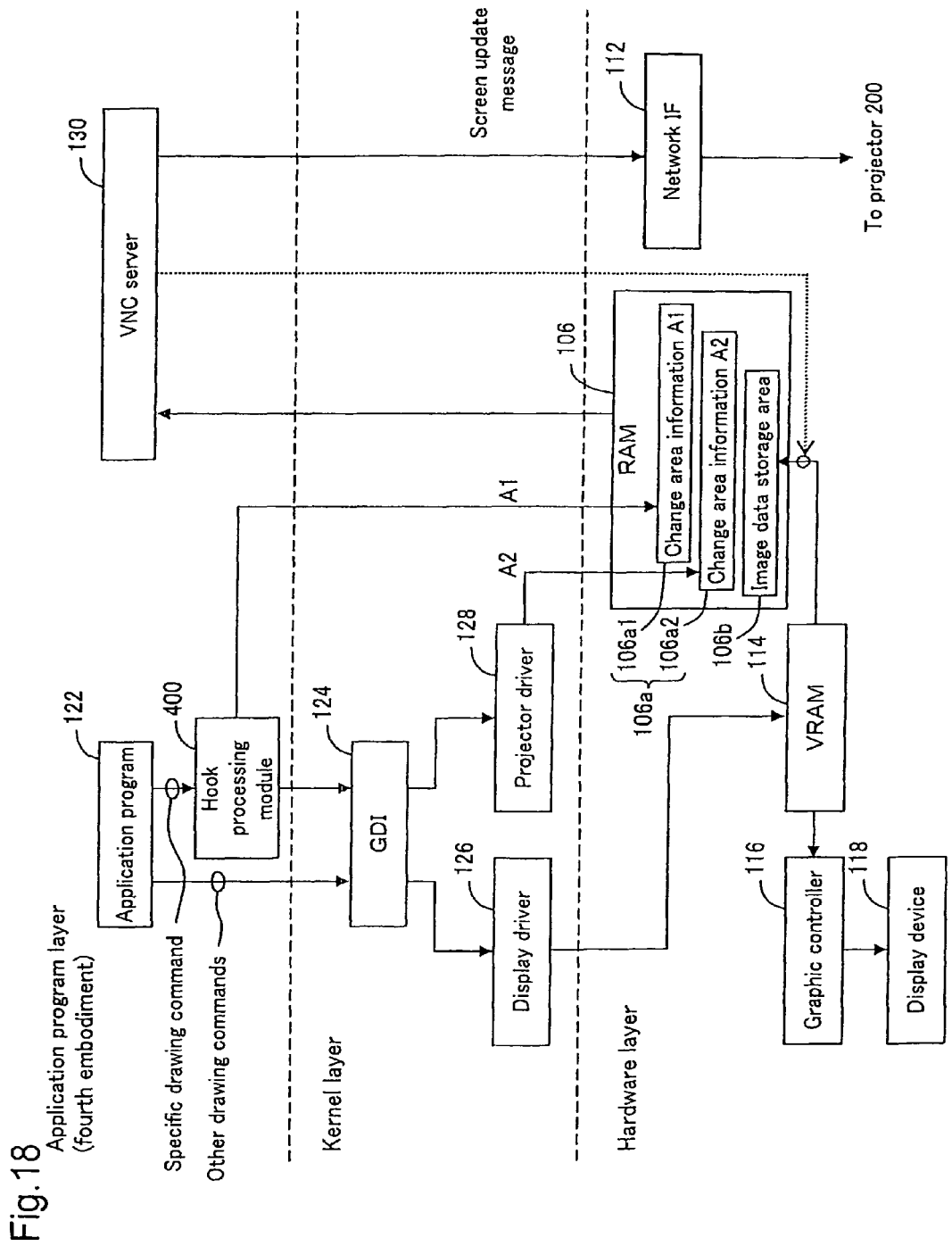
FIG. 18 is an explanatory drawing showing the hierarchical structure of the software and the hardware of the computer for the fourth embodiment.

FIG. 18 is an explanatory drawing showing the hierarchical structure of the software and the hardware of the computer for the fourth embodiment. The difference from the comparative example shown in FIG. 3 is the point that the hook processing module 400 is added between the application program 122 and the GDI 124, and the point that two types of change area information 106a1 and 106a2 (hereafter called "change area information A1 and A2") are stored within the RAM 106, and the remainder of the constitution is the same as FIG. 3. The difference from the first embodiment shown in FIG. 6 is the point that the change area information 106a includes two pieces of information 106a1, 106a2, and the remainder of the constitution is the same as the first embodiment.

Figure 19:
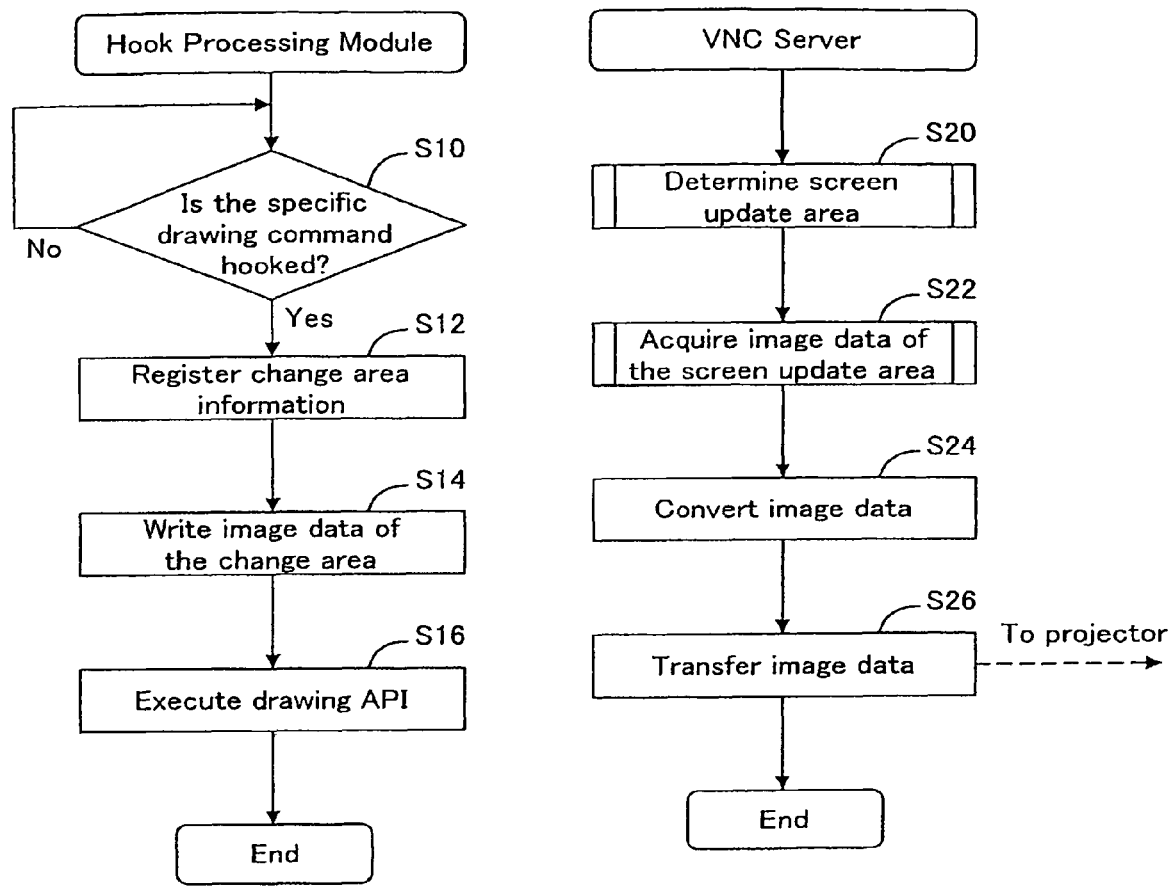
FIG. 19 is a flow chart showing the operation of the hook processing module and the VNC server for the fourth embodiment.

FIG. 19 is a flow chart showing the operation of the hook processing module 400 and the VNC server 130 for the fourth embodiment. Steps S10 to S16 are executed by the hook processing module 400, and steps S20 to S26 are executed periodically by the VNC server 130. The overall flow of the process is the same as that shown in FIG. 7, but the contents of the steps S20 and S22 of the VNC server are changed (described later).

When a specific drawing command is issued from the application program 122, the hook processing module 400 hooks that drawing command at step S10, and instead of GDI 124 acquires that drawing command.

At step S12, the process of registering the change area information is executed according to the acquired drawing command. In specific terms, the hook processing module 400 acquires the position and the size of the area (change area Ra in FIG. 4(B)) for which drawing is to be performed according to the drawing command, and the process of directly writing the change area information A1 representing that change area to the RAM 106 is executed.

At step S14, the process of writing the image data to the change area Ra is executed. In specific terms, the hook processing module 400 produces the image data within the change area Ra according to the drawing command, and executes the process of directly writing of that image data to the image data storage area 106b within the RAM 106.

At step S16, the hook processing module 400 calls the normal GDI function and executes drawing processing according to the drawing command acquired at step S10. The display driver 126 and the projector driver 128 (FIG. 18), the same as with the comparative example shown in FIG. 3, executes processes according to the drawing commands received from the GDI 124. Specifically, the display driver 126 draws the image within the VRAM 114, and the projector driver 128 writes the change area information A2 indicating that drawing area within the RAM 106.

Figure 20:
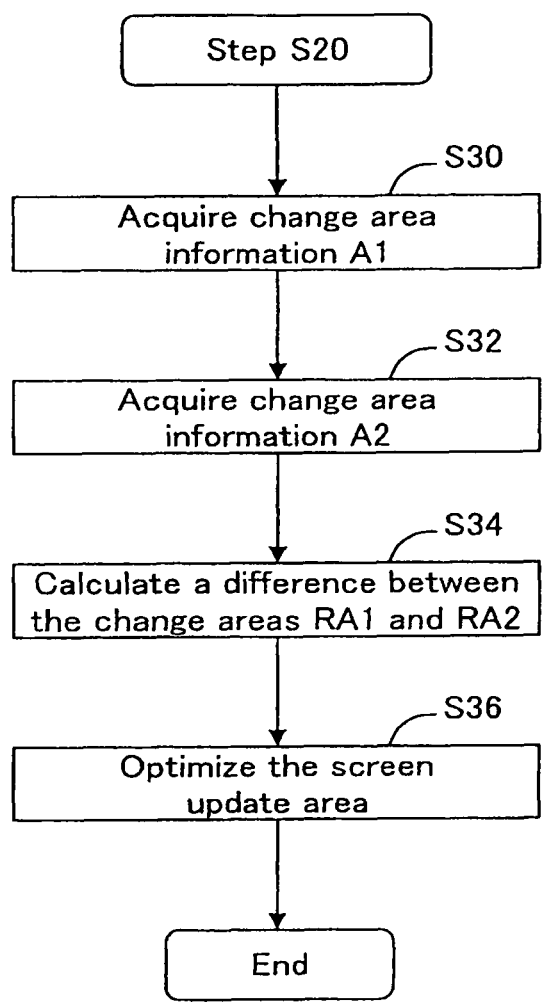
FIG. 20 is a flow chart showing the detailed procedure of step S20 for the fourth embodiment.

Meanwhile, the VNC server 130 determines the area of the image data to be transferred to the projector 200 (called the "screen update area"). FIG. 20 is a flow chart showing the detailed procedures of step S20 for the fourth embodiment. At steps S30 and S32, the first and second change area information A1 and A2 are acquired. As described previously, the first change area information A1 is information representing the area drawn in the image data storage area 106b within the RAM 106 by the hook processing module 400, and is written within the RAM 106 by the hook processing module 400. Meanwhile, the second change area information A2 is information representing the area drawn within the VRAM 114 by the display driver 126, and is written within the RAM 106 by the projector driver 128.

Figure 21A:
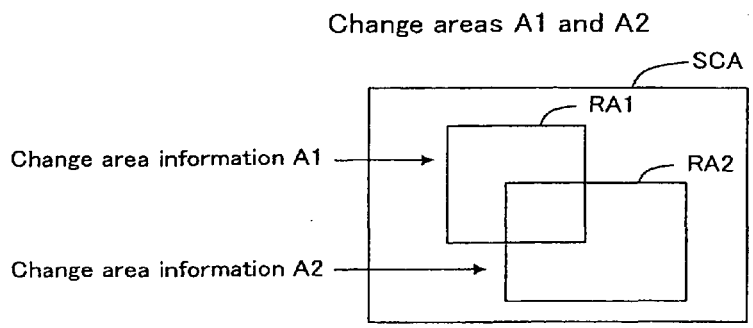
FIGS. 21(A) through 21(D) illustrate the relationship between the change areas and the screen update area for the fourth embodiment.

FIG. 21(A) shows an example of the two change areas RA1 and RA2 represented by the two change area information A1 and A2. Here, the two change areas RA1 and RA2 are arranged within the same screen area SCA. Here, the "screen area SCA" means the overall area of the image stored in the VRAM 114, and this is equal to the area of the entire image data storage area 106b. Strictly speaking, the first change area RA1 is the area defined by the address within the image data storage area 106b, and the second change area RA2 is the area defined by the address within the VRAM 114, but it is possible to represent these with the same screen area SCA.

With the example in FIG. 21(A), the two change areas RA1 and RA2 partially overlap, but the two change areas RA1 and RA2 sometimes take various relationships other than this. For example, there are also cases when the two change areas RA1 and RA2 do not overlap at all, and there are cases when both completely overlap. For example, the hook processing module 400 performs drawing according to a specific drawing command, after which, when the normal drawing modules 124, 126, and 128 perform drawing of the same area according to the same drawing command, the two change areas RA1 and RA2 are the same. However, when the same drawing command is executed as well, depending on the setting of each module, there may be cases when slight differences occur in the two change areas RA1 and RA2.

Figure 21B:
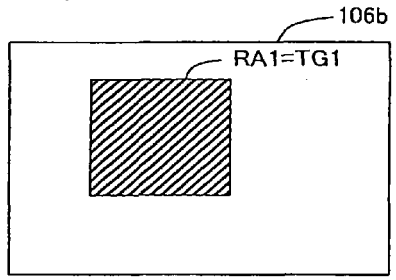
Figure 21C:
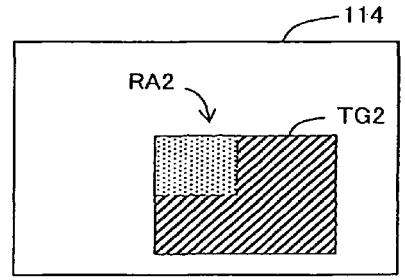
Figure 21D:
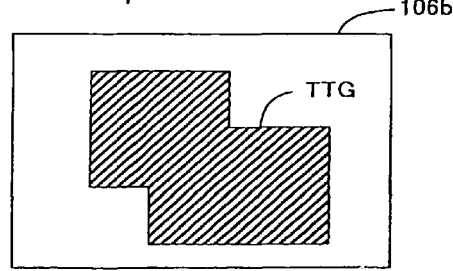

FIG. 21(B) shows the area TG1 for which the VNC server 130 directly acquires the image from the RAM 106 during image transfer, and FIG. 21(C) shows the area TG2 for which the image is acquired from the VRAM 114. These areas TG1 and TG2 are both called "transfer areas." As can be understood from this example, the image of the first change area RA1 (=TG1) is directly acquired from within the RAM 106. Meanwhile, the image of the area TG2 of the part of the second change area RA2 that is not included in the first change area RA1 is acquired from the VRAM 114. The reason for limiting the second transfer area TG2 in this way is to make the image acquired from the VRAM 114 as small as possible to reduce the time required for the acquisition thereof. For example, when the two change areas RA1 and RA2 completely overlap, it is not necessary to acquire the image from the VRAM 114, so it is possible to perform transfer processing at high speed. FIG. 21(D) shows the overall area (screen update area or total transfer area TTG) transferred by the VNC server 130. This screen update area TTG correlates to the total area of the first and second change area RA1 and RA2.

There are cases when plural pieces of information corresponding to a plurality of drawing commands are included in the first change area information A1. In this case, the total area of these plurality of drawing command drawing areas is the first change area RA1. The same is also true for the second change area RA2.

At step S34 in FIG. 20, the difference between the change areas RA1 and RA2 represented by the two types of change area information A1 and A2 is calculated. In specific terms, within the second change area RA2, the area TG2 (FIG. 21(C)) that is not included in the first change area RA1 is calculated. At step S36, optimization processing of the screen update area TTG (FIG. 21(D)) is executed.

Figure 22A:
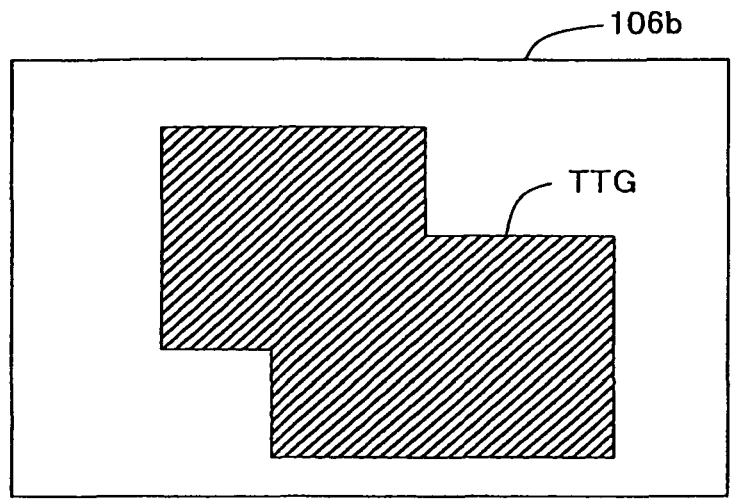
FIGS. 22(A) and 22(B) illustrate the contents of the optimization process for the screen update area.
Figure 22B:
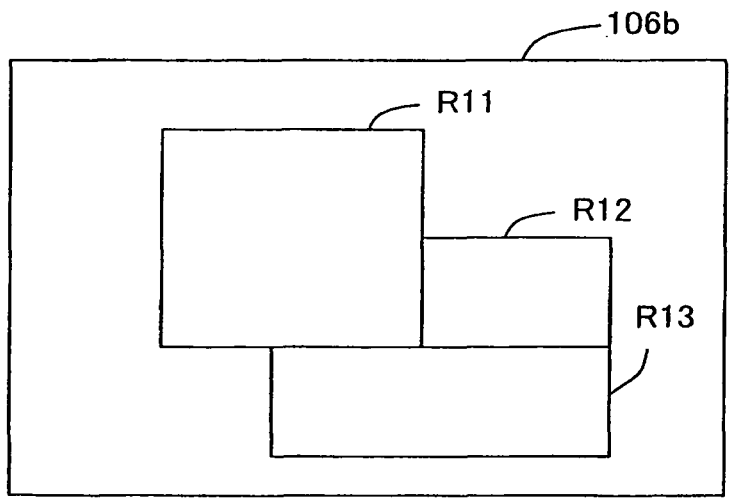

FIGS. 22(A) and 22(B) illustrate the contents of the optimization process of the screen update area. FIG. 22(A) shows the same screen update area TTG as in FIG. 21(D). With the optimization process, as shown in FIG. 22(B), the screen update area TTG is separated into mutually different, adjacent rectangular areas R11 to R13. Then, these rectangular areas R11 to R13 are used as the screen update area after optimization. Each of the screen update areas R11 to R13 is rectangular, so compared to cases when a rectangular shaped image such as one that contains the screen update area TTG before optimization is transferred, it is possible to reduce the volume of image data that is transferred.

Figure 23:
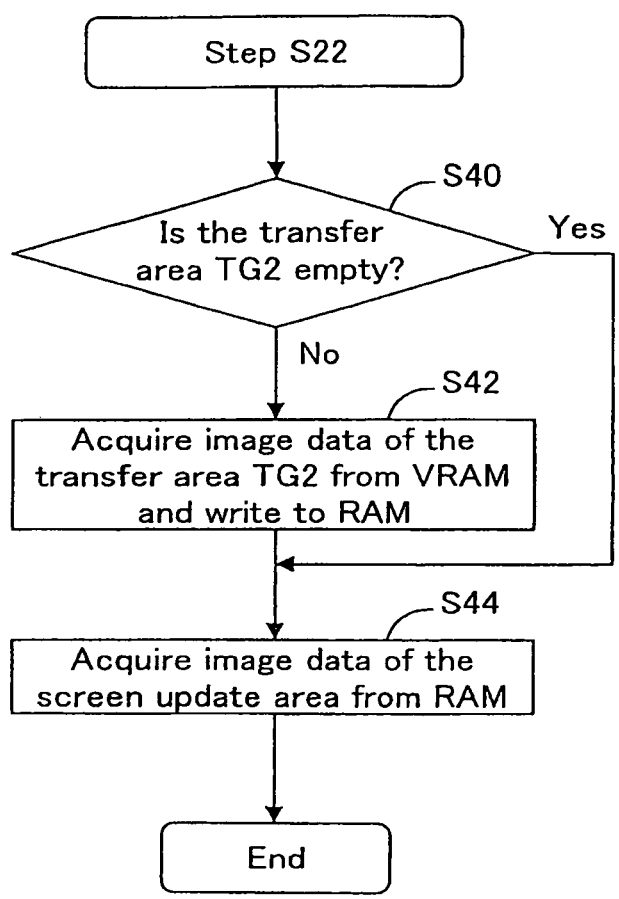
FIG. 23 is a flow chart showing the detailed procedure of step S22 for the fourth embodiment.

At step S22 in FIG. 19, the image data of the image part correlating to the screen update area is acquired. FIG. 23 is a flow chart showing the detailed procedure of the step S22 for the fourth embodiment. At step S40, a check is done of whether or not the second transfer area TG2 (FIG. 21(C)) is empty. When there is no second change area information A2, or when the second change area A2 is completely contained in the first change area A1, the second transfer area TG2 is empty. When the second transfer area TG2 is empty, the process moves to the step S44 described later. Meanwhile, when the second transfer area TG2 is not empty, then step S42 is executed. At step S42, the VNC server 130 acquires the image data of the second transfer area TG2 from the VRAM 114 and writes it to the image data storage area 106b within the RAM 106. As a result, all of the images within the screen update area TTG shown in FIG. 21(D) are in a state stored within the image data storage area 106b. At step S44, the VNC server 130 acquires the image data of the screen update area TTG from the image data storage area 106b of the RAM 106. What is actually acquired is the image data of the individual screen update areas R11 to R13 (FIG. 22(B)) after the optimization process.

At step S24 in FIG. 19, the image data is converted according to a preset encoding format. At step S26, a screen update message (FIG. 5) is created containing image data converted in this way and change area information, and this is transferred to the projector 200 via the network interface unit 112.

In this way, with the fourth embodiment as well, the hook processing module 400 hooks and preempts a specific drawing command, and is made to execute processing to directly write the image data of the change area to the RAM 106. As a result, it is possible to save the time required to transfer image data from the VRAM 114 to the RAM 106 in the comparative example shown in FIG. 3. As a result of this, there is the advantage that it is possible to make the transfer speed sufficiently fast when transferring image data to the projector 200.

Also, with the fourth embodiment described above, regarding the image part of the area TG2 (FIG. 21(C)) that is not drawn by the hook processing module 400, this is acquired from the VRAM 114 and transferred to the projector 200. As a result, for the images drawn by the normal drawing modules 124, 126, and 128 as well, it is possible to transfer to the projector 200 without omission.

E. Fifth Embodiment

FIGS. 24(A) through 24(D) illustrate the relationship between the change areas and the screen update area of the fifth embodiment; they correspond to FIGS. 21(A) through 21(D) for the fourth embodiment. The fifth embodiment is the same as the fourth embodiment in terms of device constitution and overall process flow, but is different from the fourth embodiment in terms of the area subject to transfer. In specific terms, with the fifth embodiment, the first transfer area TG1 (FIG. 24(B)) for which an image is directly acquired from the RAM 106 is set to the part for which the first and second change areas RA1 and RA2 are overlapping. To say this another way, the first transfer area TG1 is set to the area within the second change area RA2 which is also included in the first change area RA1. Meanwhile, like with the fourth embodiment, the second transfer area TG2 (FIG. 24(C)) for which the image is acquired from the VRAM 114 is set to the part of the second change area RA2 that is not included in the first change area RA1. Therefore, the screen update area TTG (FIG. 24(D)) which is the overall area subject to transfer is the same as the second change area RA2.

In this way, with the fifth embodiment, the image within the second change area RA2 which is the area drawn within the VRAM 114 by the GDI 124 and the display driver 126 is transferred by the VNC server 130. The reason why the processing is performed in this way is as follows. Specifically, the drawing commands that are hook processed by the hook processing module 400 are also re-executed after that by the GDI 124 and the display driver 126. Therefore, if the image of the second change area RA2 is transferred, it is possible to display the correct image in the projector 200. However, if at this time, all the image data is acquired from the VRAM 114, a significant amount of time is required for data transfer. In light of this, with the fifth embodiment, by directly acquiring the image data from the RAM 106 for the part within the second change area RA2 that is included in the first change area RA1, the time required for data acquisition is shortened. Also, with the fifth embodiment, the fact that the transferred volume of image data is even less than that of the fourth embodiment makes this preferable to the fourth embodiment.

In many cases, the area drawn by the hook processing module 400 (first change area RA1) and the area drawn by the GDI 124 and the display driver 126 (second change area RA2) match. Therefore, as with the fifth embodiment, even if transfer of the image of the first change area RA1 that is not included in the second change area RA2 is omitted, the possibility of incongruity occurring in the image displayed in the projector 400 is negligible. In contrast to this, with the fourth embodiment described above, the part of the first change area RA1 that does not overlap with the second change area RA2 is also transferred, so even if there is a significant difference between the first and second change areas RA1 and RA2, the fourth embodiment has the advantage that it is possible to transfer a more perfect image.

The VNC server 130 may also be constituted so as to be able to select one from a plurality of transfer modes including the transfer process (also called the "first transfer mode") of the fourth embodiment and the transfer process (also called the "second transfer mode") of the fifth embodiment to execute. The transfer mode selection may be performed by the user, or may also be done by having the VNC server 130 perform transfer mode selection automatically according to processing capability (CPU processing speed, bus transfer speed, and the like) of the computer 100 (generally an image supply device). By working in this way, it is possible to select a desirable transfer mode capable of transferring images at a suitable transfer speed.

F. Sixth Embodiment

FIG. 25 is an explanatory drawing showing the hierarchical structure of the software and the hardware of the computer for the sixth embodiment. The difference from the comparative example shown in FIG. 3 is the point that the hook processing module 400 is added between the application program 122 and the GDI 124, the point that two types of change area information 106a1 and 106a2 (hereafter called "change area information A1 and A2") are stored within the RAM 106, and the point that the transfer history information 106d (hereafter called "transfer history information HA1") is stored within the RAM 106, and the remainder of the constitution is the same as FIG. 3. The difference from the fourth embodiment shown in FIG. 18 is the point that the transfer history information 106d is added, and the remainder of the constitution is the same as the fourth embodiment.

FIGS. 26(A-1) through 26(A-3) and 26(B-1) through 26(B-3) illustrate an example of the two change area information A1 and A2 and the transfer history information HA1. FIGS. 26(A-1) to 26(A-3) show the status at time t0, and FIGS. 26(B-1) to 26(B-3) show the status at time t1. The VNC server 130 repeatedly executes the transfer process at a specified time interval, where after executing transfer at time t0, it is assumed that the next transfer is executed at time t1.

The first change area information A1 shown in FIG. 26(A-1) represents the area RA1 (called "change area RA1") directly drawn in the image data storage area 106b within the RAM 106 by the hook processing module 400 (FIG. 25). The image inside this change area RA1 is called the "image G1." The first change area information A1 is written into the RAM 106 by the hook processing module 400. The second change area information A2 shown in FIG. 26(A-2) represents the area RA2 (called the "change area RA2") drawn in the VRAM 114 by the display driver 126 (FIG. 25). The image within this change area RA2 is called the "image G2." The second change area information A2 is written into the RAM 106 by the projector driver 128. The transfer history information HA1 shown in FIG. 26(A-3) represents the past first change area RA1 (called the "history area") directly drawn in the image data storage area 106b by the hook processing module 400 within a specified preceding time period and transferred by the VNC server 130. With this embodiment, only the first change area which has been subject to transfer for the immediately prior transfer process is set as the history area. The history area may include the first change areas which have been subject to transfer for a preset number of previous transfer processes, instead. There is no first change area RA1 with the immediately prior transfer process of time t0, and therefore, it is assumed that the transfer history information HA1 is also not registered at time t0. The transfer history information HA1 is written into the RAM 106 by the VNC server 130.

With the example in FIG. 26, a state is shown with each of the areas arranged within the same screen area SCA. Here, the "screen area SCA" means the overall area of the image stored in the VRAM 114, and this is equal to the overall area of the image data storage area 106b. Strictly speaking, the first change area RA1 is the area defined by the address within the image data storage area 106b, and the second change area RA2 is the area defined by the address within the VRAM 114, and these can be expressed by the same screen area SCA.

As shown in FIGS. 26(B-1) to 26(B-3), at time t1, the first change area information A1 does not exist, and the second change area information A2 represents the image G1 area (specifically, the same area as the first change area RA1 at time t0). This kind of state can occur when immediately before the time t0, the drawing command of this image G1 is hook processed by the hook processing module 400, after which processing is done by the drawing modules 124, 126, and 128 between the times t0 and t1. As shown in FIG. 26(B-3), at time t1, the first change area information A1 at time t0 is registered as the transfer history information HA1. With FIG. 26(B-3), for convenience of illustration, the history area RHA1 is drawn with a dot-dash line. With the transfer processing (processing by the VNC server 130) described below, the transfer processing at these times t0 and t1 is described.

Figure 27:
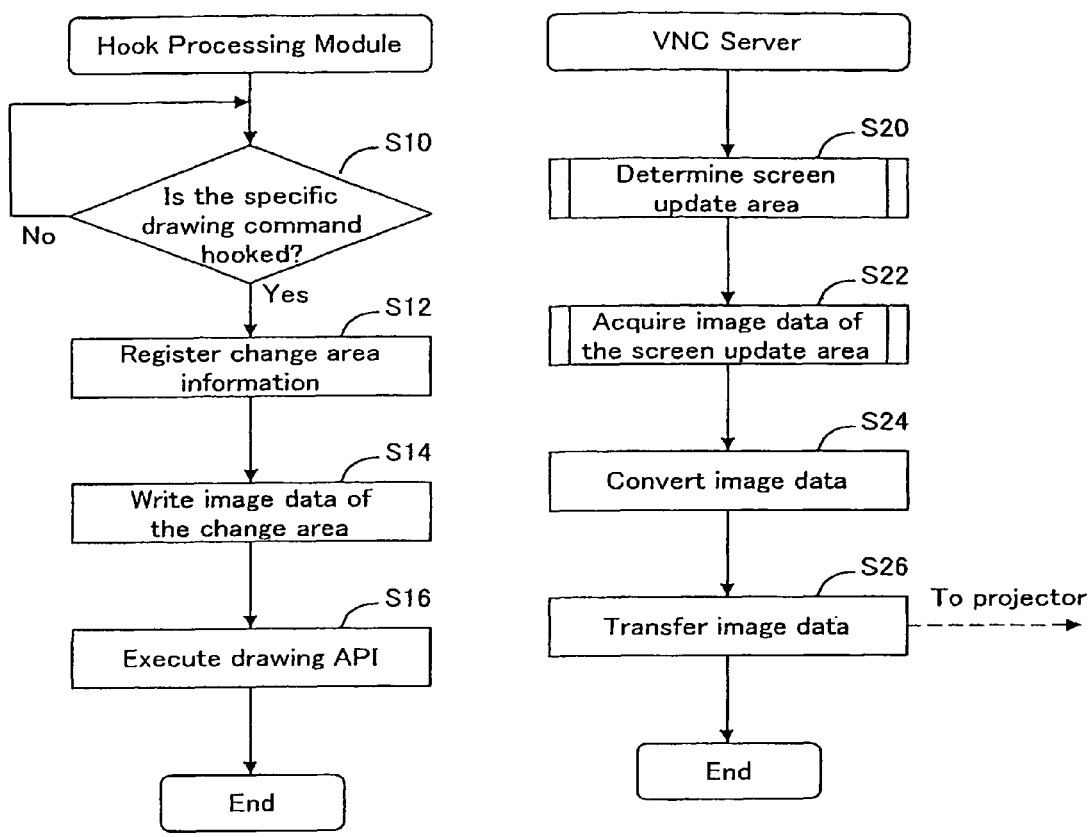
FIG. 27 is a flow chart showing the operation of the hook processing module and the VNC server for the sixth embodiment.

FIG. 27 is a flow chart showing the operation of the hook processing module 400 and the VNC server 130 for the sixth embodiment. Steps S10 to S16 are executed by the hook processing module 400, and steps S20 to S26 are executed periodically by the VNC server 130. The overall process flow is the same as that shown in FIG. 19, but the contents of the VNC server steps S20 and S22 have been changed (described later).

When a specific drawing command is issued from the application program 122, the hook processing module 400 hooks that drawing command at step S10, and instead of the GDI 124, acquires that drawing command.

At step S12, the process of registering the change area information according to the acquired drawing command is executed. In specific terms, the hook processing module 400 acquires the position and the size of the area (the change area RA1 of FIG. 26(A-1)) for which drawing is performed according to the drawing command, and the process of directly writing the change area information A1 representing that change area to the RAM 106 is executed.

At step S14, the process of writing the image data of the change area RA1 is executed. In specific terms, the hook processing module 400 produces the image data within the change area RA1 according to the drawing command, and executes the process of directly writing that image data to the image data storage area 106b within the RAM 106.

At step S16, the hook processing module 400 calls the normal GDI function according to the drawing command acquired at step S10 and executes the drawing process. The display driver 126 and the projector driver 128 (FIG. 25) each execute processing according to the drawing commands received from the GDI 124, the same as with the comparative example shown in FIG. 3. Specifically, the display driver 126 draws the image within the VRAM 114, and the projector driver 128 writes the change area information A2 indicating that drawing area into the RAM 106.

Figure 28:
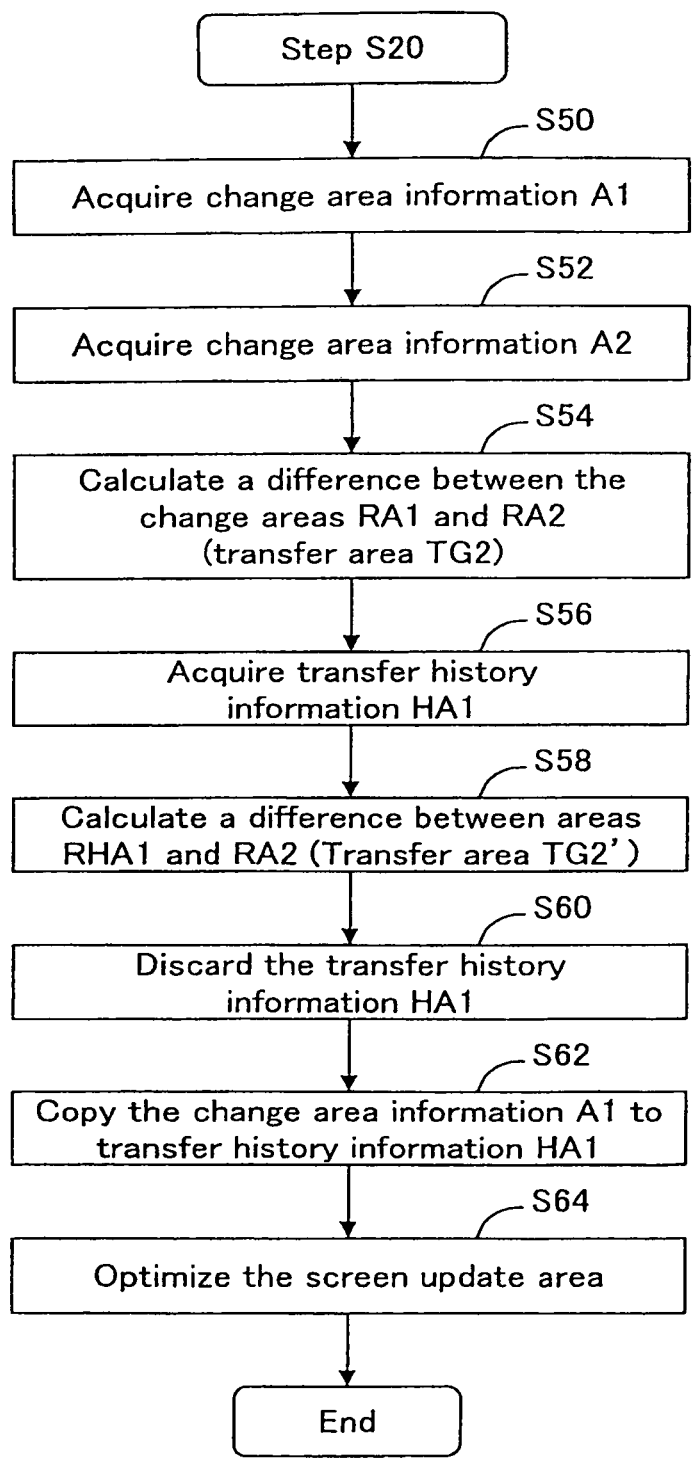
FIG. 28 is a flow chart showing the detailed procedure of step S20 for the sixth embodiment.

Meanwhile, at step S20, the VNC server 130 determines the area of the image data to be transferred to the projector 200 (called the "screen update area"). FIG. 28 is a flow chart showing the detailed procedure of step S20 for the sixth embodiment. At steps S50 and S52, the first and second change area information A1 and A2 are acquired. as described previously, the first change area information A1 is the information representing the area drawn in the image data storage area 106b within the RAM 106 by the hook processing module 400, and is written into the RAM 106 by the hook processing module 400. Meanwhile, the second change area information A2 is the information representing the area drawn within the VRAM 114 by the display driver 126, and is written into the RAM 106 by the projector driver 128.

Figure 29A:
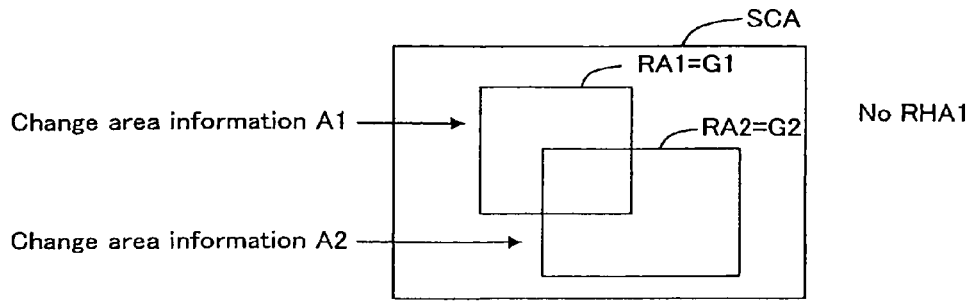
FIGS. 29(A) through 29(D) illustrate the relationship between change areas and the screen update area for the sixth embodiment.

FIG. 29(A) shows the two change areas RA1 and RA2 and the history area RHA1 at time W. However, at time t0, there is no history area RHA1.

With the example in FIG. 29(A), the two change areas RA1 and RA2 partially overlap, but there can be various relationships other than this for the two change areas RA1 and RA2. For example, there are also cases when there is absolutely no overlap of the two change areas RA1 and RA2, and also cases when the two completely overlap. For example, when drawing is performed according to a specific drawing command by the hook processing module 400, after which the normal drawing modules 1224, 126, and 128 perform drawing of the same area according to the same drawing command, the two change areas RA1 and RA2 are the same. However, even when the same drawing command is issued, there may be cases when a slight difference occurs in the two change areas RA1 and RA2 according to the setting of each module.

Figure 29B:
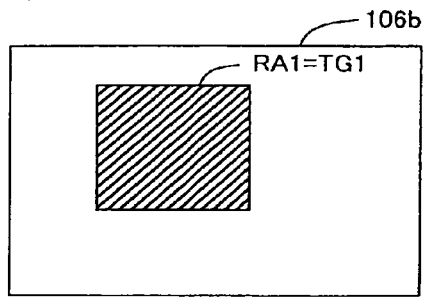
Figure 29C:
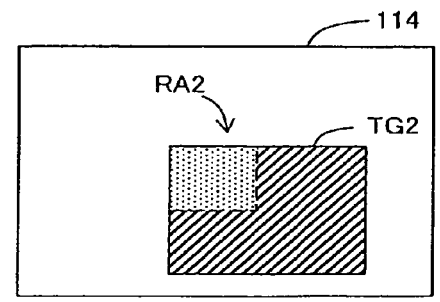
Figure 29D:
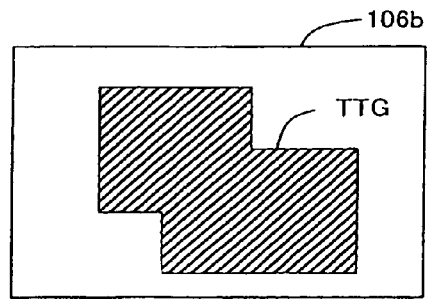

FIG. 29(B) shows the area TG1 for which the VNC server 130 directly acquires the image from the RAM 106 during image transfer at time t0, and FIG. 29(C) shows the area TG2 for which the image is acquired from the \TRAM 114. These areas TG1 and TG2 are also called "transfer areas." As can be understood from this example, when there is no transfer history information HA1 the image of the first change area RA1 (=TG1) is directly acquired from within the RAM 106, and the image of the area TG2 of the part of the second change area RA2 that is not included in the first change area RA1 is acquired from the VRAM 114. The reason for limiting the second transfer area TG2 in this way is to keep the image acquired from the VRAM 114 as small as possible, and to reduce the time required for that acquisition. For example, when the two change areas RA1 and RA2 completely overlap, it is not necessary to acquire the image from the VRAM 114, so it is possible to perform transfer processing at high speed. FIG. 29(D) shows the overall area (screen update area or total transfer area TTG) transferred by the VNC server 130 at time t0. This screen update area TTG correlates to the total area of the first and second change areas RA1 and RA2.

There are cases when plural pieces of information corresponding to the plurality of drawing commands exist in the first change area information A1. In this case, the total area of the drawing areas of these plurality of drawing commands is the first change area RA1. The same is true for the second change area RA2.

At step S54 of FIG. 28, the difference between the change areas RA1 and RA2 represented by two types of change area information A1 and A2 is calculated. In specific terms, in the second change area RA2, the area TG2 (FIG. 29(C)) not contained in the first change area RA1 is calculated.

At step S56, the transfer history information HA1 is acquired, and at step S58, the difference between the history area RHA1 and the second change area RA2 is calculated. The process of this step S58 is a process for adjusting the second transfer area TG2 (the area for which the image from the VRAM 114 is acquired during transfer). At time t0, there is no transfer history information HA1 so the contents of this process will be described later in the context of the processing at time t1. At step S60, the transfer history information HA1 is discarded, and at step S62, the first change area information A1 is registered as the transfer history information HA1. As a result, the first change area information A1 at time t0 is used as the transfer history information HA1 at the next time t1.

Figure 30A:
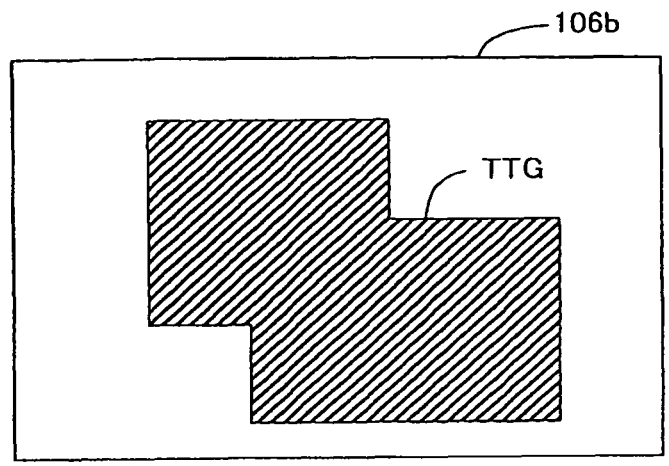
FIGS. 30(A) and 30(B) illustrate the contents of the optimization process for the screen update area.
Figure 30B:
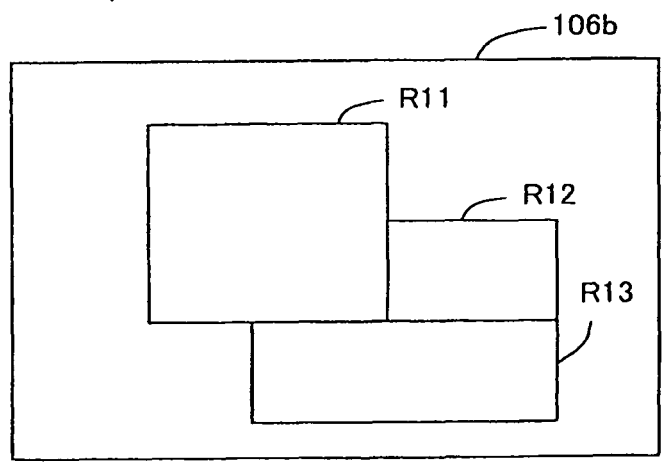

At step S64, the optimization process of the screen update area TTG (FIG. 29(D)) is executed. FIGS. 30(A) and 30(B) illustrate the contents of the optimization process of the screen update area. FIG. 30(A) shows the same screen update area TTG as FIG. 29(D). With the optimization process, as shown in FIG. 30(B), the screen update area TTG is separated into adjacent but not overlapping rectangular areas R11 to R13. Then, these rectangular areas R11 to R13 are used as the screen update areas after optimization. Each screen update area R11 to R13 is rectangular, so compared to when transferring rectangular shaped images that contain the screen update area TTG before optimization, it is possible to reduce the volume of image data that is transferred.

Figure 31:
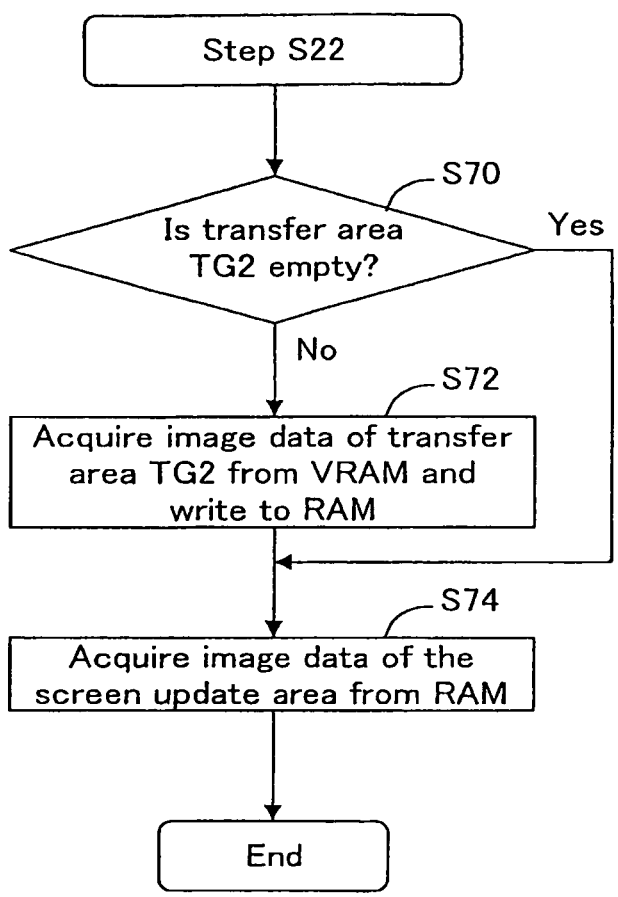
FIG. 31 is a flow chart showing the detailed procedure of step S22 for the sixth embodiment.

At step S22 in FIG. 27, the image data of the image part correlating to the screen update area is acquired. FIG. 31 is a flow chart showing the detailed procedure of step S22 for the sixth embodiment. At step S70, a check is done of whether or not the second transfer area TG2 (FIG. 29(C)) is empty. As described previously, the "second transfer area TG2" is the area for which image data is acquired from the VRAM 114. When there is no second change area information A2, or when the second change area A2 is completely contained in the total area of the first change area A1 and the history area, the second transfer area TG2 is empty. When the second transfer area TG2 is empty, the process moves to the step S74 described later. Meanwhile, when the second transfer area TG2 is not empty, step S72 is executed. At step S72, the VNC server 130 acquires the image data of the second transfer area TG2 from the VRAM 114 and writes it to the image data storage area 106b within the RAM 106. As a result, the status is that all the images within the screen update area TTG shown in FIG. 29(D) are stored in the image data storage area 106b. At step S74, the VNC server 130 acquires the image data of the screen update area TTG from the image data storage area 106b of the RAM 106. Note that what is actually acquired is image data of each of the screen update areas R11 to R31 (FIG. 30(B)) after the optimization process.

At step S24 in FIG. 27, the image data is converted according to a preset encoding format. At step S26, the screen update message (FIG. 5) containing the image data converted in this way and the change area information is created, and this is transferred to the projector 200 via the network interface unit 112.

At time t1 as well, the processing of steps S20 to S26 of FIG. 27 is similarly executed. However, at time t1, as shown in FIG. 26(B-1) to 26(B-3), there is no first change area information A1, the second change area information A2 is information representing the area of the image G1, and the transfer history information HA1 is also information representing the area of the image G1.

FIGS. 32(A) through 32(D) illustrate the relationship between the change area and the history area and the screen update area at the time t1. As shown in FIG. 32(A), there is no first change area RA1, and the second change area RA2 is the same as the history area RHA1. At this time, the processing at step S54 in FIG. 28 is that the part of the second change area RA2 that is not included in the first change area RA1 is created as the second transfer area TG2 (FIG. 32(B)). Also, the processing at step S58 of FIG. 28 is that the history area RHA1 is removed from this second transfer area TG2. FIG. 32(D) shows the second transfer area TG2' after this correction. With this example, the second change area RA2 and the history area RHA1 are the same, so the second transfer area TG2' after correction is empty. Meanwhile, the area removed from the second transfer area TG2 is added to the first transfer area TG1 (the area for which the image is directly acquired from the RAM 106) as shown in FIG. 32(C). At time t1, the second transfer area TG2' is empty, so the overall image within the screen update area TTG (FIG. 32(E)) is directly acquired from the image data storage area 106b and transferred without acquiring the image from the VRAM 114.

As can be understood from the examples in FIGS. 29(A) through 29(E) and FIGS. 32(A) through 32(E), the screen update area TTG that is subject to image transfer has no relation to whether there is the history area RHA1 or not, and it is equivalent to the total area of the first and second change areas RA1 and RA2. The history area RHA1 is used to determine the first transfer area TG1 for which image data is directly acquired from the image data storage area 106b and to determine the second transfer area TG2 (or TG2') for which image data is acquired from the VRAM 114. To put this in specific terms, the sum of the first change area RA1 and the history area RHA1 of the second change area RA2 is the first transfer area TG1. The area of the second change area RA2 that is not contained in either the first change area RA1 or the history area RHA1 becomes the second transfer area TG2 (or TG2'). The first transfer area TG1 can be thought of as the total area of the first change area RA1 and the area of the second change area RA2 that is not contained in the first change area RA1 and that is contained in the history area RHA1. By defining the first and second transfer areas TG1 and TG2 in this way, it is possible to reduce the volume of image data which is to be acquired from the VRAM 114.

When assuming a case of not using the transfer history information HA1, the image of the second change area RA2 should be acquired from the VRAM 114 at time t1. In contrast to this, with this embodiment, the image of this change area RA2 can be acquired directly from the image data storage area 106b within the RAM 106 without accessing the VRAM 114. The reason for this is that this change area RA2 is directly drawn in the image data storage area 106b by the hook processing module 400 at a point before that, so it is possible to acquire the correct image from the image data storage area 106b even without acquiring it from the VRAM 114. As can be understood from this description, with this embodiment, it is possible to reduce the possibility of having to acquire a large volume of image data from the VRAM 114 due to a time-lag between the drawing command execution timing and the image transfer timing.

FIGS. 33(A-1) through 33(A-3) and 33(B-1) through 33(B-3) illustrate another example of the two change area information A1 and A2 and the transfer history information HA1 FIGS. 33(A-1) to 33(A-3) show the status at time t10 of a certain transfer timing, and FIGS. 33(B-1) to 33(B-3) show the status at time t11 of the next transfer timing. At time t10, the two change area information A1a and A1b showing the change areas RA1a and RA1b of the two images G1 and G2 are registered as the first change area information A1 subject to processing. Also, the information showing the change area RA2 of only one of the images G1 of these two images G1 and G2 is registered as the second change area information A2. At time t10, it is assumed that there is no information history information HA1. Meanwhile, at time t11, there is no first change area information A1, and the information showing the change area of the image G2 is registered as the second change area information A2. Also, the two change area information A1a and A1b at time t0 are registered as the transfer history information HA1 (HA1a and HA1b).

Figure 34A:
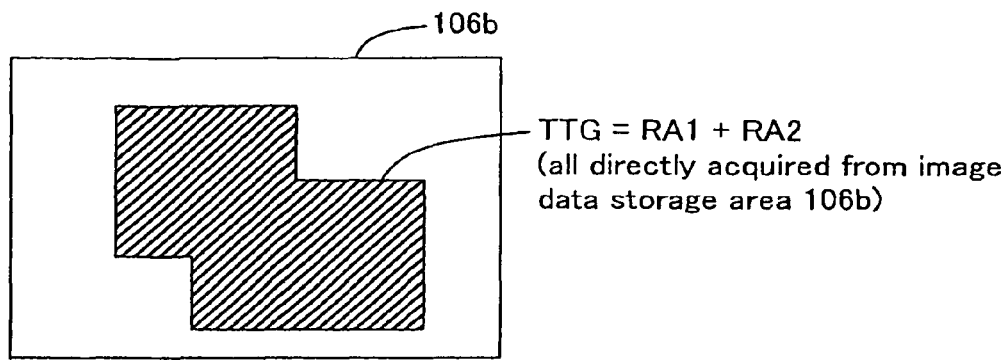
FIGS. 34(A) and 34(B) illustrate the screen update area at the time t10 and the time t11 for the sixth embodiment.

With the transfer process at time t10, as shown in FIG. 34(A), the total area of the two types of change area RA1 and RA2 is used as the screen update area TTG subject to transfer. This screen update area TTG is equal to the total area of the first change area RA1a and RA1b shown in FIG. 33(A-1). Therefore, the images within this screen update area TTG are all directly acquired from the image data storage area 106b without needing to acquire from the VRAM 114.

Figure 34B:
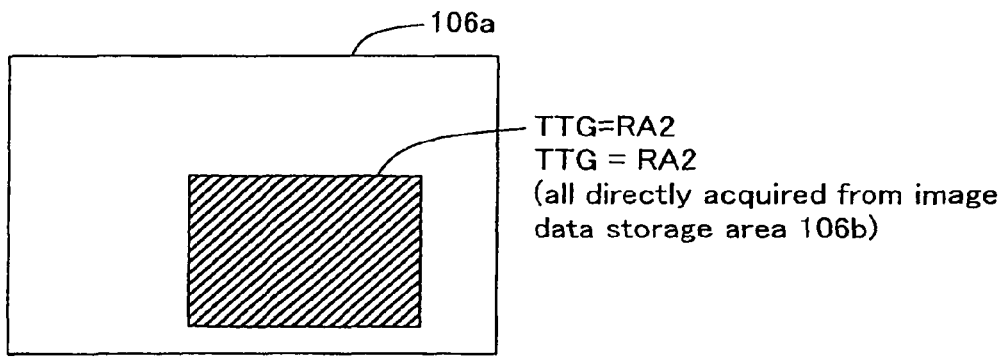

With the transfer process at time t11, there is no first change area RA1, so as shown in FIG. 34(B), the second change area RA2 is used as is as the screen update area TTG. However, the second change area RA2 is completely contained in the history areas RHA1a and RHA1b (FIG. 33(B-3)). Therefore, the images of the screen update area TTG at time t11 also all directly acquired from the image data storage area 106b without needing to acquire from the VRAM 114.

In this way, with the sixth embodiment as well, the hook processing module 400 hooks and preempts a specific drawing command, and is made to execute the process of directly writing the change area image data to the RAM 106. As a result, it is possible to save the time that was required for transferring image data from the VRAM 114 to the RAM 106 in the comparative example shown in FIG. 3. As a result, there is the advantage that it is possible to have sufficiently fast transfer speed when transferring image data to the projector 200.

Also, with the sixth embodiment noted above, in regards to the image part of the area TG2 which, within the second change area RA2, is not contained in either the first change area RA1 or the history area RHA1, this is acquired from the VRAM 114 and transferred to the projector 200. As a result, it is possible to transfer to the projector 200 without omitting the images drawn by the normal drawing modules 124, 126, and 128.

G. Seventh Embodiment

FIGS. 35(A) through 35(D) illustrate the relationship between the change areas and the screen update area for the seventh embodiment, and they correspond to FIGS. 29(A) through 29(D) of the sixth embodiment. For the seventh embodiment, the overall device constitution and process flow are the same as those of the sixth embodiment, but the area that becomes the transfer area is different. In specific terms, with the seventh embodiment, the first transfer area TG1 (FIG. 35(B)) for which the image is directly acquired from the RAM 106 is set at the part where the first and second change areas RA1 and RA2 overlap. To say this another way, the first transfer area TG1 is set to the area of the second change area RA2 that is also contained in the first change area RA1. Meanwhile, the second transfer area TG2 (FIG. 35(C)) for which the image is acquired from the VRAM 114 is set to the part of the second change area RA2 that is not contained in the first change area RA1 as is the case with the sixth embodiment. Therefore, the screen update area TTG (FIG. 35(D)) which is the entire area that is subject to transfer is the same as the second change area RA2.

Figure 35A:
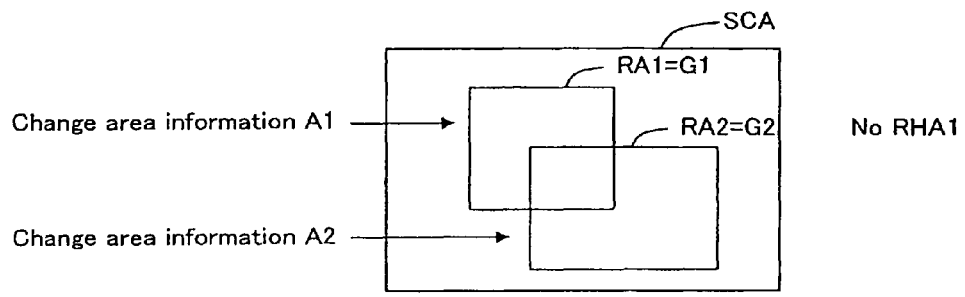
FIGS. 35(A) through 35(D) illustrate the relationship between the change areas and the screen update area for the seventh embodiment.
Figure 35B:
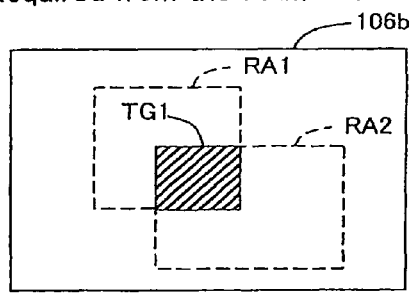
Figure 35C:
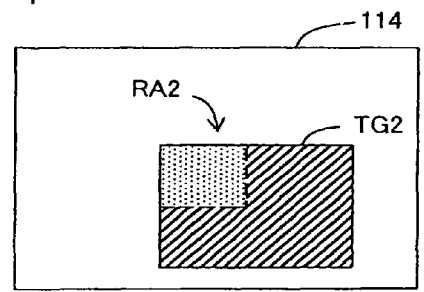
Figure 35D:
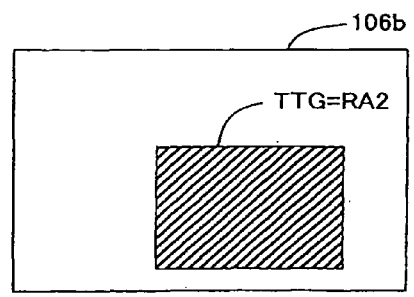

As described with FIG. 26(A-3), there is no transfer history information HA1 at time t0, so the image parts within the second transfer area TG2 (FIG. 35(C)) are all acquired from the VRAM 114. However, when there is a transfer history information HA1 the same as with the sixth embodiment, the area that overlaps with the history area within the second transfer area TG2 is removed from the second transfer area TG2 and added to the first transfer area TG1 (see FIG. 32). To say this another way, of the second change area RA2, the image part of the area contained in either of the first change area RA1 and the history area RHA1 is directly acquired from the RAM 106. Also, of the second change area RA2, the image part of the area not contained in either the first change area RA1 or the history area RHA1 is acquired from the VRAM 114. Therefore, the processing at time t1 shown in FIGS. 32(A) through 32(E) is the same for both the seventh embodiment and the sixth embodiment.

In this way, with the seventh embodiment, the image within the second change area RA2 that is the area drawn within the VRAM 114 by the GDI 124 and the display driver 126 is transferred by the VNC server 130. The reason for performing processing in this way is as follows. Specifically, the drawing commands that are hook processed by the hook processing module 400 are thereafter re-executed by the GDI 124 and the display driver 126, so basically, all the drawing commands are executed by the GDI 124 and the display driver 126. Therefore, a correct image can be displayed on the projector 200 by transferring the image of the second change area RA2. However, when all the image data is acquired from the VRAM 114 at this time, there is the problem that a significant amount of time is required for data transfer. In light of this, with the seventh embodiment, for the part within the second change area RA2 that is contained in either the first change area RA1 or the history area RHA1, by directly acquiring the image data from the RAM 106, the amount of time required for data acquisition is shortened. Also, with the seventh embodiment, the volume of transferred image data is even lower than that of the sixth embodiment, making it preferable to the sixth embodiment.

The area drawn by the hook processing module 400 (the first change area RA1) and the area drawn by the GDI 124 and the display driver 126 (the second change area RA2) match in often cases. Therefore, as with the seventh embodiment, even if the image transfer of the part of the first change area RA1 that is not contained in the second change area RAs is omitted, the possibility of incongruity occurring in the image displayed in the projector 400 is negligible. In contrast to this, with the sixth embodiment described above, the image of the part of the first change area RA1 that does not overlap with the second change area RA2 is also transferred, so even if there is quite a big difference between the first and second change area RA1 and RA2, there is the advantage of being able to transfer a more complete image.

FIGS. 36(A-1) through 36(A-3) and 36(B-1) through 36(B-3) illustrate another example of the two change area information A1 and A2 and the transfer history information HA1 of the seventh embodiment. At time t20 shown in FIGS. 36(A-1) to 36(A-3), as the first change area information A1, the information A1a and A1b representing the areas RA1a and RA1b of the two images G10 and G20 are registered, and as the second change area information A2, the information A2 representing the area RA2 (=RA1a) of the first image G1 is registered. Here, for convenience of the description, the first image G10 is the image that occupies the overall screen area SCA, and the second image G11 is assumed to be the image for which this has slid to the right. This kind of state occurs when a slide out is set as the image object animation effect. At time t20, there is no transfer history information HA1.

At time t21 shown in FIGS. 36(B-1) to 36(B-3), there is no first change area information A1, and as the second change area information A2, the information A2 representing the area RA2 (=RA1b) of the second image G11 is set. Also, as the transfer history information HA1 at the time t21, the two first change area information A1a and A1b that exist within the RAM 106 at the time t20 immediately before the time t21 are registered. In this way, for the example in FIGS. 36(A-1) through 36(A-3) and 36(B-1) through 36(B-3) as well, it is assumed that there is a slight discrepancy between the timing of the registration of the first change area information A1 by the hook processing module 400 and the timing of the registration of the second change area information A2 by the projector driver 128.

Figure 37A:
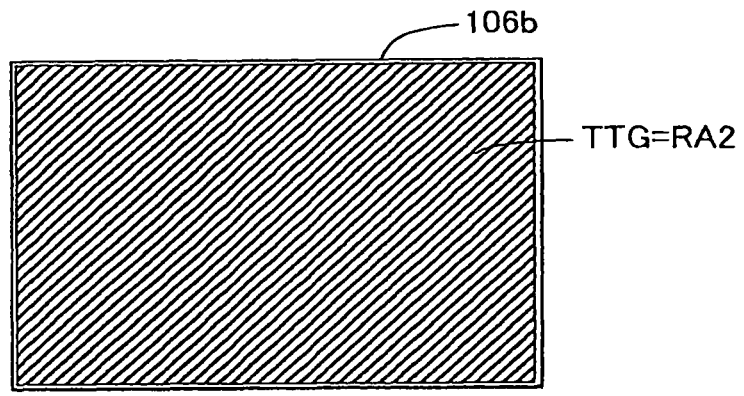
FIGS. 37(A) and 37(B) illustrate the screen update area at the time t20 and the time t21 for the seventh embodiment.
Figure 37B:
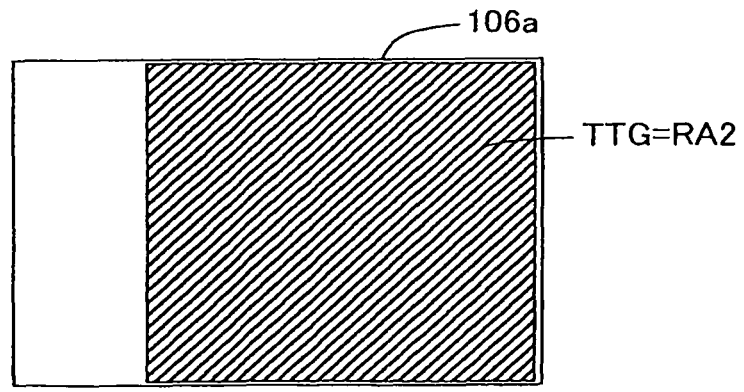

FIGS. 37(A) and 37(B) illustrate the screen update area at time t20 and time t21 for the seventh embodiment. As described previously, with the seventh embodiment, the screen update area TTG is always the same as the second change area RA2. Of the second change area RA2, the image part of the area contained in either the first change area RA1 or the history area RHA1 is directly acquired from the RAM 106, and the image part of the area that is not contained in either the first change area RA1 or the history area RHA1 is acquired from the VRAM 114. As shown in FIGS. 36(A-1) through 36(A-3), at time t20, the second change area RA2 is contained in the first change areas RA1a and RA1b. Also, at time t21, the second change area RA2 is contained in the history area RHA1a and RHA1b. Therefore, at times t20 and t21, all the images are directly acquired from the RAM 106.

As shown in the example of FIGS. 36(A-1) through 36(A-3) and 36(B-1) through 36(B-3), when the image is moved at high speed by the animation effect, there is a high possibility of a timing discrepancy or a time-lag occurring with the registration of the first change area information A1 and that of the second change area information A2. At this time, in case when the transfer history information HA1 is not being used, there may occur a problem that it becomes necessary to acquire the overall image within the second change area RA2 from the VRAM 114 at time t21. In contrast to this, with the sixth and seventh embodiments, the image part within the transfer history area RHA1 is directly acquired from the RAM 106, so it is possible to shorten the time required for acquiring the image.

The VNC server 130 may also be constituted to be able to select and execute one from among a plurality of transfer modes that include the transfer process of the sixth embodiment (also called the "first transfer mode") and the transfer process of the seventh embodiment (also called the "second transfer mode"). Selection of the transfer mode may be performed by the user, or may also be performed by the VNC server 140 automatically selecting the transfer mode according to the processing capability (CPU processing speed, bus transfer speed or the like) of the computer 100 (generally the image supply device). By working in this way, it is possible to select a transfer mode allowing transfer of a desirable image at a suitable transfer speed.

H. Eighth Embodiment

Figure 38:
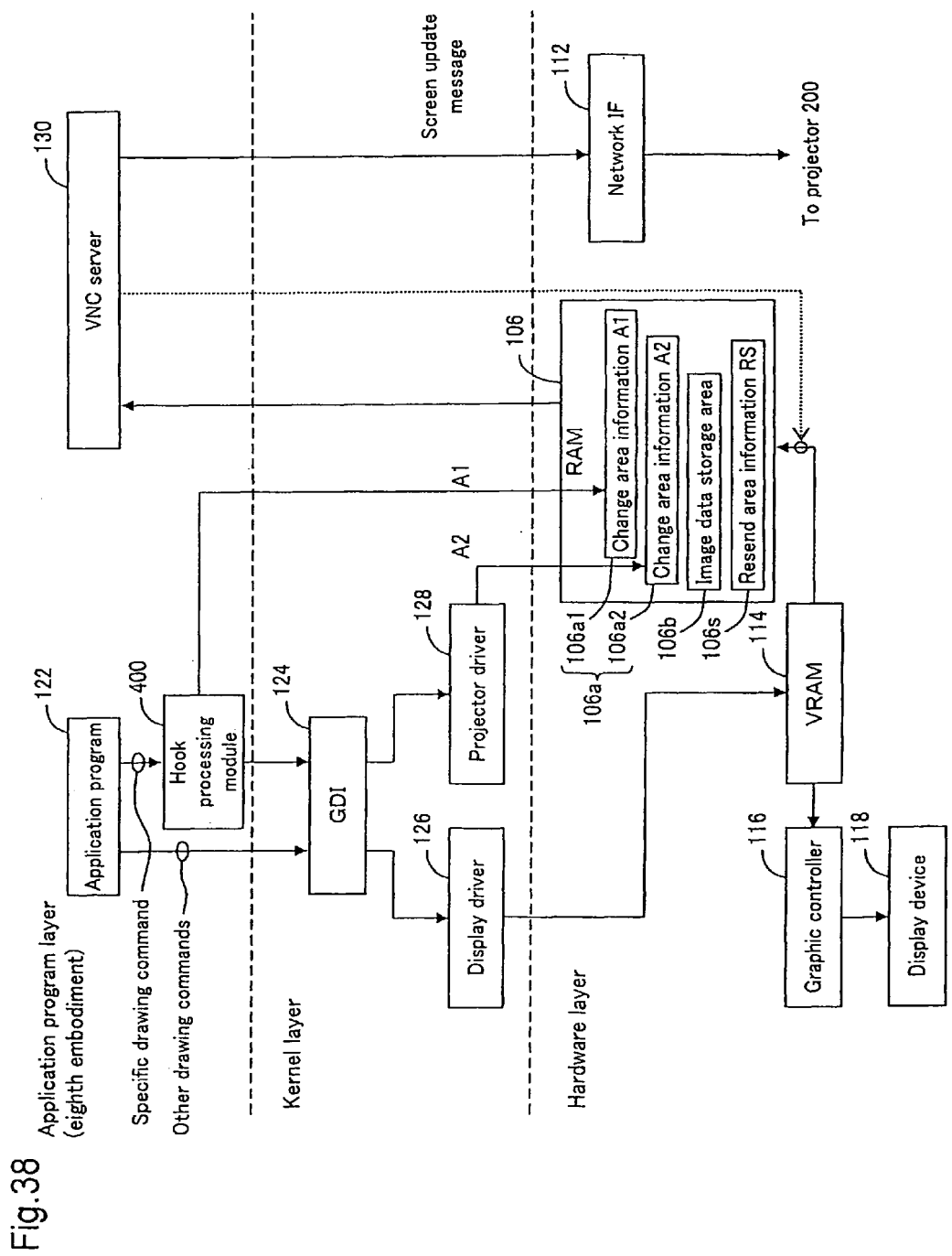
FIG. 38 is an explanatory drawing showing the hierarchical structure of the software and the hardware of the computer for the eighth embodiment.

FIG. 38 is an explanatory drawing showing the hierarchical structure of the software and the hardware of the computer for the eighth embodiment. The difference with the comparative example shown in FIG. 3 is that the hook processing module 400 is added between the application program 122 and the GDI 124, the fact that two types of change area information 106a1 and 106a2 (hereafter called "change area information A1 and A2") are stored within the RAM 106, and the fact that the resending area information 106s (hereafter also called the "resending area information RS") is stored within the RAM 106, and the remainder of the constitution is the same as that in FIG. 3. The difference with the fourth embodiment shown in FIG. 18 is the fact that the resend area information 106s is added, and the remainder of the constitution is the same as that of the fourth embodiment.

Figure 39:
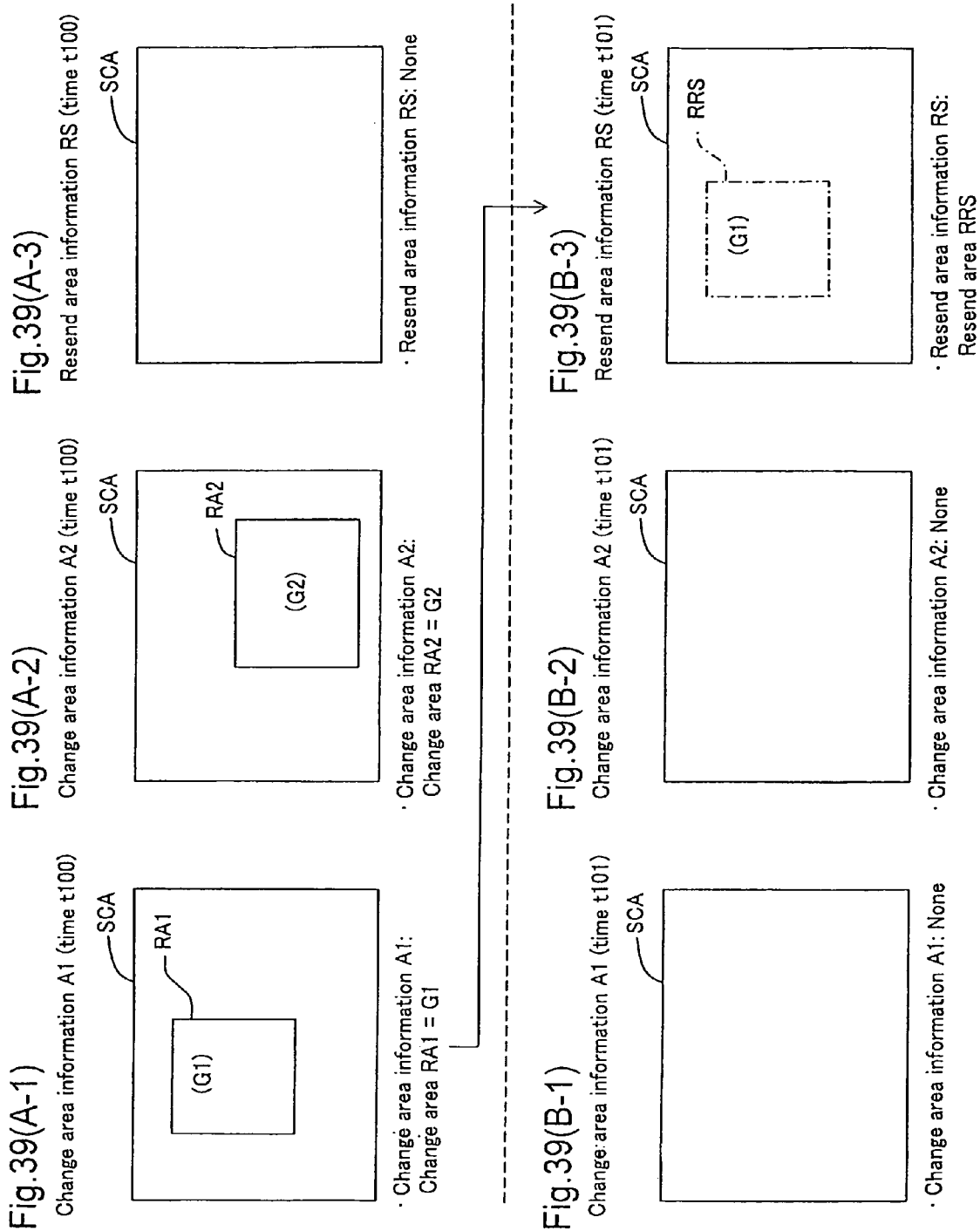
FIGS. 39(A-1) through 39(A-3) and 39(B-1) through 39(B-3) illustrate an example of the two change area information A1 and A2 and the resend area information RS.

FIGS. 39(A-1) through 39(A-3) and 39(B-1) through 39(B-3) illustrate an example of the two change area information A1 and A2 and the resend area information RS. FIGS. 39(A-1) to 39(A-3) show the status at the time t100, and FIGS. 39(B-1) to 39(B-3) show the status at the time t101. The VNC server 130 repeatedly executes the transfer process at specified time intervals, and after transfer is executed at time t100, it is assumed that the next transfer is executed at time t101.

The first change area information A1 shown in FIG. 39(A-1) represents the area RA1 (called the "change area RA1") directly drawn in the image data storage area 106b within the RAM 106 by the hook processing module 400 (FIG. 38). The image within this change area RA1 is called the "image G1." The first change area information A1 is written within the RAM 106 by the hook processing module 400. The second change area information A2 shown in FIG. 39(A-2) represents the area RA2 (called the "change area RA2") drawn within the VRAM 114 by the display driver 126 (FIG. 38). The image within this change area RA2 is called the "image G2." The second change area information A2 is written within the RAM 106 by the projector driver 128. The resend area information RS shown in FIG. 39(A-3) represents the past first change area RA1 (called the "resend area RRS") transferred by the VNC server 130 after being directly drawn in the image data storage area 106b by the hook processing module 400. With the transfer process before time t100, it is assumed there is no first change area RA1, and therefore, at time t100, the resend area information RS will also not be registered. The resend area information RS is written into the RAM 106 by the VNC server 130.

With the example in FIGS. 39(A-1) through 39(A-3) and 39(B-1) through 39(B-3), shown is a state with each of the areas RA1, RA2, and RRS arranged within the same screen area SCA. Here, the "screen area SCA" means the overall area of the image stored in the VRAM 114, and this is equal to the area of the overall image data storage area 106b. Strictly speaking, the first change area RA1 is the area defined by the address within the image data storage area 106b, and the second change area RA2 and the resend area RRS are areas defined by the address within the VRAM 114, but these may be expressed by the same screen area SCA.

As shown in FIGS. 39(B-1) to 39(B-3), at time t101, there are no first and second change area information A1 and A2, and the resend area information RS represents the area of the image G1 (specifically, the same area as the first change area RA1 at time t100). With FIG. 39(B-3), for convenience of illustration, the resend area RRS is drawn with a dot-dash line.

As described below, the VNC server 130 executes the normal transfer process (also called the "normal transfer mode") based on the change area information A1 and A2 at time t100. At time t101, on the other hand, there are no change area information A1 and A2, so the resend process (also called the "resend mode") is executed based on the resend area information RS.

Even if the resend area information RS is registered at time t100, the normal transfer process will be executed at time t100, rather than the resend process. Specifically, when either of the two change area information A1 or A2 exist, the normal transfer process is executed, and when neither of the two change area information A1 or A2 exists, and when the resend area information RS does exist, then the resend process is executed.

Figure 40:
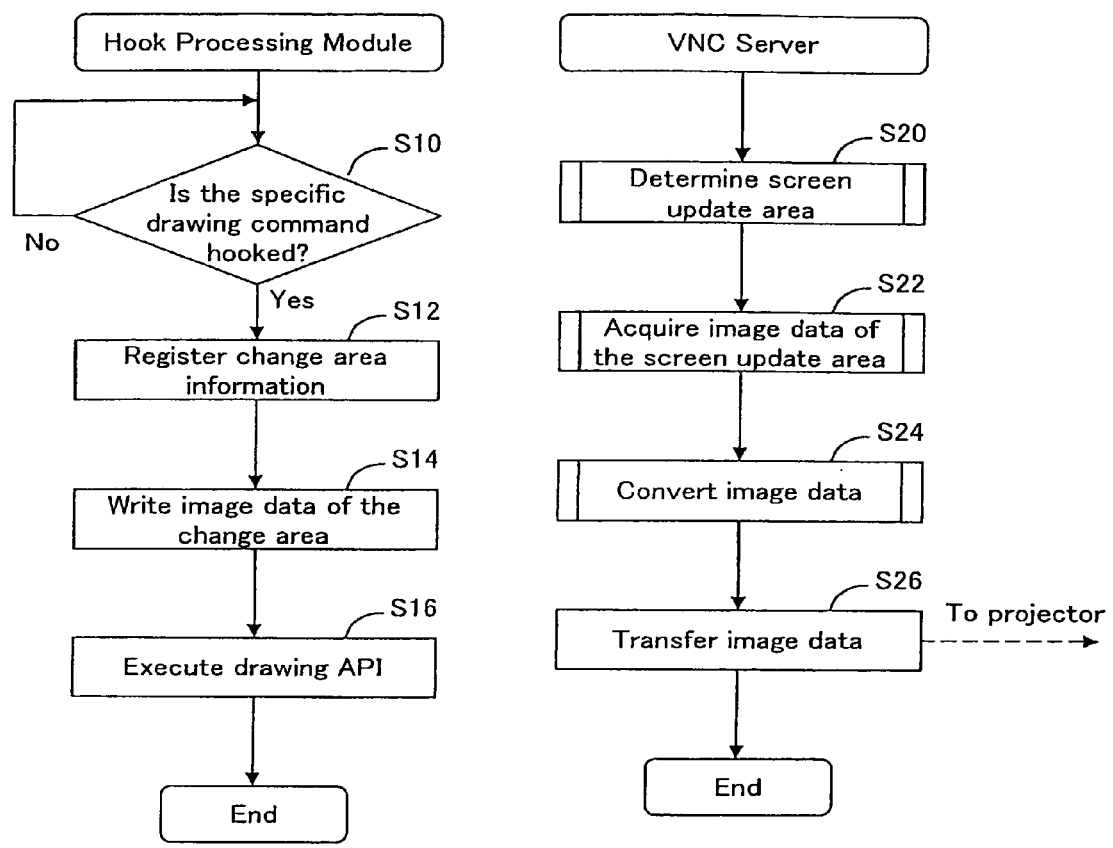
FIG. 40 is a flow chart showing the operation of the hook processing module and the VNC server operation for the eighth embodiment.

FIG. 40 is a flow chart showing the operation of the hook processing module 400 and the VNC server 130 of the eighth embodiment. Steps S10 to S16 are executed by the hook processing module 400, and steps S20 to S26 are executed periodically by the VNC server 130. The overall process flow is the same as that shown in FIG. 19, but the contents of steps S20 and S24 of the VNC server have been changed (described later).

When a specific drawing command is issued from the application program 122, the hook processing module 400 hooks that drawing command at step S10, and instead of the GDI 124, acquires that drawing command.

At step S12, the process of registering the change area information according to the acquired drawing commands is executed. In specific terms, the hook processing module 400 acquires the position and the size of the area for which drawing is performed according to the drawing command (the change area RA1 of FIG. 39(A-1)), and the process of directly writing the change area information A1 representing that change area to the RAM 106 is executed.

At step S14, the process of writing the image data of the change area RA1 is executed. Specifically, the hook processing module 400 produces the image data within the change area RA1 according to the drawing command, and executes the process of directly writing that image data into the image data storage area 106b within the RAM 106.

At step S16, the hook processing module 400 calls the normal GDI function according to the drawing command acquired at step S10 and executes drawing processing. The display driver 126 and the projector driver 128 (FIG. 38), the same as with the comparative example shown in FIG. 3, execute each process according to the drawing commands received from the GDI 124. Specifically, the display driver 126 draws the image within the VRAM 114, and the projector driver 128 writes the change area information A2 showing that drawing area into RAM 106.

Figure 41:
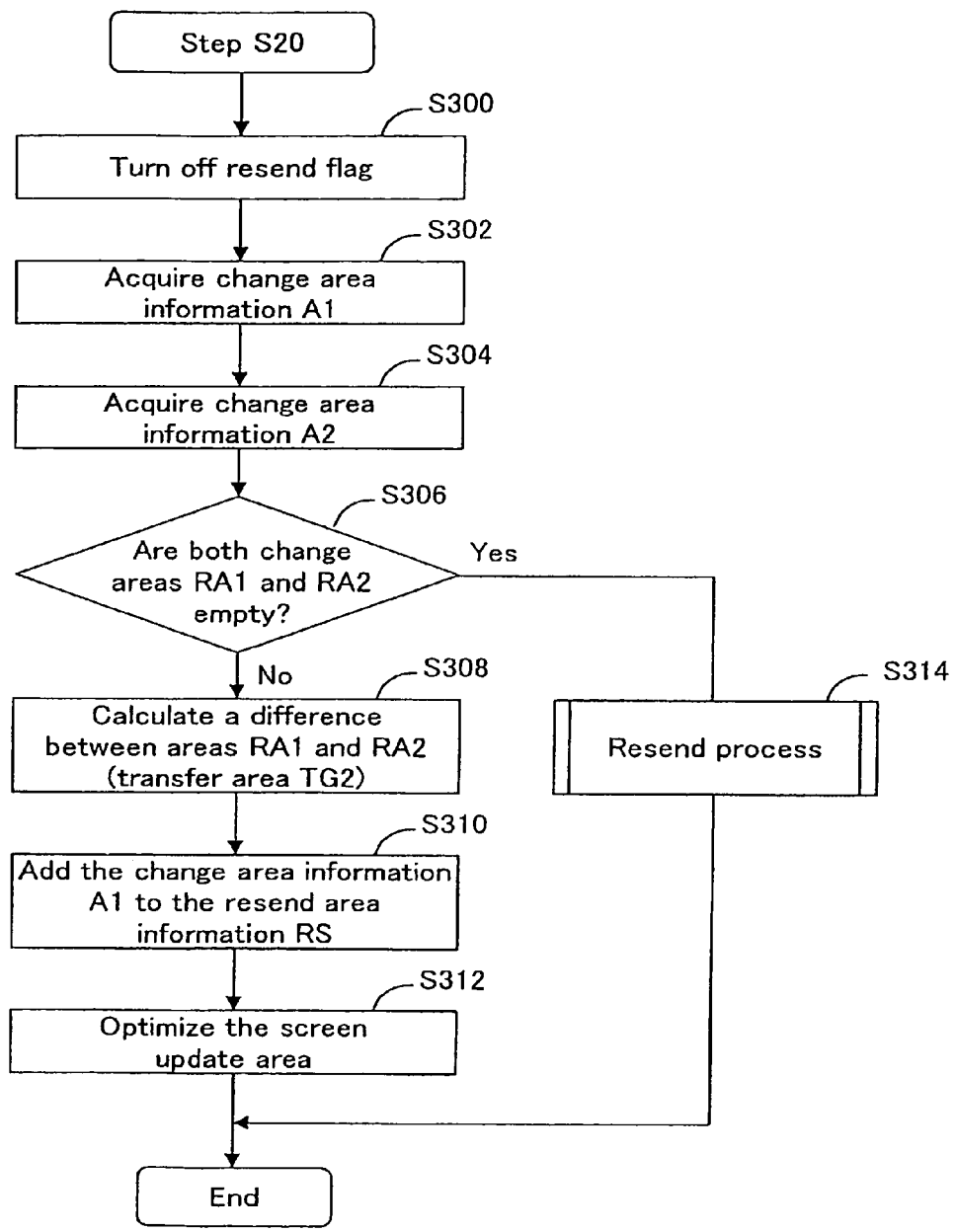
FIG. 41 is a flow chart showing the detailed procedure of step S20 for the eighth embodiment.

Meanwhile, at step S20, the VNC server 130 determines the area of the image data to be transferred to the projector 200 (called the "screen update area"). FIG. 41 is a flow chart showing the detailed procedure of step S20 for the eighth embodiment. At step S300, the resend flag is set to off. This resend flag is a flag for showing whether or not the resend process is to be executed. The on status of the resend flag indicates that the resend process is to be executed, and the off status indicates that the normal transfer process is to be executed. The resend flag is registered within the RAM 106.

At steps S302 and S304, the first and second change area information A1 and A2 are acquired. As described previously, the first change area information A1 is information representing the area drawn in the image data storage area 106b within the RAM 106 by the hook processing module 400, and is written into the RAM 106 by the hook processing module 400. Meanwhile, the second change area information A2 is information representing the area drawn within the VRAM 114 by the display driver 126 and is written into the RAM 106 by the projector driver 128.

Figure 42A:
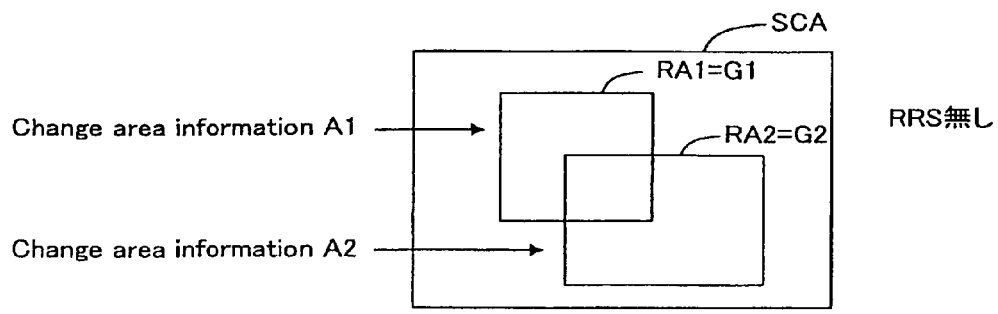
FIGS. 42(A) through 42(D) illustrate the relationship between the change areas and the resend area and the screen update area at the time t100.

FIG. 42(A) shows the two change areas RA1 and RA2 and the resend area RRS at time t100 (FIGS. 39(A-1) to 39(A-3)). However, at time t100, there is no resend area RRS.

With the example in FIG. 42(A), the two change areas RA1 and RA2 are partially overlapping, but there are also cases of the two change areas RA1 and RA2 having various relationships other than this. For example, there are also cases when there is absolutely no overlapping of the two change areas RA1 and RA2, and cases when the two areas completely overlap. For example, in a case when the hook processing module 400 performs drawing according to a specific drawing command, after which the normal drawing modules 124, 126, and 128 perform drawing of the same area according to the same drawing command, the two change areas RA1 and RA2 are the same. However, even when the same drawing command is executed, it is possible to have cases when a slight difference occurs between the two change areas RA1 and RA2 according to each module setting.

Figure 42B:
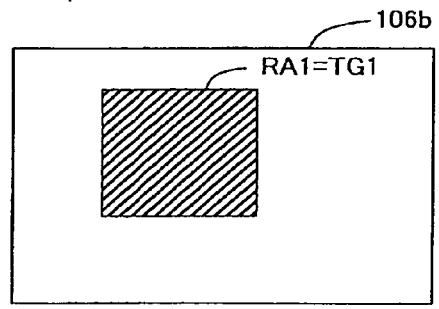
Figure 42C:
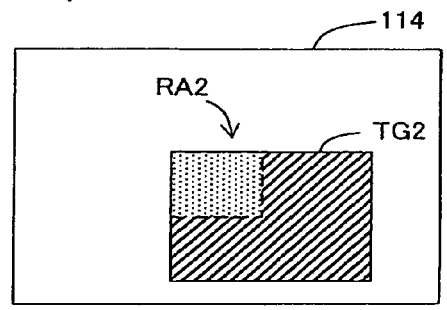
Figure 42D:
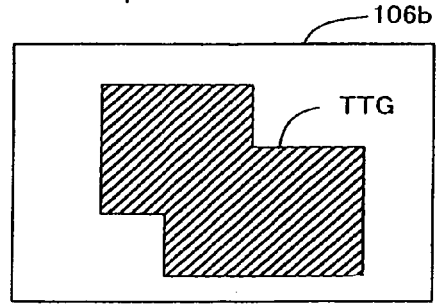

FIG. 42(B) shows the area TG1 for which images are directly acquired from the RAM 106 during image transfer by the VNC server 130 at time t100, and FIG. 42(C) shows the area TG2 for which images are acquired from the VRAM 114. These areas TG1 and TG2 are also called "transfer areas." As can be understood from this example, for normal transfer processing, the image of the first change area RA1 (=TG1) is directly acquired from within the RAM 106, and of the second change area RA2, image of the area TG2 of the part that is not contained in the first change area RA1 is acquired from the VRAM 114. The reason for limiting the second transfer area TG2 in this way is because it decreases the images acquired from the VRAM 114 as much as possible, and reduces the time required for that acquisition. For example, when the two change areas RA1 and RA2 completely overlap, it is not necessary to acquire images from the VRAM 114, so it is possible to perform transfer processing at high speed. FIG. 42(D) shows the entire area (screen update area or total transfer area TTG) transferred by the VNC server 130 at time t100. This screen update area TTG correlates to the total area of the first and second change areas RA1 and RA2.

There are cases when plural pieces of information corresponding to a plurality of drawing commands are contained in the first change area information A1. In this case, the total area of these plurality of drawing command drawing areas become the first change area RA1. The same is also true for the second change area RA2 and the resend area RRS.

At step S306 of FIG. 41, a determination is made of whether both the two change areas RA1 and RA2 are empty or not. When both the two change areas RA1 and RA2 are empty, at step S314 described later, the resend process is executed. Meanwhile, when either of the two change areas RA1 or RA2 is not empty, then the normal transfer process is executed at steps S308 to S312.

At step S308 of FIG. 41, the difference between the change areas RA1 and RA2 represented by the two types of change area information A1 and A2 is calculated. In specific terms, within the second change area RA2, the area TG2 (FIG. 42(C)) that is not contained in the first change area RA1 is calculated.

At step S310, the first change area information A1 is added as the resend area information RS. As a result, the first change area information A1 at time t100 is used as the resend area information RS from the next time t101 and thereafter.

Figure 43A:
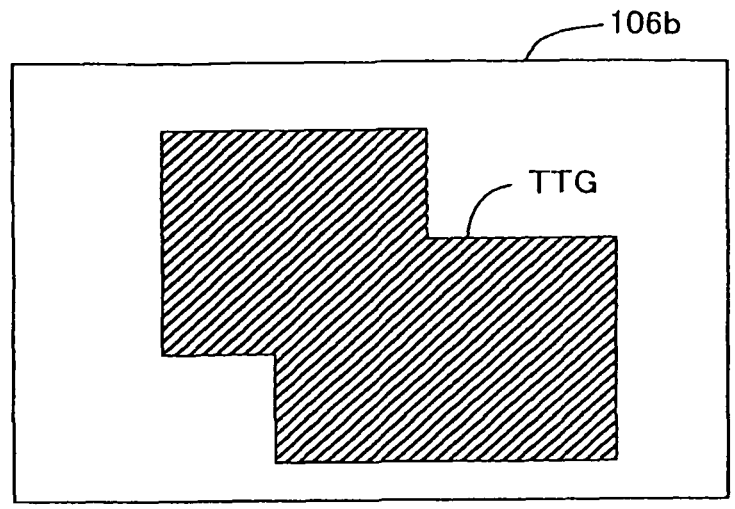
FIGS. 43(A) and 43(B) illustrate the contents of the optimization process of the screen update area.
Figure 43B:
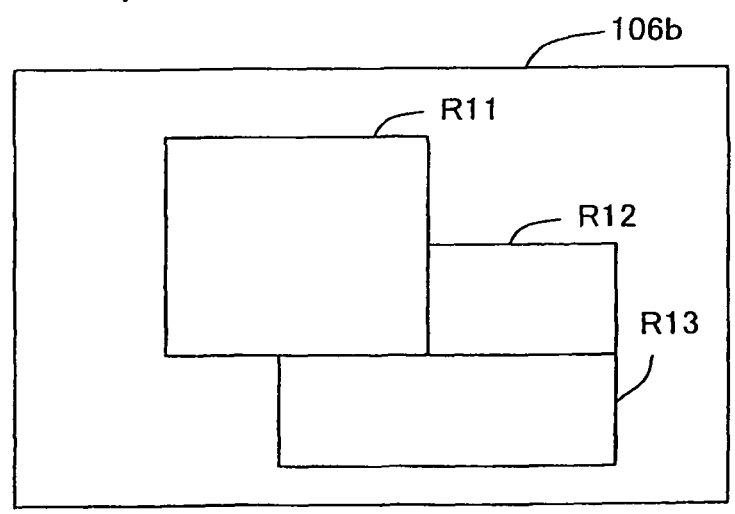

At step S312, the optimization process of the screen update area TTG (FIG. 42(D)) is executed. FIGS. 43(A) and 43(B) illustrate the contents of the optimization process of the screen update area. FIG. 43(A) shows the same screen update area TTG as FIG. 42(D). With the optimization process, as shown in FIG. 43(B), the screen update area TTG is separated into adjacent rectangular areas R11 to R13 that do not mutually overlap. Then, these rectangular areas R11 to R13 are used as the screen update area after optimization. Each screen update area R11 to R13 is rectangular, so compared to a case of transferring a rectangular shaped image that contains the screen update area TTG before optimization, it is possible to reduce the volume of transferred image data.

Figure 44:
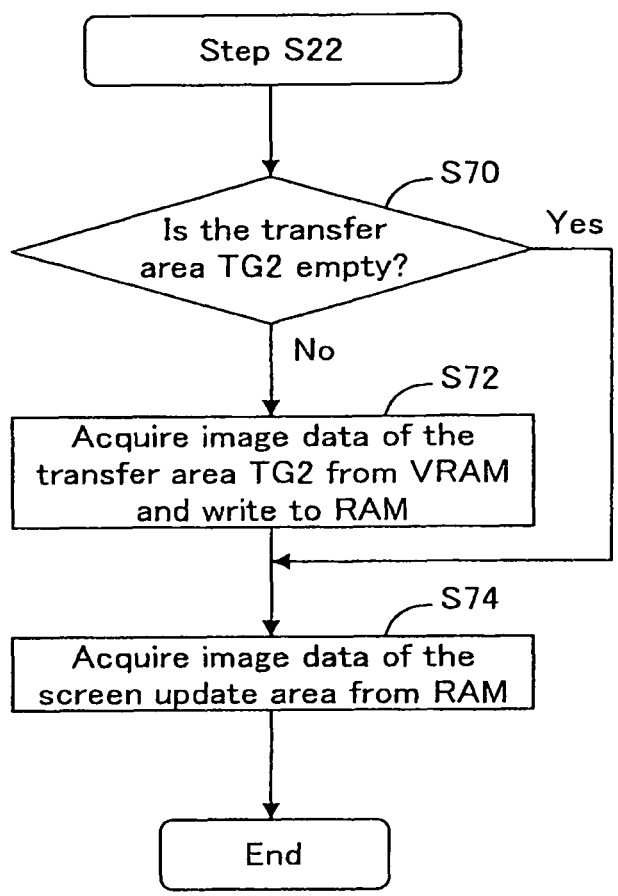
FIG. 44 is a flow chart showing the detailed procedure of step S22 for the eighth embodiment.

At step S22 of FIG. 40, the image data of the image part correlating to the screen update area is acquired. FIG. 44 is a flow chart showing the detailed procedure of step S22 for the eighth embodiment. The procedure of FIG. 44 is the same as the procedure for FIG. 31 of the fourth embodiment described previously. At step S70, a check is done for whether the second transfer area TG2 (FIG. 42(C)) is empty or not. The "second transfer area TG2," as described previously, is the area for which the image data within the screen update area TTG is to be acquired from the VRAM 114. When there is no second change area information A2, and when the second change area A2 is completely contained in the first change area A1, the second transfer area TG2 is empty. When the second transfer area TG2 is empty, the process moves to the step S74 described later. Meanwhile, when the second transfer area TG2 is not empty, step S72 is executed. At step S72, the VNC server 130 acquires the image data of the second transfer area TG2 from the VRAM 114 and writes it to the image data storage area 106b within the RAM 106. As a result, the status is that all of the images within the screen update area TTG shown in FIG. 42(D) are stored in the image data storage area 106b. At step S74, the VNC server 130 acquires the image data of the screen update area TTG from the image data storage area 106b of the RAM 106. Note that what is actually acquired is the image data of each screen update area R11 to R13 (FIG. 43(B)) after optimization processing.

Figure 45:
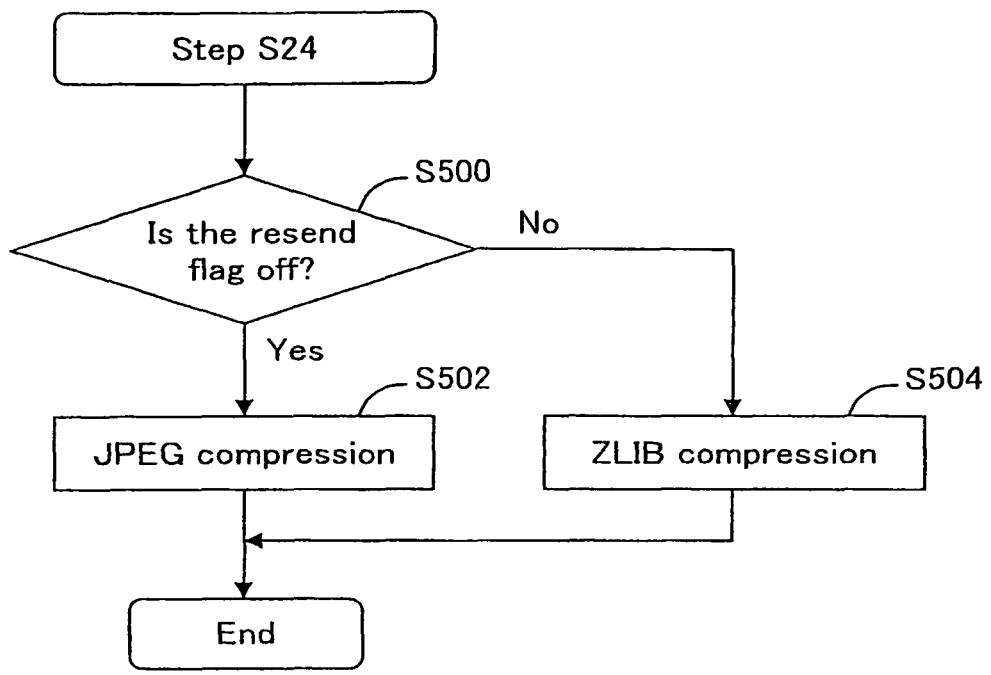
FIG. 45 is a flow chart showing the detailed procedure of step S24 for the eighth embodiment.

At step S24 of FIG. 40, the image data is converted according to a selected one of a plurality of preset encoding formats (also called "compression format" or "compression method"). FIG. 45 is a flow chart showing the detailed procedure of step S24 of the eighth embodiment. At step S502, a determination is made of whether the resend flag is off or not. When the resend flag is off (when normal transfer processing), the image is compressed using JPEG compression. Meanwhile, when the resend flag is on (when resend processing), the image is compressed using ZLIB compression. As is well known, the ZLIB compression is a compression method that uses reversible compression and has no image quality degradation (lossless compression). With this embodiment, with normal transfer processing, JPEG compression is used, so it is possible to reduce the image data volume, and it is possible to increase the transfer speed. Meanwhile, with resend processing, ZLIB compression is used, so it is possible to transfer images with higher image quality.

As the compression method, it is also possible to use various compression methods other than these. It is also possible to use the same compression method for the normal transfer process and the resend process. When using different compression methods for the normal transfer process and the resend process, it is preferable to be able to select the compression method from among a plurality of compression methods including a compression method with relatively large image quality degradation and a compression method with relatively small image quality degradation. In this case, it is preferable to use a compression method with relatively large image quality degradation in the normal transfer process, and it is preferable to use a compression method with relatively small image quality degradation in the resend process. The reason for this is that the resend process is executed when the drawing operation is stopped, and it is easy to see whether the image quality is good or not, so it is desirable to transfer an image with higher image quality in the resend process.

At step S26 of FIG. 40, the screen update message (FIG. 5) containing the image data converted in this way and the change area information is created, and this is transferred to the projector 200 via the network interface unit 112.

At time t101 as well, the processes of steps S20 to S26 of FIG. 40 are executed in the same way. However, at time t101, as shown in FIGS. 39(B-1) to 39(B-3), there are no change area information A1 or A2, and the information representing the area of the image G1 is registered as the resend area information RS. Note that the fact that neither of the two change area information A1 or A2 exists means that there is issued no image drawing command (image drawing operation is stopped). In this case, at step S306 of FIG. 41, both the change areas RA1 and RA2 are empty, so the resend process of step S314 is executed.

Figure 46:
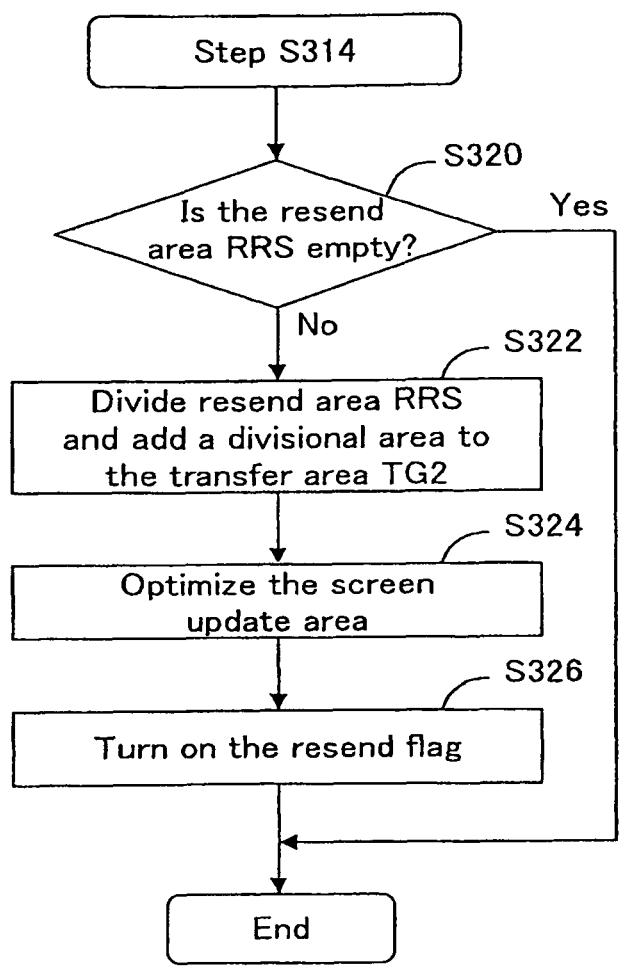
FIG. 46 is a flow chart showing the detailed procedure for step S314.

FIG. 46 is a flow chart showing the detailed procedure of step S314. At step S320, a determination is made of whether the resend area RRS is empty or not. When the resend area RRS is empty, processing ends as is. In this case, the resend process is not actually executed. Meanwhile, when the resend area RRS is not empty, the process of steps S322 to S326 are executed.

FIGS. 47(A) through 47(E) illustrate the processing contents of step S322. As shown in FIG. 47(A), at time t101, there are no first and second change areas RA1 and RA2, and the resend area RRS is the area of the image G1. In this case, at step S322 of FIG. 46, as shown in FIGS. 47(B) and 47(C), the area DP of a specified size that is at the start of the resend area RRS is separated or extracted, and this area DP is added to the second transfer area TG2. Note that the change areas RA1 and RA2 are empty, so only the separated area DP is set as the transfer area TG2. At step S322, the separated area DP is deleted from the resend area RRS. FIG. 47(D) shows the resend area RRS' after this correction. At time t101, the first transfer area TG1 (the area for which the image is directly acquired from the RAM 106) is empty, so the second transfer area TG2 and the screen update area TTG (FIG. 47(E)) are equal. Therefore, all the images within the screen update area TTG is acquired from the VRAM 114 and transferred.

Rather than part of the resend area RRS, the entire area may be set as the second transfer area TG2. In other words, it is possible to set at least part of the resend area RRS as the second transfer area TG2. However, as shown with this embodiment, of the resend area RRS, if only the area DP of a specified size is set as the second transfer area TG2, it is possible to shorten the time required for a one time resend process. It is also possible to return to normal transfer processing quickly when drawing operation is started midway during several processing routines of the resend process for resending the whole resend area RRS, so there is the advantage of not having an excessive delay in processing do to normal transfer processing.

The size of the separate area DP is preferably a preset specified size. Here, the "specified size" is not limited to both the height and width of the area DP being predetermined, but has a broad meaning including various cases such as cases when only the height is predetermined and the width is free (when set to be equal to the resend area RRS width), cases when only the width is predetermined and the height is free (when set to be equal to the resend area RRS height), or cases when the area DP data size (number of bytes from the start) is set, or the like.

At step S324 of FIG. 46, the optimization process of the screen update area TTG is executed. This process is the same as the optimization process (FIGS. 43(A) and 43(B)) for the normal transfer process. At step S326, the resend flag is set to on.

When the screen update area is determined in this way, the steps S22 (FIG. 44), step S24 (FIG. 45), and step S26 of FIG. 40 are executed in sequence. The point of difference between the processing contents of steps S22 to S26 for the resend process with the processing contents with the normal transfer process is only that fact that ZLIB compression is executed at step S504 of FIG. 45. With the resend process, the ZLIB compression is used, so it is possible to transfer images of higher image quality.

In this way, with the eighth embodiment as well, the hook processing module 400 hooks and preempts a specific drawing command, and executes the process of directly writing image data of the change area to the RAM 106. As a result, it is possible to save the time required for transferring the image data from the VRAM 114 to the RAM 106 for the comparative example shown in FIG. 3. As a result, there is the advantage of being able to make the transfer speed sufficiently fast when transferring the image data to the projector 200.

Also, with the eighth embodiment, for the normal transfer process, for the image part of the area TG2 (FIG. 42(C)) which is not drawn by the hook processing module 400, this is acquired from the VRAM 114 and transferred to the projector 200. As a result, for the images drawn by the normal drawing modules 124, 126, and 128 as well, it is possible to transfer to the projector 200 without omission.

Furthermore, with the eighth embodiment, when doing normal transfer processing, the first change area RA1 is registered as the resend area RRS, and when the image drawing operation is stopped, the image within the resend area RRS is acquired from the VRAM 114 and resent. During normal transfer processing, the first change area RA1 image is directly acquired from the RAM 106, but even when the image quality of this image is not desirable, it is possible to resend a high image quality image after drawing operation is stopped. This effect is especially marked in the following kind of case.

Specifically, when a specific drawing command is issued from the application program 122, the drawing command is handed over to the GDI 124 via the hook processing module 400. At this time, there are cases when the image data is further processed at the GDI 124 according to the drawing command. In this case, a difference occurs between the image drawn in the image data storage are 106b within the RAM 106 by the hook processing module 400 and the image drawn in the VRAM 114 by the display driver 126. The image within the first change area RA1 is directly acquired from the image data storage area 106b and transferred and displayed in the projector 200, and meanwhile, the image drawn in the VRAM 114 by the display driver 126 is displayed in the screen of the computer 100 (FIG. 1). Originally, the same image as the image displayed in the computer 100 should be displayed in the projector 200 as well, but when additional image processing is done by the GDI 124, this cannot be realized. However, the difference between the two images is normally slight, so when some kind of change is added to the image within the screen for which drawing is executed successively, there is not a big problem even if there is a difference in the images displayed in the projector 200 and the computer 100. Meanwhile, when drawing operation stops, it is possible for the observer to observe the image in more detail, so there are cases when there is a feeling that the image displayed in the projector 200 is unsatisfactory. With the eighth embodiment, after drawing operation stops, the image within the resend area RRS is acquired from the VRAM 114 and transferred, so in this kind of case as well, it is possible to display a desirable image with the projector 200.

With the embodiments noted above, the resend process starts immediately when drawing operation stops, but it is also possible to start resend processing after a specified time has elapsed after drawing operation stops.

I. Ninth Embodiment

Figure 48:
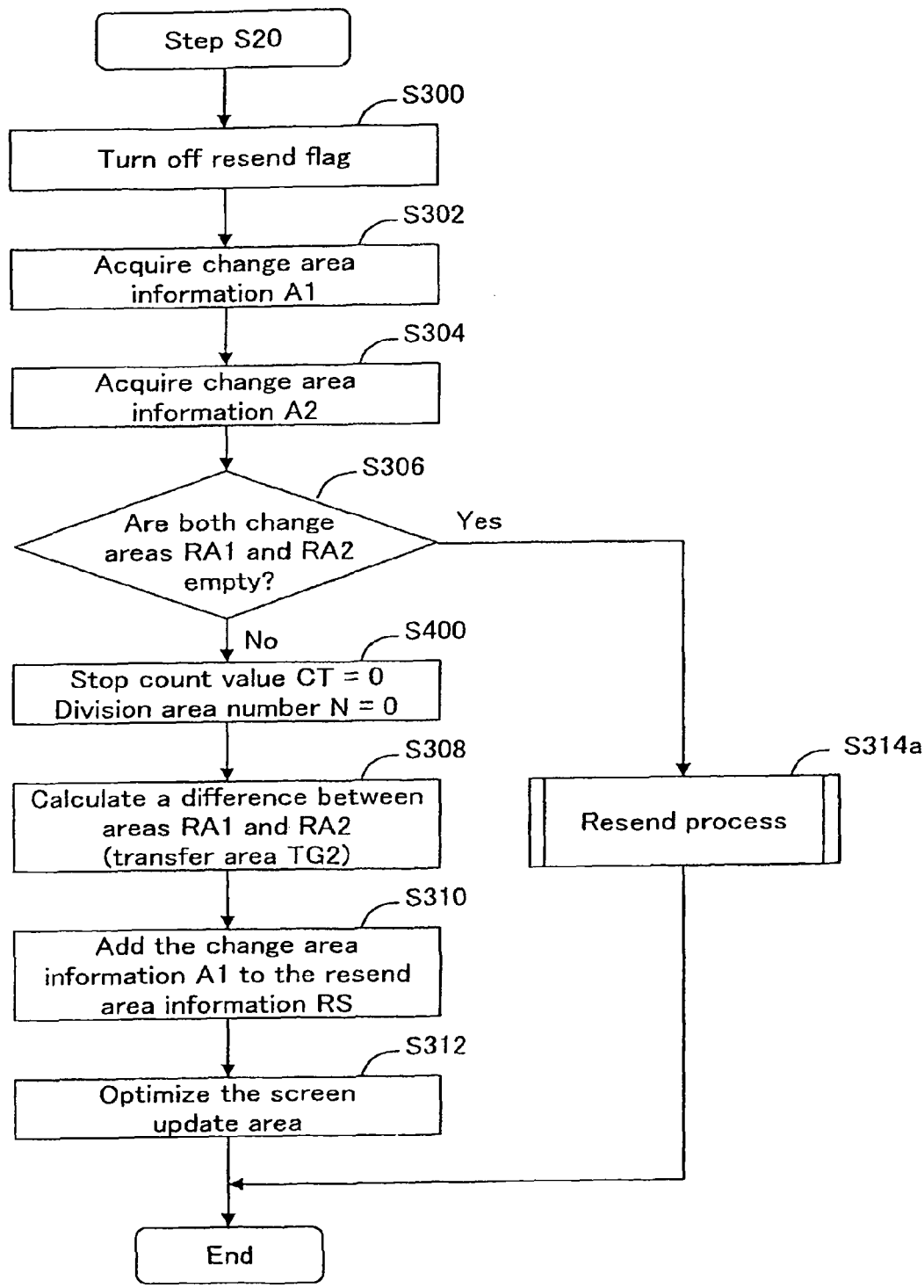
FIG. 48 is a flow chart showing the detailed procedure for step S20 (screen update area determination process) for the ninth embodiment.

FIG. 48 is a flow chart showing the detailed procedure of step S20 (the screen update area determination process of FIG. 40) of the ninth embodiment. The ninth embodiment is only different from the eighth embodiment in terms of the step S20 processing contents (more specifically, the resend processing contents), and the remaining constitution and operations are the same as the eighth embodiment. With FIG. 48, step S400 is added between the step S306 and step S308 of FIG. 41, and the contents of the resend process of step S314a are different from step S314.

At step S400, a stop count value CT and a division area number N are initialized to 0. These parameters CT and N are used for the resend process (step S314a). The normal transfer process (steps S308 to S312) are the same as for the eighth embodiment, so the description is omitted here.

Figure 49:
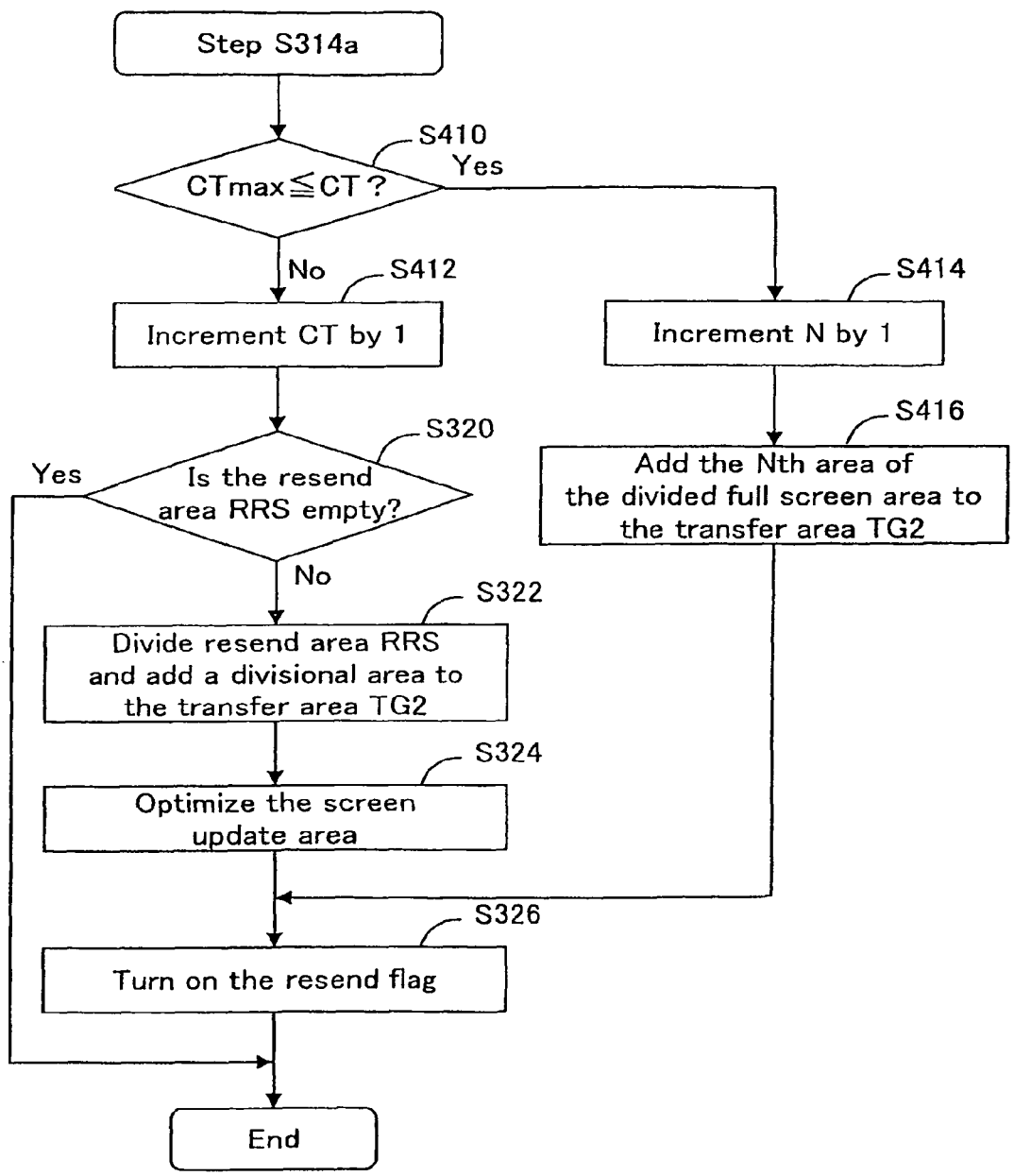
FIG. 49 is a flow chart showing the detailed procedure for step S314a (resending process) for the ninth embodiment.

FIG. 49 is a flow chart showing the detailed procedure of step 314a (resend process) of the ninth embodiment. This FIG. 49 has steps S410 to S416 added to steps S320 to S326 of FIG. 46.

At step S410, a determination is made of whether or not the stop count value CT is a specified maximum value CTmax or greater. The stop count value CT is a parameter showing how many times the transfer processing by the VNC server had started since drawing operation stopped.

When the stop count value CT is less than the maximum value CTmax, at step S412, the stop count value CT is incremented by 1, and the resend process of steps S320 to S326 is executed. Accordingly, the resend process of steps S412 and S320 to S326 is repeatedly executed (CTmax−1) times after the drawing operation has stopped. The processes of steps S320 to S326 are the same as the processes described with the eighth embodiment (FIG. 47), so the description is omitted here.

Meanwhile, when the stop count value CT is the maximum value CTmax or greater, the processes of steps S414 and S416 ("full screen resend process") are executed. Specifically, this full screen resend process is executed when the stop count value CT is the maximum value CTmax or greater, regardless of whether or not the resend area information RS is registered. The maximum value CTmax is set to a value correlating to approximately one second after drawing stops, for example.

At step S414, the division area number N value is incremented by 1. This division area number N is a parameter for indicating an ordinal number of each division area when the full screen area is divided into plurality of areas of a specified size. At step S416, the Nth division area within the full screen area is added to the second transfer area TG2, and the process moves to step S326 and the resend flag is set to on.

Figure 50A:
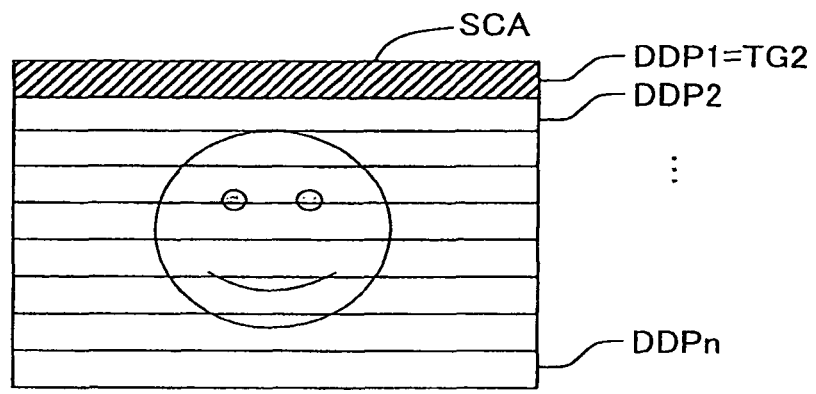
FIGS. 50(A) and 50(B) illustrate the contents of the steps S414 and S416 (full screen resending process).
Figure 50B:
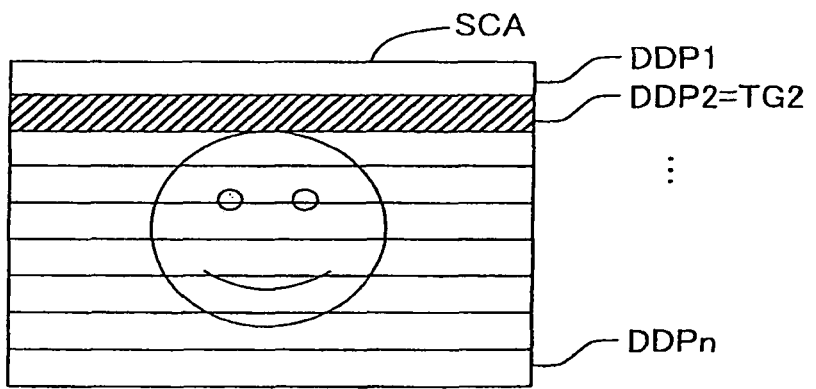

FIGS. 50(A) and 50(B) illustrate the contents of steps S414 and S416. With the full screen resend process, the overall screen area SCA is separated into a plurality of division areas DDP1 to DDPn of a specified size. Then, at time t200 (FIG. 50(A)) when CTmax≦CT, the first division area DDP1 is set as the second transfer area TG2. Also, at the next time t201 (FIG. 50(B)), the second division area DDP2 is set as the second transfer area TG2. Accordingly, the full screen image is transferred to the projector 200 by several times of resend processing.

It is also possible to set not part but rather all of the screen area SCA as the second transfer area TG2. However, as shown with this embodiment, if only a division area of part of the screen area SCA is set as the second transfer area TG2, it is possible to shorten the time required for a one time resend process. Also, it is possible to quickly return to normal transfer processing when drawing operation starts midway in several times of resend processing for the entire screen area, so there is also the advantage of not having excessive delay for processing using normal transfer processing.

It is preferable that the size of the division areas DDP1 to DDPn be a preset specified size. Here, the "specified size" is not limited to cases when both the height and width of the divided section are preset, but has a broad meaning including various cases such as cases when only the height is predetermined and the width is free (when set to be equal to the screen area SCA width), cases when only the width is predetermined and the height is free (when set to be equal to the screen area SCA height), or cases when the division area data size (number of bytes from the start) is set, or the like.

The full screen resend process is also called the "full screen resend process" or the "full screen resend mode." The resend area information RS is not used in the full screen resend process, while the information RS is used in the resend processing described according to FIG. 46 and FIG. 47 with the eighth embodiment. The resend process using the resend area information RS may be called a resend process in a narrow sense. For the ninth embodiment, it is also possible to execute only the full screen resend process without executing the narrowly interpreted resend process.

In this way, with the ninth embodiment, the process moves to the full screen resend process after a specified time has elapsed after drawing stops, so it is possible to transfer an image of the full screen area within the VRAM 114 after the image drawing operation has stopped. Therefore, even when a difference occurs between an image within the VRAM 114, and an image transferred by means of the normal transfer process and the narrowly interpreted resend process using the resend area information RS, it is possible to have the images displayed with the computer 100 and the projector 200 be perfectly matched.

J. Tenth Embodiment

Figure 51:
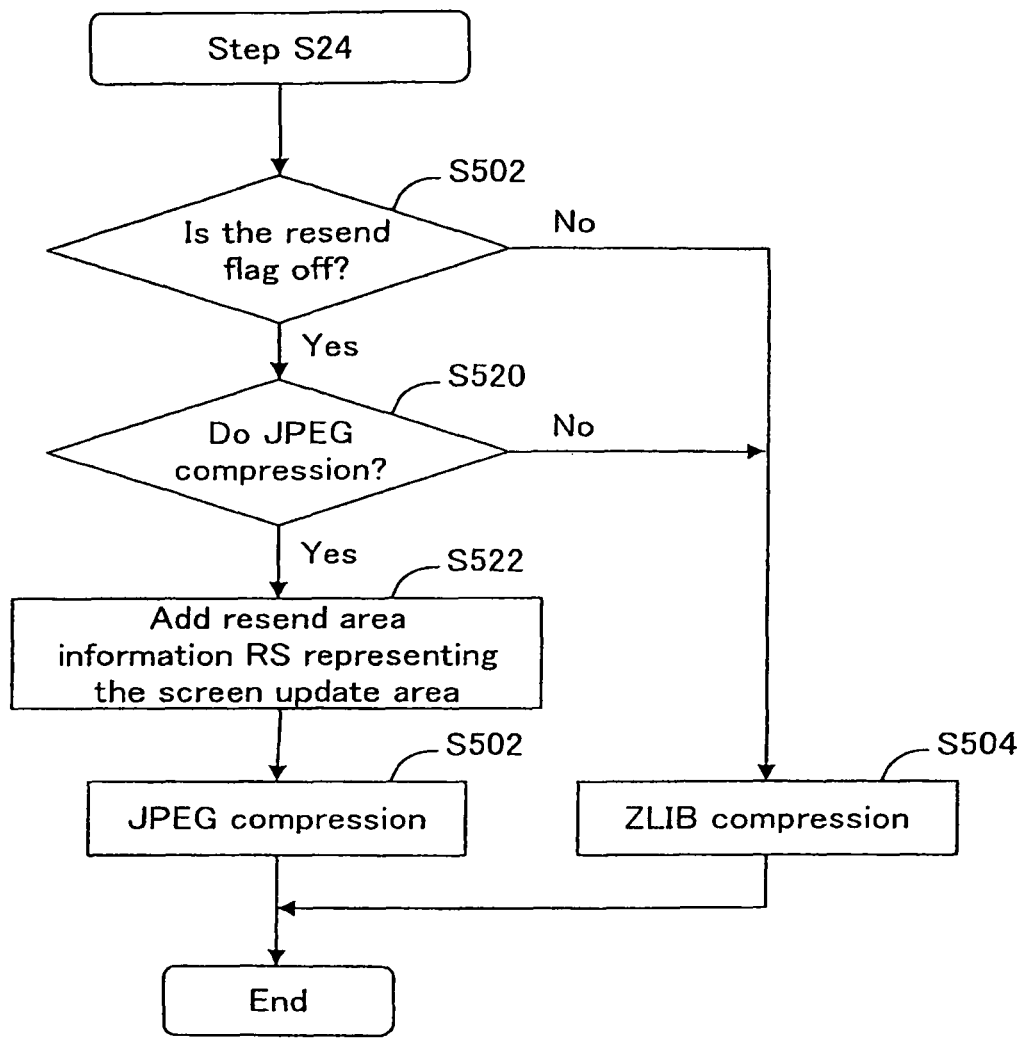
FIG. 51 is a flow chart showing the detailed procedure of step S24 (image data conversion process) for the tenth embodiment.

FIG. 51 is a flow chart showing the detailed procedure of step S24 (the image data conversion process of FIG. 40) for the tenth embodiment. The tenth embodiment is only different from the eighth embodiment and the ninth embodiment in terms of the processing contents of step S24 (more specifically, the resend processing contents), and the remaining constitution and operation are the same as the eighth embodiment and the ninth embodiment. FIG. 51 has steps S520 and S522 added between step S500 and step S502 of FIG. 45.

At step S520, a determination is made of whether or not JPEG compression should be used on the image of the screen update area. Whether or not JPEG compression should be used can be determined by analyzing the image data, for example. In specific terms, sampling can be done of pixel values of a specified pixel count for each specified location of an image (e.g. the four corners and the center), the number of colors counted, and when that number of colors is less than a specified threshold value, ZLIB compression is used, and when it is the threshold value or greater, JPEG compression is used. For images for which the color count is low, it is possible to significantly reduce the data volume even with ZLIB compression, so it is possible to transfer high image quality images without excessively decreasing the transfer speed. Meanwhile, by using JPEG compression on images with a large color count, it is possible to realize high speed image transfer. The judgment of which compression method to use may also be performed for each image drawn by a drawing command, or may also be performed for each individual screen update area after optimization (FIG. 43(B) areas R11 to RR13).

At step S522, the resend area information RS representing the screen update area that is JPEG compressed is additionally registered. By doing this, even when images for which the image quality is somewhat degraded by JPEG compression are transferred, it is possible to resend a high image quality image using the resend process after drawing operation has stopped.

With the tenth embodiment, the two types of areas which are subject to transfer with the normal transfer process are registered as the resend areas. Specifically, at step S310 of FIG. 41, the first change area RA1 is registered as the resend area, and at step S522 of FIG. 51, the area of the image that is JPEG compressed and transferred is also registered as the resend area.

Figure 52A:
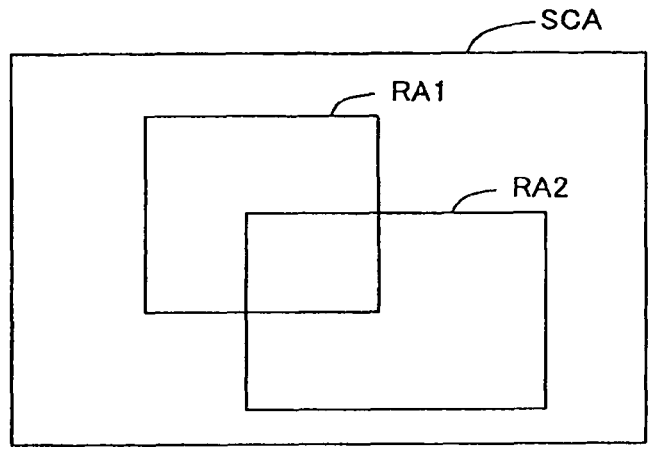
FIGS. 52(A) through 52(C) illustrate an example of the relationship between the change areas RA1 and RA2 and the resend area RRS for the tenth embodiment.
Figure 52B:
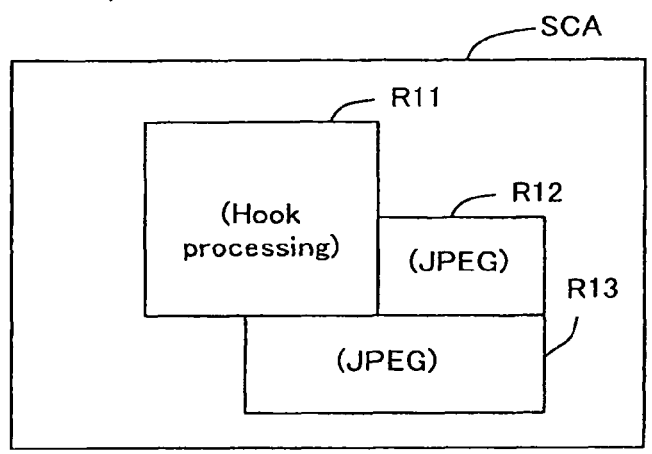
Figure 52C:
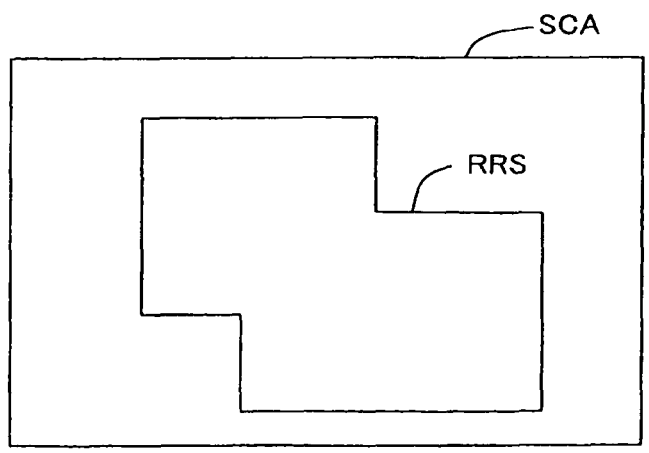

FIGS. 52(A) through 52(C) show an example of the relationship between the change areas RA1 and RA2 and the resend area RRS for the tenth embodiment. FIG. 52(A) is the same as the first and second change areas RA1 and RA2 shown in FIG. 42(A), and the screen update areas R11 to R13 of FIG. 52(B) are the same as those shown in FIG. 43(B). Here, the screen update area R11 is equal to the first change area RA1, and is the area drawn by hook processing. Therefore, this area RA1 is registered as the resend area regardless of which of the JPEG compression and ZLIB compression is used for compressing that image. Also, when transferring the images within the screen update areas R12 and R13, it is assumed that JPEG compression is used. In this case, the screen update areas R12 and R13 are additionally registered as resend areas. As a result, as shown in FIG. 52(C), all of the screen update areas R11 to R13 are registered as resend areas RRS.

For the tenth embodiment, it is also possible to not register the first change area RA1 as the resend area, and to register only the areas of images that are JPEG compressed and transferred as the resend areas. Also, as described with the eighth embodiment as well, it is also possible to use other various compression methods other than the JPEG compression or ZLIB compression.

In this way, with the tenth embodiment, when transferring a JPEG compressed image, that image area is registered as a resend area, and the image within the resend area is acquired from the VRAM 114 and transferred after image drawing operation has stopped, so it is possible to display a high image quality image on the projector 200.

K. Variation Examples

K1. Variation Example 1

As the screen update message supplied from the computer 100 to the projector 200, it is possible to use various items other than those used with the embodiments noted above. For example, the screen update message may contain at least image data. In specific terms, for example, when transferring the image data of the entire screen, it is not necessary to transfer the change area information.

Also, as the screen update message, it is preferable to include at least information indicating the position and the size of the change area (screen update area) and the image data within the change area. The reason for this is because if only the data relating to the change area (the change area information and that image data) is transferred, the volume of data to be transferred is reduced. Furthermore, with the second embodiment, in addition to these information, it is preferable to include in the screen update message the magnification information indicating the expansion/contraction magnification, or the size information indicating the image size after expansion/contraction. With the second embodiment noted above, it is possible to do not only image expansion but also contraction, but the present invention is applicable to cases where only the image expansion is allowed. Also, a moving image is transferred in the second embodiment, but the constitution of the second embodiment is also applicable to cases of transferring still images.

K2. Variation Example 2

With the third embodiment noted above, the processing between the hook processing module 400 and the VNC server 130 is mediated using the transfer flag 106c, but it is also possible to perform mediation of both using another constitution other than the transfer flag 106c. For example, it is also possible to constitute the modules 400 and 130 so as to convey from the VNC server 130 to the hook processing module 400 a message indicating whether or not the image transfer process is being executed. In this case as well, the hook processing module 400 will be kept in standby and suspend starting of processing according to a new drawing command while the VNC server 130 is executing the image transfer.

K3. Variation Example 3

With the third embodiment, as the image transfer process for which the transfer flag 106c is to be maintained as on, it is also possible to exclude step S230 (the image data conversion process) from steps S210 to S230 in FIG. 15, and it is also possible to add step S250 (the image data transfer process) to steps S210 to S230. However, when the screen update area is not the full screen (when using the change area information), the image transfer process preferably includes at least the screen area setting process (step S210) and the screen update area image data acquisition process (step S220). Meanwhile, when the screen update area is the entire screen, it is acceptable to include at least the image data acquisition process (step S220) for the image transfer process.

K4. Variation Example 4

Figure 24A:
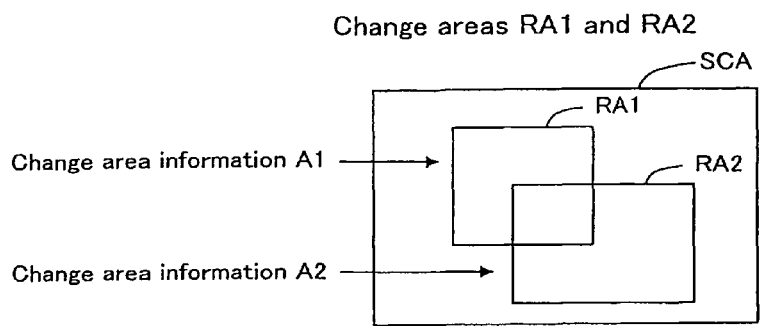
FIGS. 24(A) through 24(D) illustrate the relationship between the change areas and the screen update area for the fifth embodiment.
Figure 24B:
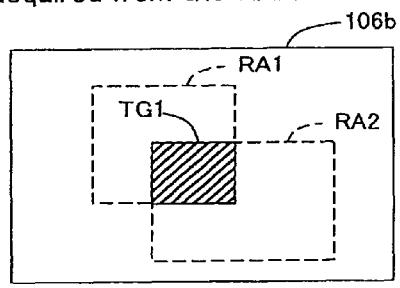
Figure 24C:
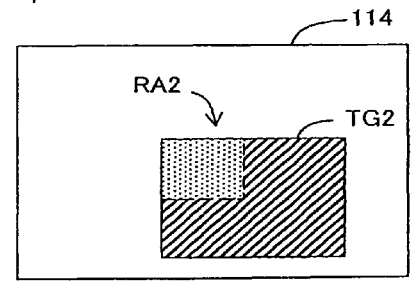
Figure 24D:
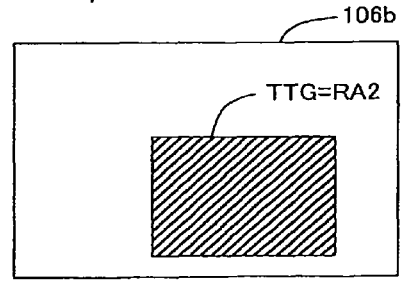

With the fourth to sixth embodiments noted above, the image of the second transfer area TG2 (FIG. 21(C), FIG. 24(C), FIG. 29(C)) is acquired from the VRAM 114, and after being written into the image data storage area 106b within the RAM 106 once, the image of the screen update area TTG is acquired from the RAM 106 and transferred via a network, but it is also possible to omit the process of writing to the image data storage area 106b. However, according to the procedures of the fourth to sixth embodiments noted above, when finally transferring the image via the network, the image is acquired from a single image data storage area 106b, so there is the advantage that the process is simple.

K5. Variation Example 5

With the embodiments noted above, the drawing module is divided into the three modules of the GDI 124, the display driver 126, and the projector driver 128, but the module implementation can be done in various ways, and it is also possible to consolidate these functions into one module.

K6. Variation Example 6

For the embodiments noted above, a personal computer is used as the image supply device, but it is also possible to use another type of computer (mobile computer, hand held computer, workstation, or the like) as the image supply device. Also, instead of these computers, it is also possible to use a device having the same functions as a computer that can be connected to a network. This kind of device can include, for example, an information portable terminal, a portable telephone, a mail terminal, a game machine, and a set top box. Also, as the image display device, it is possible to use various display devices other than a projector.

K7. Variation Example 7

As the network, in addition to a local area network (LAN), it is also possible to use various types of networks such as a wide area network (WAN), the internet, and an intranet. Also, the network may be constituted for wired communication or may be constitute for wireless communication.

K8. Variation Example 8

For the embodiments noted above, part of the functions realized using software may be realized using hardware, or part of the functions realized using hardware may be realized using software.

As noted above, the present invention was described and illustrated in detail, but these are shown as examples, and the present invention is not limited to these, and the present invention concept and its scope is limited only by the attached claims.

What is claimed is:

1. A computer program product configured to supply an image to an image display device via a network from an image supply computer including an application program capable of issuing a first drawing command and a second drawing command, and a first module configured to process the first drawing command issued by the application program, the computer program product comprising:
   a non-transitory computer readable recording medium; and
   a computer program stored on the non-transitory computer readable recording medium, the computer program including:
   a second module configured to acquire an image from a transfer image storage area within a general purpose memory, and transferring the acquired image to the image display device via the network;
   a third module configured to receive the second drawing command issued by the application program and drawing an image in the transfer image storage area within the general purpose memory according to the acquired second drawing command, the second drawing command being received by the third module without passing through the first module,
   wherein when the second module is executing a specified image transfer process including at least a process of acquiring an image from the transfer image storage area, the third module waits in standby without starting processing according to the second drawing command until the image transfer process is completed.

2. A computer program product configured to supply an image to an image display device via a network from an image supply computer including an application program capable of issuing a first drawing command and a second drawing command, and a first module configured to process the first drawing command issued by the application program, the computer program product comprising:
   a non-transitory computer readable recording medium; and
   a computer program stored on the non-transitory computer readable recording medium, the computer program including:
   a second module configured to acquire an image from a transfer image storage area within a general purpose memory, and transferring the acquired image to the image display device via the network;
   a third module configured to receive the second drawing command issued by the application program and drawing an image in the transfer image storage area within the general purpose memory according to the acquired second drawing command, the second drawing command being received by the third module without passing through the first module, wherein the third module is configured to write, into the general purpose memory, first change area information that indicates a first change area that is an area within the transfer image storage area for which the image is drawn according to the second drawing command, and to supply to the first module the second drawing command after processing the second drawing command, and the first module is configured to draw an image into a frame memory according to the first drawing command received from the application program or the second drawing command received from the third module, and to write, into the general purpose memory, second change area information that indicates a second change area that is an area within the frame memory for which the image is drawn according to the first or second drawing command, and the second module executes:

(i) referencing the first and second change area information stored within the general purpose memory, and acquiring an image within an area of the second change area which is not contained in the first change area from the frame memory, (ii) acquiring an image within the first change area from the transfer image storage area without accessing the frame memory, and (iii) transferring the acquired images together with screen update area information to the image display device via the network, the screen update area information indicating a screen update area that is the total of the first and second change areas.

3. A computer program product configured to supply an image to an image display device via a network from an image supply computer including an application program capable of issuing a first drawing command and a second drawing command, and a first module configured to process the first drawing command issued by the application program, the computer program product comprising:

a non-transitory computer readable recording medium; and a computer program stored on the non-transitory computer readable recording medium, the computer program including:

a second module configured to acquire an image from a transfer image storage area within a general purpose memory, and transferring the acquired image to the image display device via the network;

a third module configured to receive the second drawing command issued by the application program and drawing an image in the transfer image storage area within the general purpose memory according to the acquired second drawing command, the second drawing command being received by the third module without passing through the first module, wherein the third module is configured to write, into the general purpose memory, first change area information for indicating a first change area that is an area within the transfer image storage area for which an image is drawn according to the second drawing command, and to supply to the first module the second drawing command after processing the second drawing command, the first module is configured to draw an image into a frame memory according to the first drawing command received from the application program or the second drawing command received from the third module, and to write, into the general purpose memory, second change area information for indicating a second change area that is an area within the frame memory for which an image is drawn according to the first or second drawing command, and the second module executes:

(i) referencing the first and second change area information stored within the general purpose memory, and acquiring from the frame memory an image within an area of the second change area which is not contained in the first change area, (ii) acquiring an image within an area of the second change area that is also contained in the first change area from the transfer image storage area without accessing the frame memory, and (iii) transferring the acquired images together with screen update area information to the image display device via the network, the screen update area information indicating a screen update area that is equivalent to the second change area.

4. A computer program product configured to supply an image to an image display device via a network from an image supply computer including an application program capable of issuing a first drawing command and a second drawing command, and a first module configured to process the first drawing command issued by the application program, the computer program product comprising:

a non-transitory computer readable recording medium; and a computer program stored on the non-transitory computer readable recording medium, the computer program including:

a second module configured to acquire an image from a transfer image storage area within a general purpose memory, and transferring the acquired image to the image display device via the network;

a third module configured to receive the second drawing command issued by the application program and drawing an image in the transfer image storage area within the general purpose memory according to the acquired second drawing command, the second drawing command being received by the third module without passing through the first module, wherein the third module is configured to write, into the general purpose memory, first change area information for indicating a first change area that is an area within the transfer image storage area for which the image is drawn according to the second drawing command, and to supply to the first module the second drawing command after processing the second drawing command, the first module is configured to draw an image into a frame memory according to the first drawing command received from the application program or the second drawing command received from the third module, and to write, into the general purpose memory, second change area information for indicating a second change area that is an area within the frame memory for which the image is drawn according to the first or second drawing command, and the second module executes:

(i) setting as a history area the first change area that exists in the transfer process during a specified preceding time period, and writing, into the general purpose memory, transfer history information for representing the history area, (ii) referencing the first and second change area information and the transfer history information stored in the general purpose memory, and acquiring from the frame memory an image within an area of the second change area that is not included in either the first change area or the history area,
(iii) acquiring from the transfer image storage area an image within the first change area and an image within an area of the second change area that is not contained in the first change area and that is contained in the history area, without accessing the frame memory, and
(iv) transferring the acquired images together with screen update area information to the image display area via the network, the screen update area information indicating a screen update area that is the total of the first and second change areas.

5. A computer program product configured to supply an image to an image display device via a network from an image supply computer including an application program capable of issuing a first drawing command and a second drawing command, and a first module configured to process the first drawing command issued by the application program, the computer program product comprising:
a non-transitory computer readable recording medium; and
a computer program stored on the non-transitory computer readable recording medium, the computer program including:
a second module configured to acquire an image from a transfer image storage area within a general purpose memory, and transferring the acquired image to the image display device via the network;
a third module configured to receive the second drawing command issued by the application program and drawing an image in the transfer image storage area within the general purpose memory according to the acquired second drawing command, the second drawing command being received by the third module without passing through the first module,
wherein the third module is configured to write, into the general purpose memory, first change area information for indicating a first change area that is an area within the transfer image storage area for which the image is drawn according to the second drawing command, and to supply to the first module the second drawing command after processing the second drawing command,
the first module is configured to draw an image into a frame memory according to the first drawing command received from the application program or the second drawing command received from the third module, and to write, into the general purpose memory, second change area information for indicating a second change area that is an area within the frame memory for which the image is drawn according to the first or second drawing command, and
the second module executes:
(i) setting as a history area the first change area that exists for the transfer process during a specified preceding time period, and writing, into the general purpose memory, transfer history information for representing the history area,
(ii) referencing the first and second change area information and the transfer history information stored in the general purpose memory, and acquiring from the frame memory an image within an area of the second change area that is not included in either the first change area or the history area,
(iii) acquiring from the transfer image storage area an image within an area of the second change area that is contained in at least one of the first change area and the history area without accessing the frame memory, and
(iv) transferring the acquired images together with screen update area information to the image display area via the network, the screen update area information indicating a screen update area that is equivalent to the second change area.

6. A computer program product configured to supply an image to an image display device via a network from an image supply computer including an application program capable of issuing a first drawing command and a second drawing command, and a first module configured to process the first drawing command issued by the application program, the computer program product comprising:
a non-transitory computer readable recording medium; and
a computer program stored on the non-transitory computer readable recording medium, the computer program including:
a second module configured to acquire an image from a transfer image storage area within a general purpose memory, and transferring the acquired image to the image display device via the network;
a third module configured to receive the second drawing command issued by the application program and drawing an image in the transfer image storage area within the general purpose memory according to the acquired second drawing command, the second drawing command being received by the third module without passing through the first module,
wherein the first module is configured to draw an image into a frame memory according to the first drawing command received from the application program or the second drawing command received from the third module,
and the second module has:
a normal transfer mode configured to acquire and transfer the image drawn in the transfer image storage area by the third module when image drawing operation is performed, and
a resend mode configured to acquire and transfer the image drawn in the frame memory by the first module after the image drawing operation stops.

7. An image supply device that supplies an image to an image display device via a network from an image supply computer including an application program capable of issuing a first drawing command and a second drawing command, and a drawing unit configured to process the first drawing command issued by the application program, the image supply device comprising:
a general purpose memory;
an image transfer processing unit that is configured to acquire an image from a transfer image storage area within the general purpose memory, and that transfers the acquired image to the image display device via the network;
a hook processing unit that is configured to receive the second drawing command issued by the application program and that draws an image in the transfer image storage area within the general purpose memory according to the acquired second drawing command, the second drawing command being received by the hook processing unit without passing through the drawing unit,
wherein when the image transfer processing unit is executing a specified image transfer process including at least a process of acquiring an image from the transfer image storage area, the hook processing unit waits in standby without starting processing according to the second drawing command until the image transfer process is completed.

8. An image supply device that supplies an image to an image display device via a network from an image supply computer including an application program capable of issuing a first drawing command and a second drawing command, and a drawing unit configured to process the first drawing command issued by the application program, the image supply device comprising:

a general purpose memory;

an image transfer processing unit that is configured to acquire an image from a transfer image storage area within the general purpose memory, and that transfers the acquired image to the image display device via the network;

a hook processing unit that is configured to receive the second drawing command issued by the application program and that draws an image in the transfer image storage area within the general purpose memory according to the acquired second drawing command, the second drawing command being received by the hook processing unit without passing through the drawing unit, wherein the hook processing unit is configured to write, into the general purpose memory, first change area information that indicates a first change area that is an area within the transfer image storage area for which the image is drawn according to the second drawing command, and to supply to the drawing unit the second drawing command after processing the second drawing command, and the drawing unit is configured to draw an image into a frame memory according to the first drawing command received from the application program or the second drawing command received from the hook processing unit, and to write, into the general purpose memory, second change area information that indicates a second change area that is an area within the frame memory for which the image is drawn according to the first or second drawing command, and the image transfer processing unit executes:

(i) referencing the first and second change area information stored within the general purpose memory, and acquiring an image within an area of the second change area which is not contained in the first change area from the frame memory, (ii) acquiring an image within the first change area from the transfer image storage area without accessing the frame memory, and (iii) transferring the acquired images together with screen update area information to the image display device via the network, the screen update area information indicating a screen update area that is the total of the first and second change areas.

9. An image supply device that supplies an image to an image display device via a network from an image supply computer including an application program capable of issuing a first drawing command and a second drawing command, and a drawing unit configured to process the first drawing command issued by the application program, the image supply device comprising:

a general purpose memory;

an image transfer processing unit that is configured to acquire an image from a transfer image storage area within the general purpose memory, and that transfers the acquired image to the image display device via the network;

a hook processing unit that is configured to receive the second drawing command issued by the application program and that draws an image in the transfer image storage area within the general purpose memory according to the acquired second drawing command, the second drawing command being received by the hook processing unit without passing through the drawing unit, wherein the hook processing unit is configured to write, into the general purpose memory, first change area information for indicating a first change area that is an area within the transfer image storage area for which an image is drawn according to the second drawing command, and to supply to the drawing unit the second drawing command after processing the second drawing command, the drawing unit is configured to draw an image into a frame memory according to the first drawing command received from the application program or the second drawing command received from the hook processing unit, and to write, into the general purpose memory, second change area information for indicating a second change area that is an area within the frame memory for which an image is drawn according to the first or second drawing command, and the image transfer processing unit executes:

(i) referencing the first and second change area information stored within the general purpose memory, and acquiring from the frame memory an image within an area of the second change area which is not contained in the first change area, (ii) acquiring an image within an area of the second change area that is also contained in the first change area from the transfer image storage area without accessing the frame memory, and (iii) transferring the acquired images together with screen update area information to the image display device via the network, the screen update area information indicating a screen update area that is equivalent to the second change area.

10. An image supply device that supplies an image to an image display device via a network from an image supply computer including an application program capable of issuing a first drawing command and a second drawing command, and a drawing unit configured to process the first drawing command issued by the application program, the image supply device comprising:

a general purpose memory;

an image transfer processing unit that is configured to acquire an image from a transfer image storage area within the general purpose memory, and that transfers the acquired image to the image display device via the network;

a hook processing unit that is configured to receive the second drawing command issued by the application program and that draws an image in the transfer image storage area within the general purpose memory according to the acquired second drawing command, the second drawing command being received by the hook processing unit without passing through the drawing unit, wherein the hook processing unit is configured to write, into the general purpose memory, first change area information for indicating a first change area that is an area within the transfer image storage area for which the image is drawn according to the second drawing command, and to supply to the drawing unit the second drawing command after processing the second drawing command, the drawing unit is configured to draw an image into a frame memory according to the first drawing command received from the application program or the second drawing command received from the hook processing unit, and to write, into the general purpose memory, second change area information for indicating a second change area that is an area within the frame memory for which the image is drawn according to the first or second drawing command, and the image transfer processing unit executes:

(i) setting as a history area the first change area that exists in the transfer process during a specified preceding time period, and writing, into the general purpose memory, transfer history information for representing the history area, (ii) referencing the first and second change area information and the transfer history information stored in the general purpose memory, and acquiring from the frame memory an image within an area of the second change area that is not included in either the first change area or the history area, (iii) acquiring from the transfer image storage area an image within the first change area and an image within an area of the second change area that is not contained in the first change area and that is contained in the history area, without accessing the frame memory, and (iv) transferring the acquired images together with screen update area information to the image display area via the network, the screen update area information indicating a screen update area that is the total of the first and second change areas.

11. An image supply device that supplies an image to an image display device via a network from an image supply computer including an application program capable of issuing a first drawing command and a second drawing command, and a drawing unit configured to process the first drawing command issued by the application program, the image supply device comprising:

a general purpose memory;

an image transfer processing unit that is configured to acquire an image from a transfer image storage area within the general purpose memory, and that transfers the acquired image to the image display device via the network;

a hook processing unit that is configured to receive the second drawing command issued by the application program and that draws an image in the transfer image storage area within the general purpose memory according to the acquired second drawing command, the second drawing command being received by the hook processing unit without passing through the drawing unit, wherein the hook processing unit is configured to write, into the general purpose memory, first change area information for indicating a first change area that is an area within the transfer image storage area for which the image is drawn according to the second drawing command, and to supply to the drawing unit the second drawing command after processing the second drawing command, the drawing unit is configured to draw an image into a frame memory according to the first drawing command received from the application program or the second drawing command received from the hook processing unit, and to write, into the general purpose memory, second change area information for indicating a second change area that is an area within the frame memory for which the image is drawn according to the first or second drawing command, and the image transfer processing unit executes:

(i) setting as a history area the first change area that exists for the transfer process during a specified preceding time period, and writing, into the general purpose memory, transfer history information for representing the history area, (ii) referencing the first and second change area information and the transfer history information stored in the general purpose memory, and acquiring from the frame memory an image within an area of the second change area that is not included in either the first change area or the history area, (iii) acquiring from the transfer image storage area an image within an area of the second change area that is contained in at least one of the first change area and the history area without accessing the frame memory, and (iv) transferring the acquired images together with screen update area information to the image display area via the network, the screen update area information indicating a screen update area that is equivalent to the second change area.

12. An image supply device that supplies an image to an image display device via a network from an image supply computer including an application program capable of issuing a first drawing command and a second drawing command, and a drawing unit configured to process the first drawing command issued by the application program, the image supply device comprising:

a general purpose memory;

an image transfer processing unit that is configured to acquire an image from a transfer image storage area within the general purpose memory, and that transfers the acquired image to the image display device via the network;

a hook processing unit that is configured to receive the second drawing command issued by the application program and that draws an image in the transfer image storage area within the general purpose memory according to the acquired second drawing command, the second drawing command being received by the hook processing unit without passing through the drawing unit, wherein the drawing unit is configured to draw an image into a frame memory according to the first drawing command received from the application program or the second drawing command received from the hook processing unit, and the image transfer processing unit has:

a normal transfer mode configured to acquire and transfer the image drawn in the transfer image storage area by the hook processing unit when image drawing operation is performed, and a resend mode configured to acquire and transfer the image drawn in the frame memory by the drawing unit after the image drawing operation stops.

13. An image supply method for supplying an image to an image display device via a network from an image supply computer including an application program capable of issuing a first drawing command and a second drawing command, and a module configured to process the first drawing command issued by the application program, the image supply method comprising:

acquiring an image from a transfer image storage area within a general purpose memory;

transferring the acquired image to the image display device via the network;

receiving the second drawing command issued by the application program, and drawing an image in the transfer image storage area within the general purpose memory according to the acquired second drawing command, the second drawing command being received without passing through the module, wherein when the image transfer process is executing a specified image transfer process including at least a process of acquiring an image from the transfer image storage area, the process configured to draw an image in the transfer image storage area waits in standby without starting processing according to the second drawing command until the image transfer process is completed.

14. An image supply method for supplying an image to an image display device via a network from an image supply computer including an application program capable of issuing a first drawing command and a second drawing command, and a module configured to process the first drawing command issued by the application program, the image supply method comprising:

acquiring an image from a transfer image storage area within a general purpose memory;

transferring the acquired image to the image display device via the network;

receiving the second drawing command issued by the application program, and drawing an image in the transfer image storage area within the general purpose memory according to the acquired second drawing command, the second drawing command being received without passing through the module, wherein the process configured to draw an image in the transfer image storage area writes, into the general purpose memory, first change area information that indicates a first change area that is an area within the transfer image storage area for which the image is drawn according to the second drawing command, and supplies to the module the second drawing command after processing the second drawing command, and the module is configured to draw an image into a frame memory according to the first drawing command received from the application program or the second drawing command, and to write, into the general purpose memory, second change area information that indicates a second change area that is an area within the frame memory for which the image is drawn according to the first or second drawing command, and the image transfer process executes:

(i) referencing the first and second change area information stored within the general purpose memory, and acquiring an image within an area of the second change area which is not contained in the first change area from the frame memory, (ii) acquiring an image within the first change area from the transfer image storage area without accessing the frame memory, and (iii) transferring the acquired images together with screen update area information to the image display device via the network, the screen update area information indicating a screen update area that is the total of the first and second change areas.

15. An image supply method for supplying an image to an image display device via a network from an image supply computer including an application program capable of issuing a first drawing command and a second drawing command, and a module configured to process the first drawing command issued by the application program, the image supply method comprising:

acquiring an image from a transfer image storage area within a general purpose memory;

transferring the acquired image to the image display device via the network;

receiving the second drawing command issued by the application program, and drawing an image in the transfer image storage area within the general purpose memory according to the acquired second drawing command, the second drawing command being received without passing through the module, wherein the process configured to draw an image in the transfer image storage area writes, into the general purpose memory, first change area information for indicating a first change area that is an area within the transfer image storage area for which an image is drawn according to the second drawing command, and supplies to the module the second drawing command after processing the second drawing command, the module is configured to draw an image into a frame memory according to the first drawing command received from the application program or the second drawing command, and to write, into the general purpose memory, second change area information for indicating a second change area that is an area within the frame memory for which an image is drawn according to the first or second drawing command, and the image transfer process executes:

(i) referencing the first and second change area information stored within the general purpose memory, and acquiring from the frame memory an image within an area of the second change area which is not contained in the first change area, (ii) acquiring an image within an area of the second change area that is also contained in the first change area from the transfer image storage area without accessing the frame memory, and (iii) transferring the acquired images together with screen update area information to the image display device via the network, the screen update area information indicating a screen update area that is equivalent to the second change area.

16. An image supply method for supplying an image to an image display device via a network from an image supply computer including an application program capable of issuing a first drawing command and a second drawing command, and a module configured to process the first drawing command issued by the application program, the image supply method comprising:

acquiring an image from a transfer image storage area within a general purpose memory;

transferring the acquired image to the image display device via the network;

receiving the second drawing command issued by the application program, and drawing an image in the transfer image storage area within the general purpose memory according to the acquired second drawing command, the second drawing command being received without passing through the module, wherein the process configured to draw an image in the transfer image storage area writes, into the general purpose memory, first change area information for indicating a first change area that is an area within the transfer image storage area for which the image is drawn according to the second drawing command, and supplies to the module the second drawing command after processing the second drawing command, the module is configured to draw an image into a frame memory according to the first drawing command received from the application program or the second drawing command, and to write, into the general purpose memory, second change area information for indicating a second change area that is an area within the frame memory for which the image is drawn according to the first or second drawing command, and the image transfer process executes:
(i) setting as a history area the first change area that exists in the transfer process during a specified preceding time period, and writing, into the general purpose memory, transfer history information for representing the history area,
(ii) referencing the first and second change area information and the transfer history information stored in the general purpose memory, and acquiring from the frame memory an image within an area of the second change area that is not included in either the first change area or the history area,
(iii) acquiring from the transfer image storage area an image within the first change area and an image within an area of the second change area that is not contained in the first change area and that is contained in the history area, without accessing the frame memory, and
(iv) transferring the acquired images together with screen update area information to the image display area via the network, the screen update area information indicating a screen update area that is the total of the first and second change areas.

17. An image supply method for supplying an image to an image display device via a network from an image supply computer including an application program capable of issuing a first drawing command and a second drawing command, and a module configured to process the first drawing command issued by the application program, the image supply method comprising:

acquiring an image from a transfer image storage area within a general purpose memory;

transferring the acquired image to the image display device via the network;

receiving the second drawing command issued by the application program, and drawing an image in the transfer image storage area within the general purpose memory according to the acquired second drawing command, the second drawing command being received without passing through the module, wherein the process configured to draw an image in the transfer image storage area writes, into the general purpose memory, first change area information for indicating a first change area that is an area within the transfer image storage area for which the image is drawn according to the second drawing command, and supplies to the module the second drawing command after processing the second drawing command, the module is configured to draw an image into a frame memory according to the first drawing command received from the application program or the second drawing command, and to write, into the general purpose memory, second change area information for indicating a second change area that is an area within the frame memory for which the image is drawn according to the first or second drawing command, and the image transfer process executes:
(i) setting as a history area the first change area that exists for the transfer process during a specified preceding time period, and writing, into the general purpose memory, transfer history information for representing the history area,
(ii) referencing the first and second change area information and the transfer history information stored in the general purpose memory, and acquiring from the frame memory an image within an area of the second change area that is not included in either the first change area or the history area,
(iii) acquiring from the transfer image storage area an image within an area of the second change area that is contained in at least one of the first change area and the history area without accessing the frame memory, and
(iv) transferring the acquired images together with screen update area information to the image display area via the network, the screen update area information indicating a screen update area that is equivalent to the second change area.

18. An image supply method for supplying an image to an image display device via a network from an image supply computer including an application program capable of issuing a first drawing command and a second drawing command, and a module configured to process the first drawing command issued by the application program, the image supply method comprising:

acquiring an image from a transfer image storage area within a general purpose memory;

transferring the acquired image to the image display device via the network;

receiving the second drawing command issued by the application program, and drawing an image in the transfer image storage area within the general purpose memory according to the acquired second drawing command, the second drawing command being received without passing through the module, wherein the module is configured to draw an image into a frame memory according to the first drawing command received from the application program or the second drawing command, and the image transfer process has:
a normal transfer mode configured to acquire and transfer the image drawn in the transfer image storage area by the process configured to draw an image in the transfer image storage area when image drawing operation is performed, and
a resend mode configured to acquire and transfer the image drawn in the frame memory by the module after the image drawing operation stops.

* * * * *